United States Patent
Komori et al.

(10) Patent No.: US 6,493,391 B1
(45) Date of Patent: Dec. 10, 2002

(54) PICTURE DECODING METHOD AND APPARATUS

(75) Inventors: Kenji Komori, Kanagawa (JP); Tetsuo Kaneko, Kanagawa (JP); Kazushi Sato, Chiba (JP); Satoshi Mitsuhashi, Tokyo (JP); Masami Goseki, Tokyo (JP); Naofumi Yanagihara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/357,895

(22) Filed: Jul. 21, 1999

(30) Foreign Application Priority Data

Jul. 23, 1998 (JP) ............................................ 10-208389

(51) Int. Cl.[7] ................................................. H04B 1/66

(52) U.S. Cl. .................................................. 375/240.25

(58) Field of Search ........................... 375/240, 240.12, 375/240.18, 240.24, 240.25

(56) References Cited

U.S. PATENT DOCUMENTS 5,412,428 A * 5/1995 Tahara ................... 375/240.25

* cited by examiner

Primary Examiner—Howard Britton
Assistant Examiner—Allen Wong
(74) Attorney, Agent, or Firm—Frommer Lawrence & Haug LLP; William S. Frommer

(57) ABSTRACT

An MPEG downdecoder which eliminates picture quality deterioration ascribable to motion compensation. A decimating inverse discrete cosine transform unit 14 performs 4×4 decimating IDCT if the DCT mode is the field mode. If the DCT mode is the frame mode, a decimating IDCT unit for frame mode 15 applies IDCT to the totality of the coefficients of the DCT block and separates the DCT block into two pixel blocks in order to cope with the interlaced scanning. Each of the separated pixel blocks is processed with DCT. To reference picture data, pixels are interpolated using orthogonal transform by motion compensation units 18, 19 to generate virtual upper-order picture data of high resolution, which is processed with motion compensation. The motion-compensated virtual upper-order picture data is orthogonal transformed to decimate pixels to generate reference picture data used for addition.

24 Claims, 33 Drawing Sheets

Y

| 0 | 1 |
|---|---|
| 2 | 3 |

Cb

| 4 |
|---|

Cr

| 5 |
|---|

FIG.5

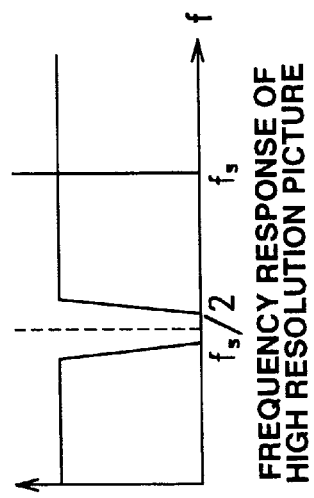
FIG.14A FREQUENCY RESPONSE OF HIGH RESOLUTION PICTURE
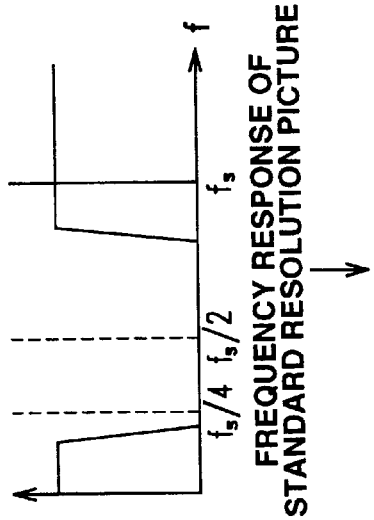
FIG.14B FREQUENCY RESPONSE OF STANDARD RESOLUTION PICTURE
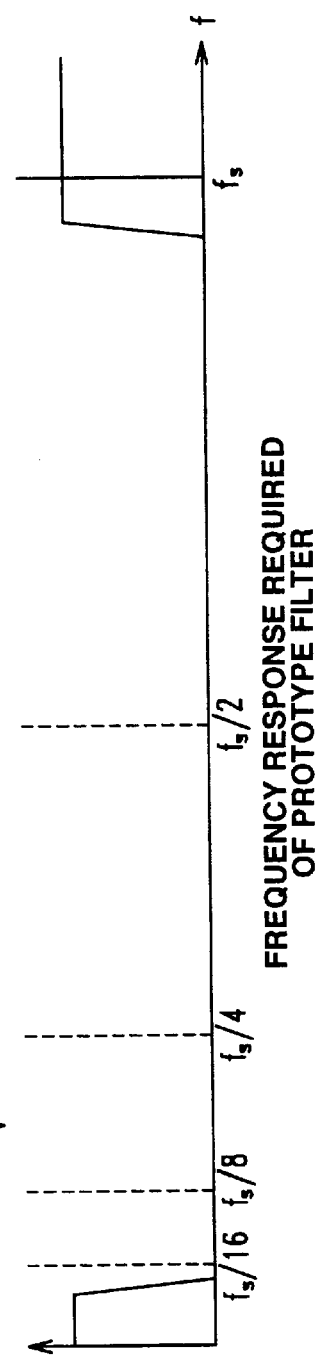
FIG.14C FREQUENCY RESPONSE REQUIRED OF PROTOTYPE FILTER

GAIN LIST = {1,1,0,0,0,0,0,0,0,0,0,0,0,}

PICTURE DECODING METHOD AND APPARATUS

BACKGROUND OF THE INVENTION

1. Field of the Invention

This invention relates to a picture decoding method and apparatus for decoding compressed picture data of a first resolution obtained on predictive coding by motion prediction in terms of a pre-set pixel block (macro-block) as a unit and on orthogonally-transform in terms of a pre-set pixel block (orthogonal transform block) as a unit. More particularly, it relates to a picture decoding method and apparatus for decoding compressed picture data of the first resolution and for decimating the data to moving picture data of a second resolution lower than the first resolution.

2. Description of the Related Art

There is now going on the standardization of digital television signals employing the picture compression system, such as Moving Picture Experts Group Phase 2 (MPEG2). Among the standards for digital television broadcast, there are a standard for standard resolution pictures, such as those with the number of effective lines in the vertical direction of 576, and a standard for high-resolution pictures, such as those with the number of effective lines in the vertical direction of 1152. Recently, there is raised a demand for a downdecoder for decoding compressed picture data of a high-resolution picture and for reducing the resolution of the compressed picture data by ½ to generate picture data of the picture data of standard resolution to display the picture data on a television monitor adapted to cope with the standard resolution.

There is proposed in a publication entitled "Scalable Decoder free of low-range Drift" (written by Iwahashi, Kanbayashi and Takaya, Shingaku-Gihou CS94-186, DSP 94-108, 1995-01) a downdecoder for decoding a bitstrean of, for example, MPEG2, obtained on predictive coding with motion prediction of a high-resolution picture and compression coding by discrete cosine transform, and for downsampling the picture to a picture of standard resolution. This Publication, referred to below as Publication 1, shows the following first to third downdecoders.

Referring to FIG. 27, this first downdecoder includes an inverse discrete cosine transform unit 1001, for processing a bitstrean of a high resolution picture with 8 (number of coefficients as counted from the dc component in the horizontal direction) ×8 (number of coefficients as counted from the dc component in the vertical direction), an adder 1002 for adding a discrete cosine transformed high resolution picture and a motion-compensated reference picture, and a frame memory 1003 for transient storage of the reference picture. The first downdecoder also includes a motion compensation unit 1004 for motion-compensating the reference picture stored in the frame memory 1003 with ½ pixel precision, and a downsampling unit 1005 for converting the reference picture stored in the frame memory 1003 to a picture of standard resolution.

This first downdecoder reduces an output picture, obtained on decoding as a high resolution picture by inverse discrete cosine transform, by the downsampling unit 1005, to output resulting picture data with the standard resolution.

Referring to FIG. 28, the second downdecoder includes an inverse discrete cosine transform unit 101 for performing 8×8 inverse discrete cosine transform, as it substitutes 0 for the high-frequency components of the discrete cosine transform (DCT) block of the high resolution picture, an adder 1012 for suing the discrete cosine transformed high resolution picture to the motion-compensated reference picture, and a frame memory 1013 for transient storage of the reference picture. The second downdecoder also includes a motion compensation unit 1014 for motion-compensating the reference picture stored in the frame memory 1013 with ½ pixel precision, and a downsampling unit 1015 for converting the reference picture stored in the frame memory 1013 to a picture of standard resolution.

This second downdecoder performs inverse discrete cosine transform to obtain a decoded output picture, as a high-resolution picture, as it substitutes 0 for coefficients of high-frequency components among the totality of coefficients of the DCT block, and reduces the output picture in size by the downsampling unit 1015 to output picture data of standard resolution.

Referring to FIG. 29, a third downdecoder includes a decimating inverse discrete cosine transform unit 102 for doing e.g., 4×4 inverse discrete cosine transform, using only the coefficients of the low-frequency components of the DCT block of the bitstream of the high resolution picture, for decoding to a standard resolution picture, and an adder 1022 for summing the standard resolution picture processed with decimating inverse discrete cosine transform and the motion-compensated reference picture. The third downdecoder also includes a frame memory 1023 for transiently storing the reference picture and a motion compensation unlit 1024 for motion-compensating the reference picture stored by the frame memory 1023 with a ¼ pixel precision.

In this third downdecoder, IDCT is executed using only low-frequency components of all coefficients of the DCT block to decode a picture of low resolution from a picture of high resolution.

The above-described first downdecoder performs inverse discrete cosine transform on the totality of the coefficients in the DCT block to obtain a high-resolution picture on decoding. Thus, the inverse discrete cosine transform unit 1001 of high processing capability and the frame memory 1003 of high capacity are needed. The second downdecoder performs discrete cosine transform on the coefficients in the DCT block to obtain a high-resolution picture on decoding, as it sets the high-frequency components of the coefficients to zero, so that a lower processing capacity of the inverse discrete cosine transform unit 1011 suffices. However, the frame memory 1003 of high capacity is yet needed. In contradistinction from these first and second downdecoders, the third downdecoder performs inverse discrete cosine transform on the totality of the coefficients in the DCT block, using only coefficients of the low-frequency components of the coefficients in the DCT block, so that a low processing capability of an inverse discrete cosine transform unit 1021 suffices. Moreover, since the reference picture of the standard resolution picture is decoded, a lower capacity of the frame memory 1023 suffices.

Meanwhile, the display system of a moving picture in television broadcast is classified into a sequential scanning system and an interlaced scanning system. The sequential scanning system sequentially displays a picture obtained on sampling the totality of pictures in a given frame at the same timing. The interlaced scanning system alternately displays pictures obtained on sampling pixels in a given frame at different timings from one horizontal line to another.

In this interlaced scanning system, one of the pictures obtained on sampling pixels in a frame at different timings from one horizontal line to another is termed a top field or a first field, with the other picture being termed a bottom field or a second field. The picture containing the leading line in the horizontal direction of a frame becomes the top field, while the picture containing the second line in the horizontal direction of a frame becomes the bottom field. Thus, in the interlaced scanning system, a sole frame is made up of two fields.

With the MPEG2, not only a frame but also a field can be allocated to a picture as a picture compressing unit in order to compress the moving picture signals efficiently in the interlaced scanning system.

If, in the MPEG2, a field is allocated to a picture, the resulting bitstream structure is termed a field structure, while if a frame is allocated to a picture, the resulting bitstream structure is termed a frame structure. In the field structure, a DCT block is constituted by pixels in the field and discrete cosine transform is applied on the field basis. The processing mode of performing field-based discrete cosine transform is termed the field DCT mode. In the frame structure, a DCT block is constituted by pixels in the frame and discrete cosine transform is applied on the frame basis. The processing mode of performing field-based discrete cosine transform is termed the frame DCT mode. In the field structure, a macro-block is constituted from pixels in a field and motion prediction is performed on the field basis. The processing mode of performing motion prediction on the field basis is termed the field motion prediction mode. In the frame structure, a macro-block is constituted from pixels in a frame and motion prediction is performed on the frame basis. The processing mode of performing motion prediction on the frame basis is termed the frame motion prediction mode.

Meanwhile, a picture decoding apparatus, adapted for decoding compressed picture data for the interlaced scanning system, using the third downdecoder shown in the Publication 1, is proposed in, for example, a Publication entitled in "A Compensation Method of Drift Errors in Scalability" written by N. Obikane, K. Tahara and J. Yoneintsu, HDTV Work Shop '93. This Publication is hereinafter termed the Publication 2.

Referring to FIG. 30, the conventional picture decoding device, shown in Publication 2, includes a bitstream analyzer 1031, fed with a bitstream obtained on compressing a high resolution picture in accordance with the MPEG2, for analyzing this bitstream, a variable length encoding/decoding unit 1032 for variable length encoding data for allocating codes of lengths corresponding to the data occurrence frequency and for decoding the variable length encoded bitstream, and a dequantizer 1033 for multiplying the respective coefficients of the DCT block with quantization steps. The conventional picture decoding device also includes a decimating inverse discrete cosine transform unit 1034 for decoding a standard resolution picture by e.g., 4×4 inverse discrete cosine transform using only coefficients of low-frequency components of the totality of the coefficients of the DCT block, and an adder 1035 for summing the standard resolution picture processed with decimating inverse discrete cosine transform to a motion-compensated reference picture. The conventional picture decoding device also includes a frame memory 1036 for transiently storing the reference picture and a motion compensation unit 1037 for motion compensating the reference picture stored in the frame memory 1036 to a ¼ pixel precision.

The decimating inverse discrete cosine transform unit 1034 of the conventional picture decoding device, shown in the Publication 2, performs the inverse discrete cosine transform, using only the coefficients of the low-frequency components of the totality of the coefficients in the DCT block. It is noted that the positions of the coefficients of the frame DCT mode, processed with the inverse discrete cosine transform, differ from those of the field DCT mode.

Specifically, in the field DCT mode, the decimating inverse discrete cosine transform 1034 applies the inverse discrete cosine transform only on the 4×4 of 8×8 coefficients in the DCT block, as shown in FIG. 31. On the other hand, in the frame DCT mode, the decimating inverse discrete cosine transform 1034 applies the inverse discrete cosine transform only on the 4×2+4×2 of 8×8 coefficients in the DCT block, as shown in FIG. 32.

Also, the motion compensation unit 1037 of the conventional picture decoding device performs motion compensation to ¼ pixel precision, adapted to cope with the field motion prediction mode or with the frame motion prediction mode, based on the information (motion vector) on the motion prediction performed on the high resolution picture. Specifically, while the MPEG2 usually provides that the motion compensation be performed to ½ pixel precision, the number of pixels in a picture is thinned out to one-half if a standard resolution picture is to be decoded from a high resolution picture. Thus, the motion compensation unit 1037 performs motion compensation as it sets the pixel precision for motion compensation to ¼ pixel.

Therefore, the motion compensation device 1037 performs linear interpolation on the pixels of the reference picture stored in the frame memory 1036 as a standard resolution picture to generate pixels to a ¼ pixel accuracy.

Specifically, the processing for linear interpolation of pixels in the perpendicular direction for the field motion prediction mode and that for the frame motion prediction mode are explained with reference to FIGS. 33 and 34, in which the phase of pixels in the vertical direction is indicated in the perpendicular direction, with the phase of each pixel in a displayed picture being indicated by an integer.

Referring to FIG. 33, the processing for interpolation of a picture motion-predicted in the field motion prediction mode is explained. For a high resolution picture (upper layer), motion compensation is independently performed to a ½ pixel precision, from field to field, as shown in FIG. 33. On the other hand, for a standard resolution picture (lower layer), motion compensation is achieved by generating pixels dephased by ¼, ½ and ¾ pixel in the perpendicular direction by linear interpolation in a field based on the pixel of an integer number precision. That is, in the standard resolution picture (lower layer), pixels with ¼ pixel precision of the top field are generated by linear interpolation based on the pixels of the integer number precision of the top field, while those with ¼ pixel precision of the bottom field are generated by linear interpolation based on the pixels of the integer number precision of the bottom field. It is assumed for example that the value of a pixel of the top field, having the phase in the perpendicular direction at the 0-position, is a, with the value of a pixel having the phase in the perpendicular direction at the 1-position is b. In this case, the pixel of the top field with the phase in the perpendicular direction of ¼ is (3a+b)/4, while the pixel of the top field with the phase in the perpendicular direction of ½ is (a+b)/2, with the pixel of the top field with the phase in the perpendicular direction of ¾ being (a+3b)/4.

Referring to FIG. 34, the processing of interpolation of a picture motion-predicted in the frame motion prediction mode is explained. For a high resolution picture (upper layer), interpolation processing is performed across the fields, that is across the bottom field and the top field, as shown in FIG. 34a, with the motion compensation precision being ½ pixel precision. For a standard resolution picture (lower layer), motion compensation is achieved by generating pixels dephased by ¼, ½ and ¾ pixels in the perpendicular direction, based on the pixels of the integer number precision of two fields, that is the top field and the bottom field. For example, it is assumed that the value of a pixel of the bottom field having the phase in the perpendicular direction of −1 is a, the value of a pixel of the top field having the phase in the perpendicular direction of 0 is b, the value of a pixel of the bottom field having the phase in the perpendicular direction of 1 is c, the value of a pixel of the top field having the phase in the perpendicular direction of 2 is d, and a pixel of the top field having the phase in the perpendicular direction of 3 is e. In this case, the pixels of ¼ pixel precision, having the phase in the perpendicular direction in a range from 0 and 2, may be found as follows:

The pixel having the phase in the perpendicular direction of ¼ is (a+4b+3c)/8, while the pixel having the phase in the perpendicular direction of ½ is (a+3c)/4. The pixel having the phase in the perpendicular direction of ¾ is (a+2b+3c+2d)/8, while the pixel having the phase in the perpendicular direction of 5/4 is (2b+3c+2d+e )/8. The pixel having the phase in the perpendicular direction of 3/2 is (3c+e)/4, while the pixel having the phase in the perpendicular direction of 7/4 is (3c+4d+e)/8.

With the above-described picture decoding device, disclosed in the Publication 2, the compressed picture data of the high resolution picture, associated with the interlaced scanning system, can be decoded to standard resolution picture.

However, with the conventional picture decoding device, shown in the above Publication 2, the pixels of the standard resolution picture obtained with the field DCT mode are dephased with respect to the pixels of the standard resolution obtained with the frame DCT mode. Specifically, with the field DCT mode, the phases of the pixels in the perpendicular direction of the respective pixels of the top field of the lower layer are ½, 5/2, . . . , with the phases in the perpendicular direction of the respective pixels of the bottom field of the lower layer being 1, 3, . . . , as shown in FIG. 35. On the other hand, with the field DCT mode, the phases of the pixels in the perpendicular direction of the respective pixels of the top field of the lower layer are 0, 2, . . . , with the phases in the perpendicular direction of the respective pixels of the bottom field of the lower layer being 1, 3, . . . , as shown in FIG. 35. Thus, the pictures with different phases co-exist in the frame memory 1036, thus deteriorating the picture quality of the output picture.

With the conventional picture decoding device, shown in the Publication 2, correction is not made of phase deviations or dephasing of the pixels at the time of the motion compensation with the field motion prediction mode and the frame motion prediction mode resulting in the deteriorated picture quality.

SUMMARY OF THE INVENTION

It is therefore an object of the present invention to provide a picture decoding method and a picture decoding device for decoding standard resolution picture data from compressed picture data of the high resolution picture whereby phase deviations of pixels at the time of motion compensation by the field motion prediction mode and the frame motion prediction mode may be eliminated to prevent picture quality deterioration ascribable to motion compensation.

In one aspect, the present invention provides a picture decoding device for decoding moving picture data of a second resolution from compressed picture data of a first resolution obtained on predictive coding effecting motion prediction in terms of a pre-set pixel block (macro-block) as a unit and on compression encoding by orthogonal transform in terms of a pre-set pixel block (orthogonal transform block) as a unit, the second resolution being lower than the first resolution. The picture decoding device includes first inverse orthogonal transform means for applying inverse orthogonal transform to an orthogonal transformed compressed picture data obtained on orthogonal transform by the orthogonal transform system coping with interlaced scanning (field orthogonal transform mode), second inverse orthogonal transform means for applying inverse orthogonal transform to an orthogonal transformed compressed picture data obtained on orthogonal transform by the orthogonal transform system coping with sequential scanning (frame orthogonal transform mode), addition means for summing compressed picture data inverse orthogonal transformed by the first inverse orthogonal transform means or the second inverse orthogonal transform means to motion-compensated reference picture data to output moving picture data of the second resolution, storage means for storing moving picture data outputted by the addition means as reference picture data, first motion compensation means for motion-compensating a macro-block of reference picture data motion-predicted by the motion prediction system coping with interlaced scanning (field motion prediction mode) and second motion compensation means for motion-compensating a macro-block of reference picture data motion-predicted by the motion prediction system coping with sequential scanning (frame motion prediction mode). The first inverse orthogonal transform means inverse orthogonal transforms coefficients of low-frequency components of respective coefficients of the orthogonal transform block. The second inverse orthogonal transform means inverse orthogonal transforms coefficients of the entire frequency components of respective coefficients of the orthogonal transform block. The second inverse orthogonal transform means separates the respective pixels of the inverse orthogonal transformed orthogonal transform block into two pixel blocks coping with interlaced scanning. The second inverse orthogonal transform means orthogonal transforms the separated pixel blocks, inverse orthogonal transforms coefficients of low-frequency components of respective coefficients of the two orthogonal transformed pixel blocks and synthesizes the inverse orthogonal transformed pixel blocks into an orthogonal transform block. The first motion compensation means and the second motion compensation means interpolate pixels using orthogonal transform for stored reference picture data in order to generate virtual upper-order picture data of the first resolution, and motion-compensating the generated virtual upper-order picture, the first motion compensation means and the second motion compensation means applying pixel decimation using orthogonal transform for the motion-compensated virtual upper-order picture for generating reference picture data summed to the compressed picture data.

With the present picture decoding device, the coefficients of the entire frequency components of an orthogonal transform block, orthogonal transformed by the frame orthogonal transform mode, are inverse orthogonal transformed and separated into two pixel blocks coping with interlaced scanning. These two pixel blocks are orthogonal transformed and the inverse orthogonal transformed two pixel blocks are synthesized. The picture decoding device also interpolates pixels to the stored reference picture data, using orthogonal transform, to generate virtual upper-order picture data of the first resolution, which are motion-compensated. These motion-compensated virtual upper-order picture data are pixel-decimated using orthogonal transform to generate reference picture data added to the compressed picture data. The picture decoding device outputs moving picture data of the second resolution lower than the first resolution.

In another aspect, the present invention provides a picture decoding device wherein the first inverse orthogonal transform means inversely orthogonal transforms coefficients of low-frequency components of respective coefficients of the orthogonal transform block, and corrects the pixels by ¼ pixel in the vertical direction for respective pixels of the top field resulting from inverse orthogonal transform, while correcting the pixels by ¾ pixel in the vertical direction for respective pixels of the bottom field resulting from inverse orthogonal transform. The second inverse orthogonal transform means inverse orthogonal transforms the coefficients of the entire frequency components of the orthogonal transform block. The second inverse orthogonal transform means separates the inverse orthogonal transformed orthogonal transform block into two pixel blocks for coping with interlaced scanning, while separately orthogonal transforming the separated pixel blocks. The second inverse orthogonal transform means inverse orthogonal transforms the coefficients of low-frequency components, among the coefficients of the orthogonal transformed two pixel blocks, while phase-correcting respective pixels of the top field resulting from inverse orthogonal transform by ¼ pixel in the vertical direction and phase-correcting respective pixel of the bottom field resulting from inverse orthogonal transform by ¾ pixel in the vertical direction and synthesizing the phase-corrected top and bottom fields. The first motion compensation means and the second motion compensation means correct the phase of the pixels in the vertical direction of the top field of stored reference picture data by ¼ pixel, while correcting the phase of the pixels in the vertical direction of the bottom field by ¾ pixels by way of pixel interpolation to generate a virtual upper-order picture of the first resolution. The first motion compensation means and the second motion compensation means correct the phase of the pixels in the vertical direction of the top field by ¼ pixel, while correcting the phase of the pixels in the vertical direction of the bottom field by ¾ pixel by way of pixel decimation to generate reference picture data to be added to compressed picture data.

In the present picture decoding device, the coefficients of the low-frequency components of the coefficients of the orthogonal transform block orthogonal transformed by the field orthogonal transform mode are inverse orthogonal transformed, the respective pixels of the bottom field resulting from the inverse orthogonal transform are corrected for phase in the vertical direction by ¼ phase, while the respective pixels of the top field resulting from the inverse orthogonal transform are corrected for phase in the vertical direction by ¾ phase. The coefficients of the entire frequency components of the orthogonal transform block, orthogonal transformed by the frame orthogonal transform mode, are inverse orthogonal transformed and separated into two pixel blocks for coping with interlaced scanning. The separated two pixel blocks are respectively orthogonal transformed and inverse orthogonal transform is applied to coefficients of the low-frequency components of the respective coefficients of the two orthogonal transformed pixel blocks. The coefficients of the low-frequency components of the coefficients of the orthogonal transformed two pixel blocks are inverse orthogonal transformed, and the respective pixels of the top field resulting from the inverse orthogonal transform are corrected for phase in the vertical direction by ¼ phase, while the respective pixels of the bottom field resulting from the inverse orthogonal transform are corrected for phase in the vertical direction by ¾ phase. The top and bottom fields, thus corrected for phase, are synthesized together. Also, in the present picture decoding device, pixels of the top field of the stored reference picture data are corrected for phase by ¼ pixel, whereas pixels of the bottom field of the stored reference picture data are corrected for phase by ¾ pixel to generate virtual upper-order picture of the first resolution to decimate pixels generate reference picture data added to the compressed picture data. The present picture decoding device outputs moving picture data of the second resolution lower than the second resolution.

In still another aspect, the present invention provides a picture decoding method for decoding moving picture data of a second resolution from compressed picture data of a first resolution obtained on predictive coding effecting motion prediction in terms of a pre-set pixel block (macro-block) as a unit and on compression encoding by orthogonal transform in terms of a pre-set pixel block (orthogonal transform block) as a unit, the second resolution being lower than the first resolution. The picture decoding method includes applying inverse orthogonal transform to an orthogonal transformed compressed picture data obtained on orthogonal transform by the orthogonal transform system coping with interlaced scanning (field orthogonal transform mode), applying inverse orthogonal transform to an orthogonal transformed compressed picture data obtained on orthogonal transform by the orthogonal transform system coping with sequential scanning (frame orthogonal transform mode), summing inverse orthogonal transformed compressed picture data to motion-compensated reference picture data, storing moving picture data resulting from the summing as reference picture data, motion-compensating a macro-block of reference picture data motion-predicted by the motion prediction system coping with interlaced scanning (field motion prediction mode), motion-compensating a macro-block of reference picture data motion-predicted by the motion prediction system coping with sequential scanning (frame motion prediction mode), inverse orthogonal transforming coefficients of low-frequency components of respective coefficients of the orthogonal transform block orthogonal transformed by the field orthogonal transform mode, inverse orthogonal transforming coefficients of the entire frequency components of respective coefficients of the orthogonal transform block orthogonal transformed by the frame orthogonal transform mode, separating the respective pixels of the inverse orthogonal transformed orthogonal transform block into two pixel blocks for coping with interlaced scanning, orthogonal transforming the separated pixel blocks, inverse orthogonal transforming coefficients of low-frequency components of respective coefficients of the two orthogonal transformed pixel blocks, synthesizing the inverse orthogonal transformed pixel blocks into an orthogonal transform block, interpolating pixels using orthogonal transform for stored reference picture data to generate virtual upper-order picture data of the first resolution, motion-compensating the generated virtual upper-order picture data and effecting pixel decimation using orthogonal transform for the motion-compensated virtual upper-order picture for generating reference picture data summed to the compressed picture data.

With the present picture decoding method, the coefficients of the entire frequency components of an orthogonal transform block, orthogonal transformed by the frame orthogonal transform mode, are inverse orthogonal transformed and separated into two pixel blocks coping with interlaced scanning. These two pixel blocks are orthogonal transformed and the inverse orthogonal transformed two pixel blocks are synthesized. The picture decoding method also includes interpolating pixels to the stored reference picture data, using orthogonal transform, to generate virtual upper-order picture data of the first resolution, which are motion-compensated. These motion-compensated virtual upper-order picture data are pixel-decimated using orthogonal transform to generate reference picture data added to the compressed picture data. The picture decoding method also includes outputting moving picture data of the second resolution lower than the first resolution.

In yet another aspect, the present invention provides a picture decoding method further including inverse orthogonal transforming coefficients of low-frequency components of respective coefficients of an orthogonal transform block orthogonal transformed by the field motion prediction mode, correcting the phase of respective pixels of the top field resulting from inverse orthogonal transform by ¼ pixel in the vertical direction, correcting the phase of respective pixels of the bottom field resulting from inverse orthogonal transform by ¾ pixel in the vertical direction, inverse orthogonal transforming coefficients of the entire frequency components of the orthogonal transform block orthogonal transformed by the frame orthogonal transform mode, separating the inverse orthogonal transformed orthogonal transform block into two pixel blocks coping with interlaced scanning, orthogonal transforming the separated two pixel blocks, inverse orthogonal transforming the coefficients of the low-frequency components of respective coefficients of the two orthogonal transform pixel blocks, correcting the phase of respective pixels of the top field resulting from inverse orthogonal transform by ¼ pixel in the vertical direction, correcting the phase of respective pixels of the bottom field resulting from inverse orthogonal transform by ¾ pixel in the vertical direction, synthesizing the top and bottom field corrected for phase, correcting the phase of pixels in the vertical direction of the top field resulting from inverse orthogonal transforms by ¼ pixel, and correcting the phase of pixels in the vertical direction of the bottom field resulting from inverse orthogonal transforms by ¾ pixel to decimate pixels to generate reference picture data to be added to the compressed picture data.

In the present picture decoding method, the coefficients of the low-frequency components of the coefficients of the orthogonal transform block orthogonal transformed by the field orthogonal transform mode are inverse orthogonal transformed, and the respective pixels of the bottom field resulting from the inverse orthogonal transform are corrected for phase in the vertical direction by ¼ phase, while the respective pixels of the top field resulting from the inverse orthogonal transform are corrected for phase in the vertical direction by ¾ phase. The coefficients of the entire frequency components of the orthogonal transform block, orthogonal transformed by the frame orthogonal transform mode, are inverse orthogonal transformed and separated into two pixel blocks for coping with interlaced scanning. The separated two pixel blocks are respectively orthogonal transformed and inverse orthogonal transform is applied to coefficients of the low-frequency components of the respective coefficients of the two orthogonal transformed pixel blocks. The coefficients of the low-frequency components of the coefficients of the orthogonal transformed two pixel blocks are inverse orthogonal transformed, and the respective pixels of the top field resulting from the inverse orthogonal transform are corrected for phase in the vertical direction by ¼ phase, while the respective pixels of the bottom field resulting from the inverse orthogonal transform are corrected for phase in the vertical direction by ¾ phase. The top and bottom fields, thus corrected for phase, are synthesized together. Also, in the present picture decoding method, pixels of the top field of the stored reference picture data are corrected for phase by ¼ pixel, whereas pixels of the bottom field of the stored reference picture data are corrected for phase by ¾ pixel to generate virtual upper-order picture of the first resolution to decimate pixels generate reference picture data added to the compressed picture data. The present picture decoding method outputs moving picture data of the second resolution lower than the second resolution.

According to the present invention, inverse orthogonal transform is applied to coefficients of the totality of frequency components of the orthogonal transform block orthogonal transformed by the frame orthogonal transform mode to separate the block into two pixel blocks in meeting with the interlaced scanning. The two separated pixel blocks are respectively orthogonal transformed to inverse orthogonal transform the coefficients of the low-frequency components, and the two inverse orthogonal transformed pixel blocks are synthesized.

Thus, according to the present invention, the processing volume and the recording capacity required for decoding can be decreased, while pixel dephasing otherwise produced between the field orthogonal transform mode and the frame orthogonal transform mode can be eliminated without detracting from interlaced character proper to the interlaced picture. It is also possible to improve the picture quality of the moving picture data of second resolution.

Also, according to the present invention, pixels are interpolated to the stored reference picture data using orthogonal transform to generate virtual upper-order picture of first resolution to effect motion compensation, while the motion-compensated virtual upper-order picture are processed with pixel decimation using orthogonal transform to generate reference picture data to be added to the compressed picture data.

Thus, according to the present invention, it is possible to reduce the deterioration of the picture quality due to motion compensation.

According to the present invention, inverse orthogonal transform is applied to the coefficients of the low-frequency components among the coefficients of the orthogonal transform block orthogonal transform by the field orthogonal transform mode. The pixels of the top field obtained on inverse orthogonal transform are corrected for phase by ¼ pixel in the vertical direction of the pixels of the top field obtained on inverse orthogonal transform, while the pixels of the bottom field obtained on inverse orthogonal transform are corrected for phase by ¾ pixel in the vertical direction of the pixels of the bottom field obtained on inverse orthogonal transform. The coefficients of the totality of the frequency components of the orthogonal transform block orthogonal transform by the frame orthogonal transform mode are inverse orthogonal transformed, the inverse orthogonal transformed orthogonal transform blocks are separated into two pixel blocks for coping with interlaced scanning, and orthogonal transform is applied to the separated two pixel blocks. The coefficients of the low-frequency components of the respective coefficients of the orthogonal transformed two pixel blocks are inverse orthogonal transformed and the pixels of the top field obtained on inverse orthogonal transforms are corrected for phase by ¼ pixel in the vertical direction of the pixels of the top field resulting from inverse orthogonal transform, while the pixels of the bottom field obtained on inverse orthogonal transforms are corrected for phase by ¾ pixel in the vertical direction of the pixels of the bottom field resulting from inverse orthogonal transform. The top and bottom field, corrected for phase, are synthesized together.

This reduces the processing volume and the recording capacity required for decoding, while dephasing of the pixels of the output moving picture data of the second resolution may be eliminated. That is, the output moving picture data can be displayed without filtering, while it is possible to improve the picture quality of the moving picture data of the second resolution.

Also, according to the present invention, the pixels in the vertical direction of the top filed of the stored reference picture data are corrected for phase by ¼ pixel, while the pixels in the vertical direction of the bottom filed of the stored reference picture data are corrected for phase by ¾ pixel, by way of pixel interpolation, to generate virtual upper-order picture data of the first resolution. The pixels in the vertical direction of the top filed of the stored reference picture data are corrected for phase by ¼ pixel, while the pixels in the vertical direction of the bottom field are corrected for phase by ¾ pixel, by way of pixel decimation, to generate reference picture data to be added to the compressed picture data.

This renders it possible to reduce picture quality deterioration otherwise caused by motion compensation.

BRIEF DESCRIPTION OF THE DRAWINGS

FIG. 5 illustrates a DCT block of luminance and chrominance components in a 420-format macro-block.

FIG. 14 illustrates the frequency response of a prototype filter required for designing the 4×8 phase correcting IDCT matrix.

DESCRIPTION OF THE PREFERRED EMBODIMENTS

Figure 1:
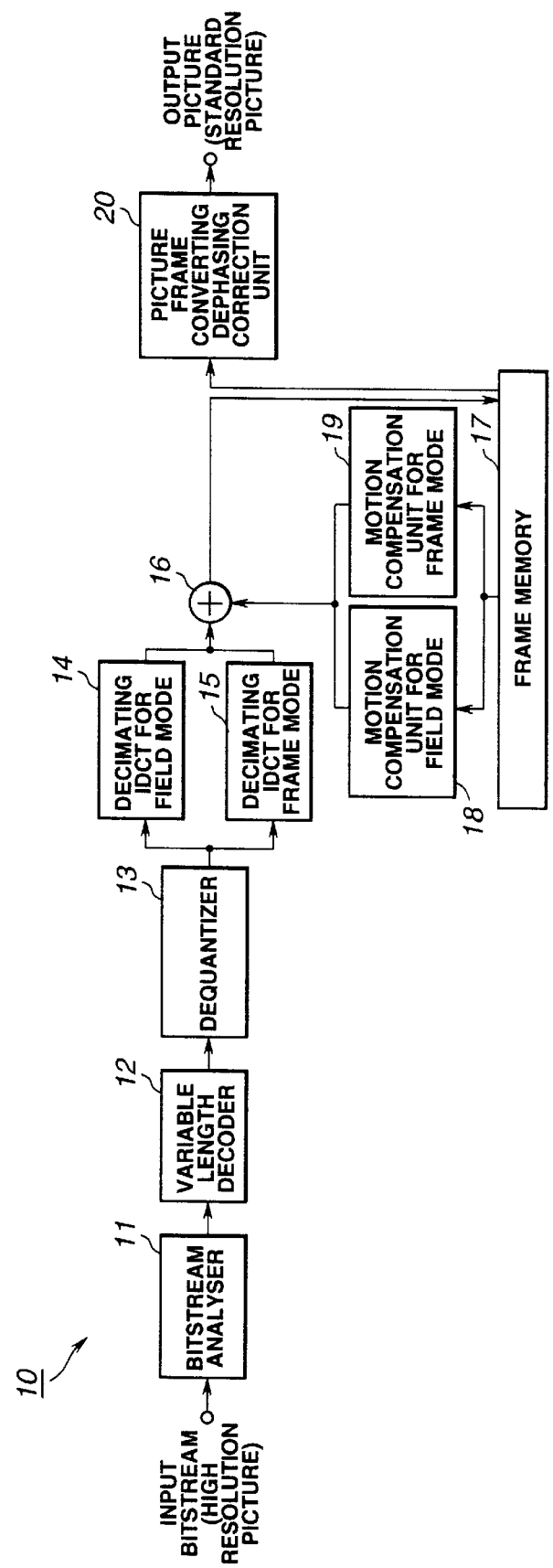
FIG. 1 is a block diagram showing a picture decoding device according to a first embodiment of the present invention.

Referring to the drawings, preferred embodiments of a picture decoding device according to the present invention will be explained in detail.

First Embodiment

First, a picture decoding device according to a first embodiment of the present invention is explained.

Referring to FIG. 1, a picture decoding device 10 of the first embodiment of the present invention is designed and constructed so that a bitstrean obtained on compressing a high resolution picture with the number of effective lines in the vertical direction of, for example, 1152, by MPEG2, is entered as an input, with the input bitstream being decoded and decimated to a resolution of ½ to output a standard resolution picture with the number of effective lines in the vertical direction of, for example, 576.

In the following explanation of the embodiments of the present invention, a high resolution picture is termed an upper layer and a standard resolution picture is termed a lower layer. It is noted that, if a DCT block having 8×8 discrete cosine coefficients is inverse discrete cosine transformed, there result decoded data made up of 8×8 pixels. The processing of inverse discrete cosine transform processing and simultaneously reducing the resolution, such as decoding 8×8 discrete cosine coefficients to obtain decoded data made up of 4×4 pixels, is termed the decimating inverse discrete cosine transform.

This picture decoding device 10 includes a bitstream analysis unit 11, fed with a bitstream of a compressed high resolution picture and adapted for analyzing the input bitstream, and a variable length decoding unit 12 for decoding the bitstream, processed with variable length encoding of allocating a code length associated with the data occurrence frequency. The picture decoding device 10 also includes a dequantizer 13 for multiplying the coefficients of the DCT block with quantization steps and a decimating inverse discrete cosine transform unit 14 for decimating inverse discrete cosine transforming the DCT block discrete cosine transformed with the field DCT mode to generate a standard resolution picture. The picture decoding device 10 also includes a decimating inverse discrete cosine transform unit for frame mode 15 for decimating inverse discrete cosine transforming the DCT block discrete cosine transformed in the frame DCT mode and an adder 16 for summing the decimating inverse discrete cosine transformed standard resolution picture to the motion compensated reference picture. The picture decoding device 10 also includes a frame memory 17 for temporarily storing the reference picture and a motion compensation unit for field mode 18 for motion compensating the reference picture stored in the frame memory 17 in meeting with the field motion predictive mode. The picture decoding device 10 also includes a motion compensation unit for frame mode 19 for motion compensating the reference picture stored in the frame memory 17 in meeting with the frame motion predictive mode, and a picture frame converting dephasing correction unit 20 for post-filtering a picture stored in the frame memory 17 for picture frame conversion and for correcting the dephasing of pixels for display on a television monitor etc.

Figure 31:
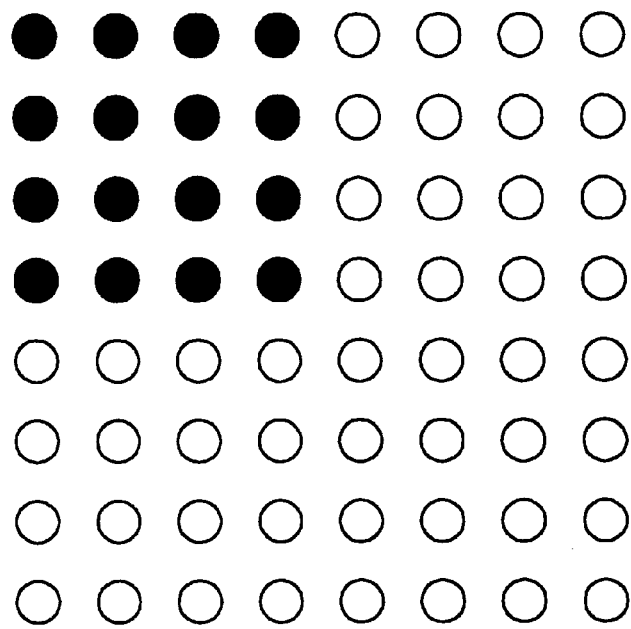
FIG. 31 illustrates the decimating inverse discrete cosine transform processing in the field DCT mode of the conventional picture decoding device.
Figure 32:
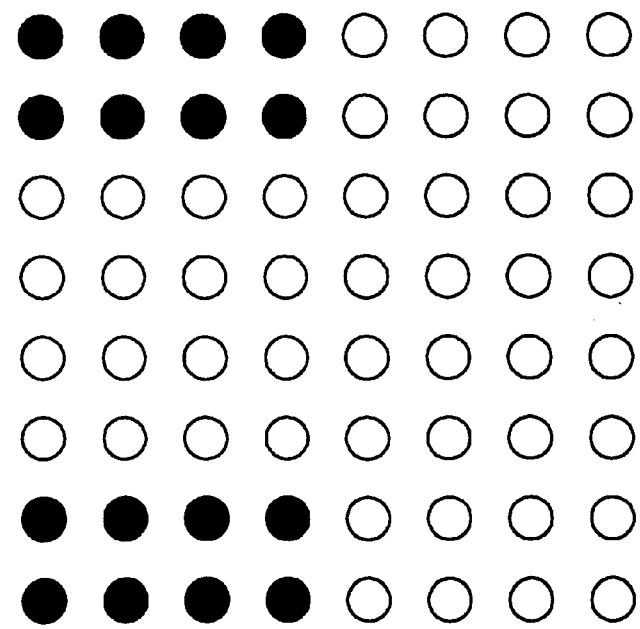
FIG. 32 illustrates the decimating inverse discrete cosine transform processing in the field DCT mode of the conventional picture decoding device.
Figures 33A, 33B:
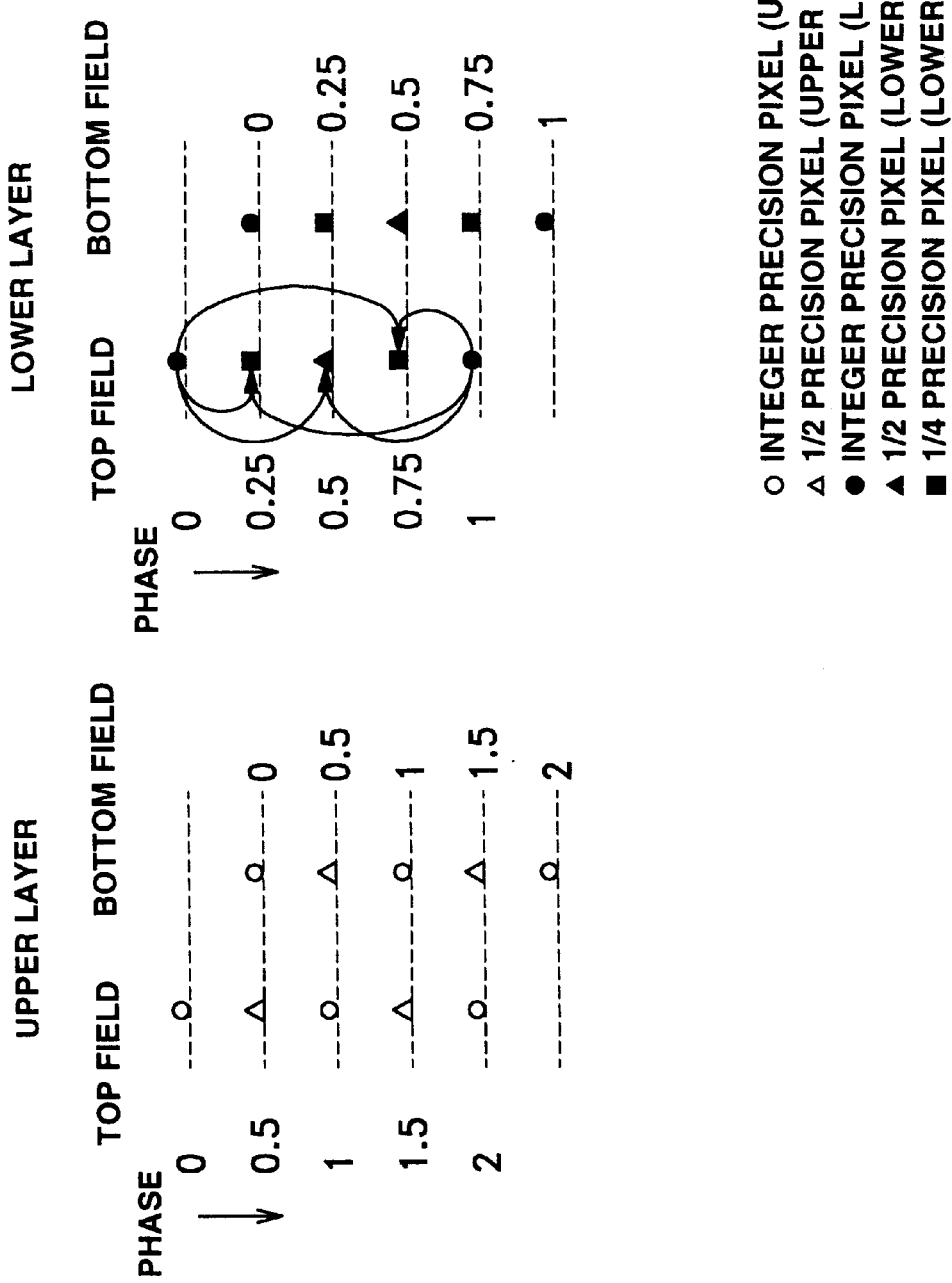
FIG. 33 illustrates linear interpolation processing in the field motion predictive mode of the conventional picture decoding device.
Figures 34A, 34B:
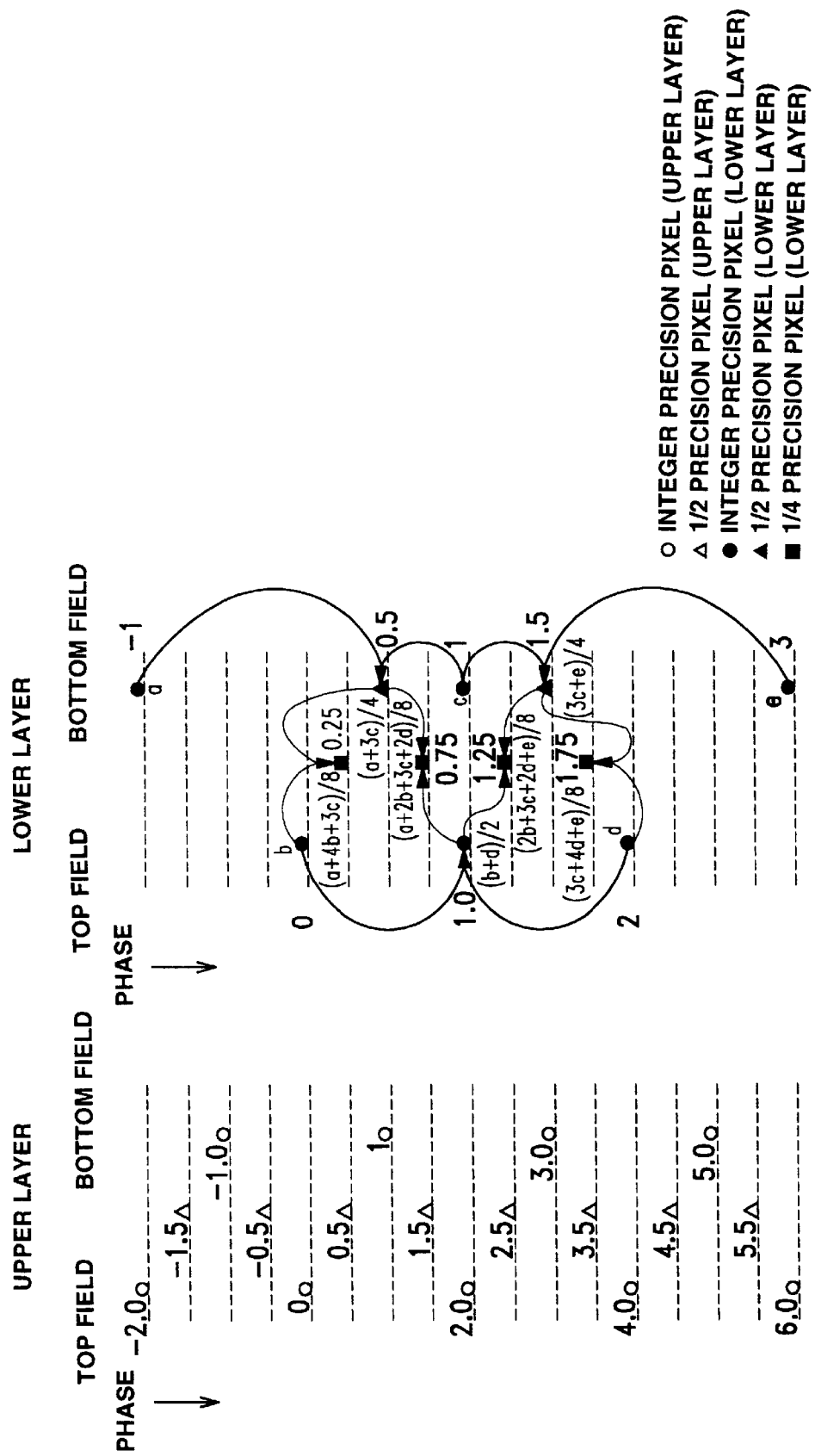
FIG. 34 illustrates linear interpolation processing in the frame motion predictive mode of the conventional picture decoding device.
Figures 35A, 35B:
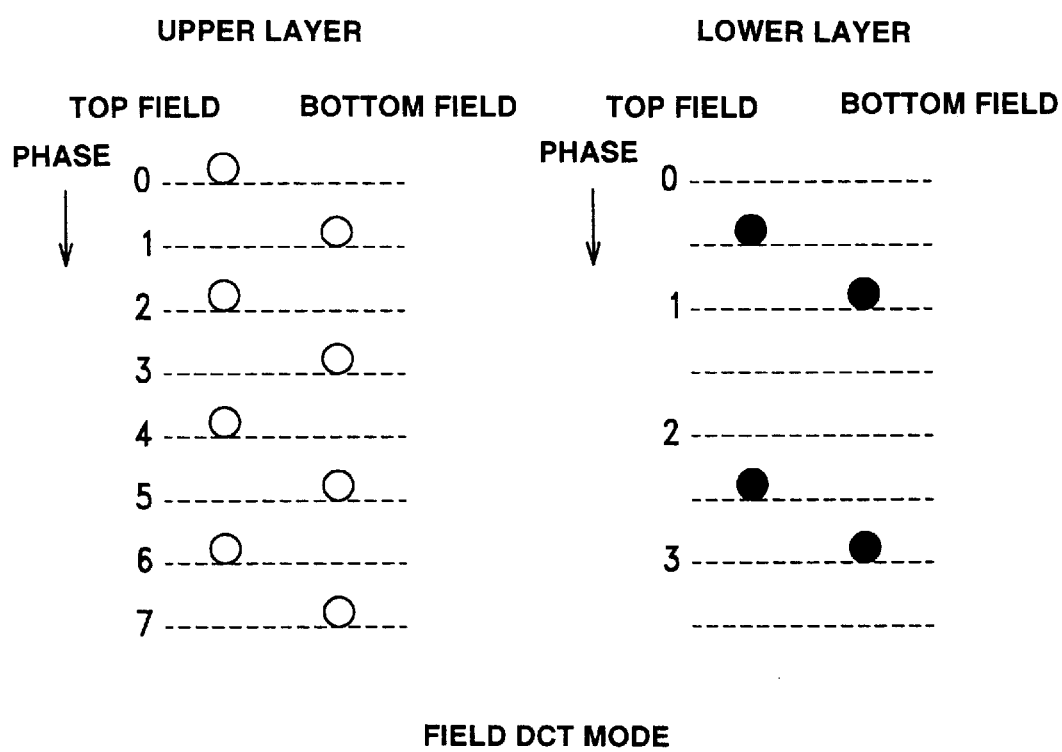
FIG. 35 illustrates the phase of a pixel obtained with the field DCT mode of the conventional picture decoding device.
Figures 36A, 36B:
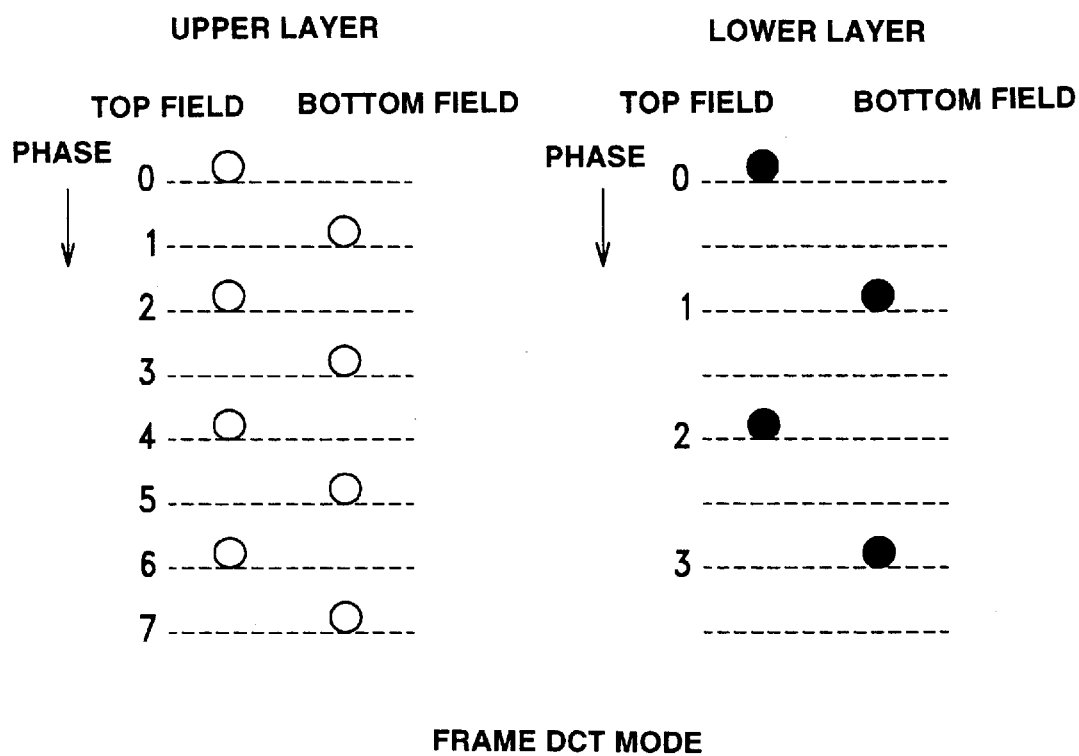
FIG. 36 illustrates the phase of a pixel obtained with the frame DCT mode of the conventional picture decoding device.

The decimating inverse discrete cosine transform unit 14 for field mode is used if the macro-block of an input bitstream is discrete cosine transformed in the field DCT mode. The decimating inverse discrete cosine transform unit 14 for field mode performs inverse discrete cosine transform only on the low-range 4×4 coefficients of the DCT block, showing 8×8 coefficients in the macro-block discrete cosine transformed in the field DCT mode, as shown in FIG. 31. That is, the decimating inverse discrete cosine transform unit 14 for field mode performs decimating inverse discrete cosine transform based on four point inverse discrete cosine coefficients in the horizontal direction and in the vertical direction. This decimating inverse discrete cosine transform unit 14 for field mode can decode the standard resolution picture, each DCT block of which is made up of 4×4 pixels, by the above-described decimating inverse discrete cosine transform. The phases of the pixels of the decoded picture data are ½, 5/2, . . . , in the per direction of the respective pixels of the top field, with the phases in the perpendicular direction of the respective pixels of the bottom field being 1, 3, . . . That is, in the top field of the decoded lower layer, the phase of the leading end pixel (pixel with the phase of ½) is intermediate between the first and second pixels (pixels with the phase 0 and the phase 2) as from the leading end of the top field of the upper layer, while the phase of the second pixel as from the leading end pixel (pixel with the phase of ⅖) is intermediate between the third and fourth pixels (pixels with the phase 4 and the phase 6) as from the leading end of the top field of the upper layer. On the other hand, in the bottom field of the decoded lower layer, the phase of the leading end pixel (pixel with the phase of 1) is intermediate between the first and second pixels (pixels with the phase 1 and the phase 3) as from the leading end of the bottom field of the upper layer, whereas the phase of the second pixel as from the leading end pixel (pixel with the phase of 3) is intermediate between the third and fourth pixels (pixels with the phase 5 and the phase 7) as from the leading end of the bottom field of the upper layer.

Figure 2:
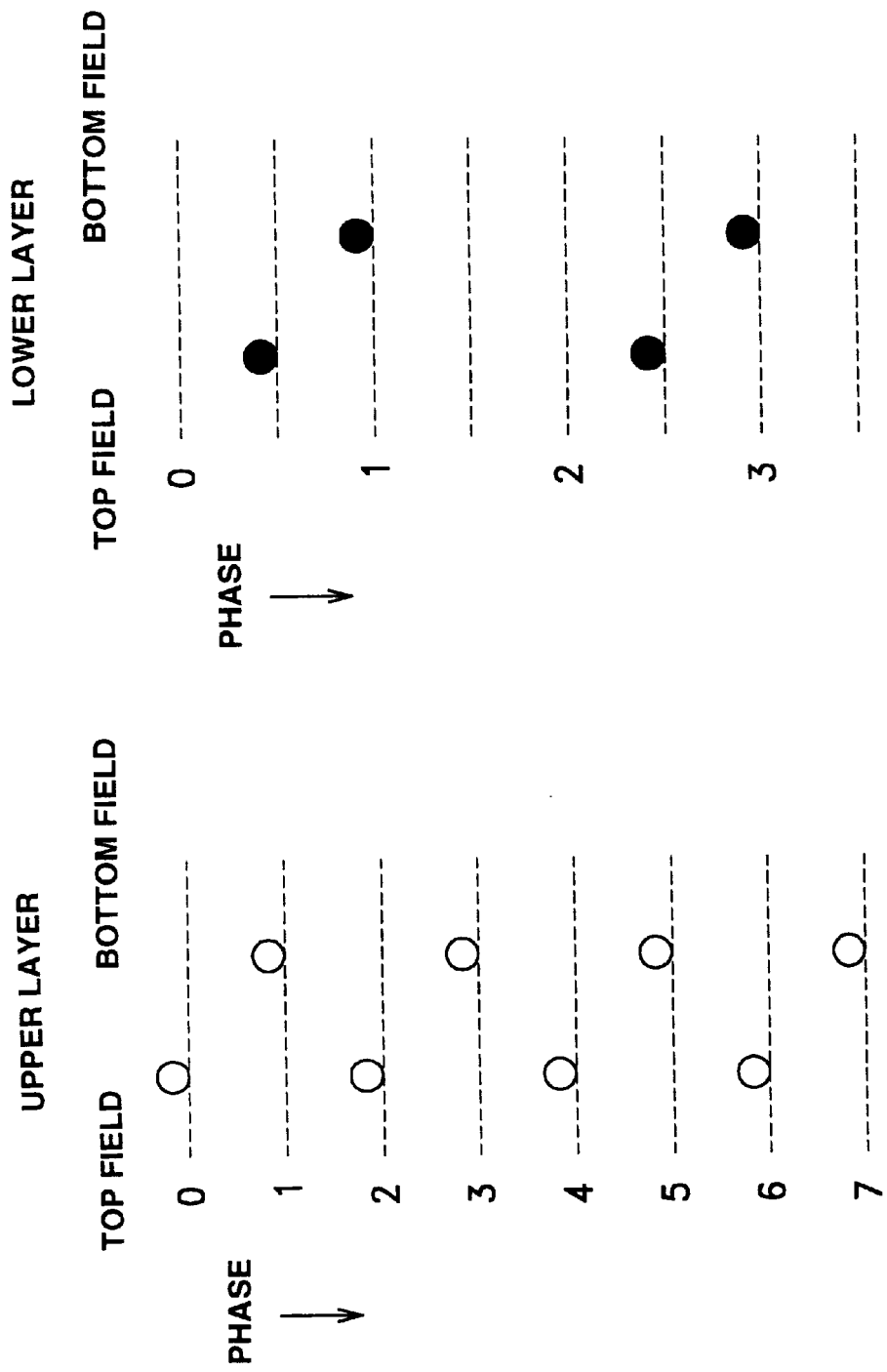
FIG. 2 illustrates the phase of pixels in the perpendicular direction of the reference picture stored in a frame memory of the picture decoding device shown in FIG. 1.

The decimating inverse discrete cosine transform unit for frame mode 15 is used when the macro-block of the input bitstream is discrete cosine transformed with the frame DCT mode. The decimating inverse discrete cosine transform unit for frame mode 15 performs decimating inverse discrete cosine transform on the DCT block showing 8×8 coefficients in the macro-block discrete cosine transformed in the frame DCT mode. The decimating inverse discrete cosine transform unit for frame mode 15 decodes the standard resolution picture, each DCT block of which is constituted by 4×4 pixels, while generating a picture of the same phase as the phase of the pixel of the standard resolution picture generated by the decimating inverse discrete cosine transform unit 14. That is, the phases in the perpendicular direction of the respective pixels of picture data decoded by the decimating inverse discrete cosine transform unit for frame mode 15 are such that the phases in the perpendicular direction of respective pixels of the top field are ½, 5/2, ..., with the phases in the perpendicular direction of the respective pixels of the bottom field being 1, 3, ..., as shown in FIG. 2.

The processing by the decimating inverse discrete cosine transform unit for frame mode 15 will be explained subsequently in detail.

If a macro-block decimating inverse discrete cosine transformed by the decimating inverse discrete cosine transform unit 14 or by the decimating inverse discrete cosine transform unit for frame mode 15 is an intra-picture, the adder 16 directly stores the intra-picture in the frame memory 17. If a macro-block decimating inverse discrete cosine transformed by the decimating inverse discrete cosine transform unit 14 or by the decimating inverse discrete cosine transform unit for frame mode 15 is an inter-picture, the adder 16 synthesizes the reference picture, motion compensated by the motion compensation unit for field mode 18 or by the motion compensation unit for frame mode 19, to the inter-picture, to store the synthesized picture in the frame memory 17.

The motion compensation unit for field mode 18 is used if the motion prediction mode for the macro-block is the field motion prediction mode. The motion compensation unit for field mode 18 performs pixel interpolation, employing orthogonal transform, on the standard resolution reference picture stored in the frame memory 17, to generate a virtual upper-order picture of the same resolution as the resolution of the high resolution picture. The motion compensation unit for field mode 18 performs motion compensation in meeting with the field motion prediction mode on the virtual upper-order picture and reduces the pixels of the motion compensated virtual upper-order picture using orthogonal transform to generate a reference picture of the standard resolution. The reference picture, motion compensated by the motion compensation unit for field mode 18, is sent to the adder 16 for synthesis to the inter-picture.

The processing by this motion compensation unit for field mode 18 will be explained subsequently in detail.

The motion compensation unit for frame mode 19 is used when the macro-block motion prediction mode is the frame motion prediction mode. The motion compensation unit for frame mode 19 performs pixel interpolation employing orthogonal transform on the reference picture of the standard resolution stored in the frame memory 17 to generate the virtual upper-order picture of the same resolution as that of the high resolution picture. The motion compensation unit for frame mode 19 performs motion compensation in meeting with the field prediction mode on the virtual upper-order picture and reduces the number of pixels of the motion compensated virtual upper-order picture using orthogonal transform to generate the reference picture of the standard resolution. The reference picture, motion compensated by the motion compensation unit for frame mode 19, is routed to the adder 16 for synthesis to the inter-picture.

The processing by the motion compensation unit for frame mode 19 will be explained subsequently in detail.

The picture frame converting dephasing correction unit 20 is fed with the standard resolution reference picture stored in the frame memory 17, or with the picture synthesized by the adder 16, and corrects the picture by post-filtering for phase deviation between the top and bottom fields, while converting the picture frame in meeting with the standard of the standard resolution television. Specifically, the picture frame converting dephasing correction unit 20 corrects the standard resolution picture, with the phases of the pixels of the top field in the perpendicular direction being ½, 5/2, ... and with the phases in the perpendicular direction of the respective pixels of the bottom field being 1, 3, ..., so that the phases in the perpendicular direction of the respective pixels of the top field will be 0, 2, 4, ... and so that the phases in the perpendicular direction of the respective pixels of the bottom field will be 1, 3, 5, ... The picture frame converting dephasing correction unit 20 also reduces the picture frame of the standard for high resolution television to ¼ for conversion to a picture frame of the standard for standard resolution television.

With the picture decoding device 10 of the first embodiment of the present invention, having the above-described structure, it is possible to decode a bitstream, obtained on picture compression of a high resolution picture by the MPEG2, and to reduce the resolution to ½, in order to output a standard resolution picture.

The processing contents of the decimating inverse discrete cosine transform unit for frame mode 15 will be explained subsequently in further detail.

Meanwhile, the decimating inverse discrete cosine transform unit for frame mode 15 is able to perform one or both of the one-block processing or the two-block processing as now explained. It is possible with the decimating inverse discrete cosine transform unit for frame mode 15 to switch between the one-block processing and the two-block processing as the occasion may demand or to perform only one of the processings.

Figure 3:
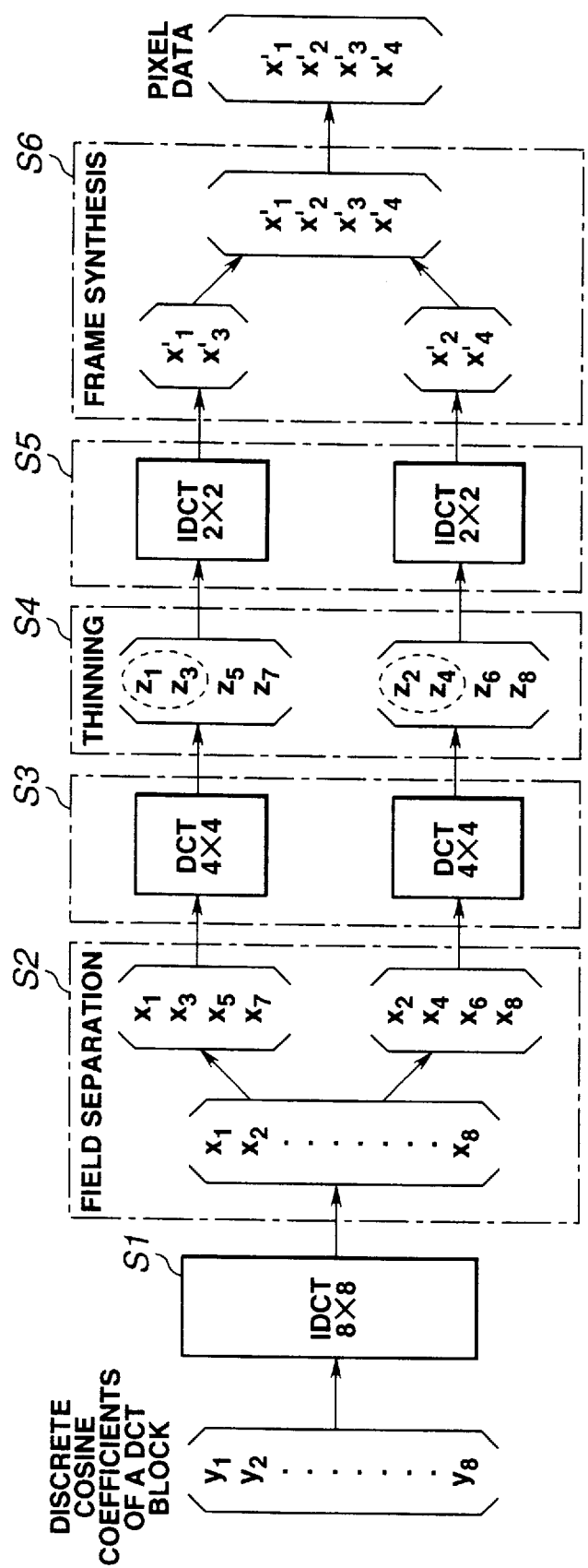
FIG. 3 illustrates the contents of processing of one block of a decimating inverse discrete cosine transform for a frame mode of a picture decoding device shown in FIG. 1.

First, the one-block processing is explained. FIG. 3 illustrates the contents of the one-block processing.

The decimating inverse discrete cosine transform unit for frame mode 15 is fed with a bitstream, obtained on compression encoding a high resolution picture, in terms of a DCT block as a unit, as shown in FIG. 3.

First, at step S1, 8×8 inverse discrete cosine transform (IDCT 8×8) is performed on the discrete cosine coefficients y of the DCT block. The coefficients in the perpendicular direction, among the totality of the discrete cosine coefficients of the DCT block, are indicated as $y_1$ to $y_8$ in the drawing. By this inverse discrete cosine transform, 8×8 decoded pixel data x are produced. It is noted that pixel data in the perpendicular direction of the totality of pixel data of the DCT block are indicated as $x_1$ to $x_8$ in the drawing.

At the next step S2, the 8×8 pixel data are retrieved alternately on the line basis in the perpendicular direction, and are separated into two pixel blocks, namely a pixel block of the 4×4 top field in meeting with the interlaced scanning and a pixel block of the 4×4 bottom field in meeting with the interlaced scanning. That is, the pixel data $x_1$ on the first line, pixel data $X_3$ on the third line, pixel data $x_5$ on the fifth line and pixel data $x_7$ on the seventh line in the vertical direction are retrieved to generate a pixel block for the top field. On the other hand, the pixel data $x_2$ on the second line, pixel data $x_4$ on the fourth line, pixel data $x_6$ on the sixth line and pixel data $x_8$ on the eighth line in the vertical direction are retrieved to generate a pixel block for the bottom field. The processing for separating pixels of a DCT block into two pixel blocks in meeting with the interlaced scanning is referred to below as field separation.

Then, at step S3, each of the two pixel blocks, resulting from field separation, is processed with 4×4 discrete cosine transform (DCT 4×4).

Next, at step S4, high-frequency components of discrete cosine coefficients of the pixel block for the top field, obtained on 4×4 discrete cosine transform, are thinned out to give a pixel block made up of 2×2 discrete cosine coefficients. It is noted that discrete cosine coefficients in the perpendicular direction, among the totality of the coefficients of the pixel block for the top field, are shown as $z_1$, $z_3$, $z_5$ and $z_7$ in the drawing. Also, high-frequency components of discrete cosine coefficients of the pixel block for the bottom field, obtained on 4×4 discrete cosine transform, are thinned out to give a pixel block made up of 2×2 discrete cosine coefficients. It is noted that discrete cosine coefficients in the perpendicular direction, among the totality of the coefficients of the pixel block for the bottom field, are shown as $z_2$, $z_4$, $z_6$ and $z_8$ in the drawing.

Then, at step S5, 2×2 inverse discrete cosine transform (IDCT 2×2) is performed on the pixel blocks, from which the discrete cosine coefficients of the high-frequency components have been thinned out. 2×2 decoded pixel data x' can be obtained on 2×2 inverse discrete cosine transform. The pixel data in the perpendicular direction, among the totality of pixel data of the pixel block of the top field are shown as $x'_1$ and $x'_3$, while the pixel data in the perpendicular direction, among the totality of pixel data of the pixel block of the bottom field, are shown as $x'_2$ and $x'_4$.

Then, at step S6, pixel data of the pixel block for the top field and pixel data of the pixel block for the bottom field are alternately synthesized along the perpendicular direction on the line basis to generate a DCT block. The processing of alternately synthesizing pixels of the two pixel blocks for the top and bottom fields along the perpendicular direction is referred to below as frame synthesis.

By performing the one-block processing, shown in the above steps S1 to S6, the decimating inverse discrete cosine transform unit for frame mode 15 is able to generate a 4×4 DCT block, constituted by pixels of the same phase as the phase of the pixels of the standard resolution picture generated by the decimating inverse discrete cosine transform unit 14, as shown in FIG. 2.

On the other hand, the decimating inverse discrete cosine transform unit for frame mode 15 performs the one-block processing from the above steps S1 to S6 using a sole matrix. Specifically, the decimating inverse discrete cosine transform unit for frame mode 15 performs matrix processing on a matrix [FS'], shown in the following equations 1:

$$[FS'] = \frac{1}{\sqrt{2}} \begin{bmatrix} A & B & D & -E & F & G & H & I \\ A & -C & -D & E & -F & -G & -H & -J \\ A & C & -D & -E & -F & G & -H & J \\ A & -B & D & E & F & -G & H & -I \end{bmatrix} \quad (1)$$

obtained on expansion computations of the above processing using the addition theorem, and on discrete cosine coefficients ($y_1$ to $y_8$) of a sole DCT block to obtain pixel data x' ($x'_1$ to $x'_4$) of the decimating inverse discrete cosine transformed DCT block.

In the above equation (1), A to J are given as follows:

$$A = \frac{1}{\sqrt{2}}$$

$$D = \frac{1}{4}$$

$$H = \frac{1}{4} + \frac{1}{2\sqrt{2}}$$

-continued $$B = \frac{\cos\frac{\pi}{16} + \cos\frac{3\pi}{16} + 3\cos\frac{5\pi}{16} - \cos\frac{7\pi}{16}}{4}$$

$$E = \frac{\cos\frac{\pi}{16} - \cos\frac{3\pi}{16} - 3\cos\frac{5\pi}{16} - \cos\frac{7\pi}{16}}{4}$$

$$I = \frac{\cos\frac{\pi}{16} - \cos\frac{3\pi}{16} + 3\cos\frac{5\pi}{16} + \cos\frac{7\pi}{16}}{4}$$

$$F = \frac{\cos\frac{\pi}{8} - \cos\frac{3\pi}{8}}{4}$$

$$C = \frac{\cos\frac{\pi}{16} - 3\cos\frac{3\pi}{16} - \cos\frac{5\pi}{16} - \cos\frac{7\pi}{16}}{4}$$

$$G = \frac{\cos\frac{\pi}{16} - 3\cos\frac{3\pi}{16} + \cos\frac{5\pi}{16} + \cos\frac{7\pi}{16}}{4}$$

$$J = \frac{\cos\frac{\pi}{16} + 3\cos\frac{3\pi}{16} - \cos\frac{5\pi}{16} + \cos\frac{7\pi}{16}}{4}$$

Figure 4:
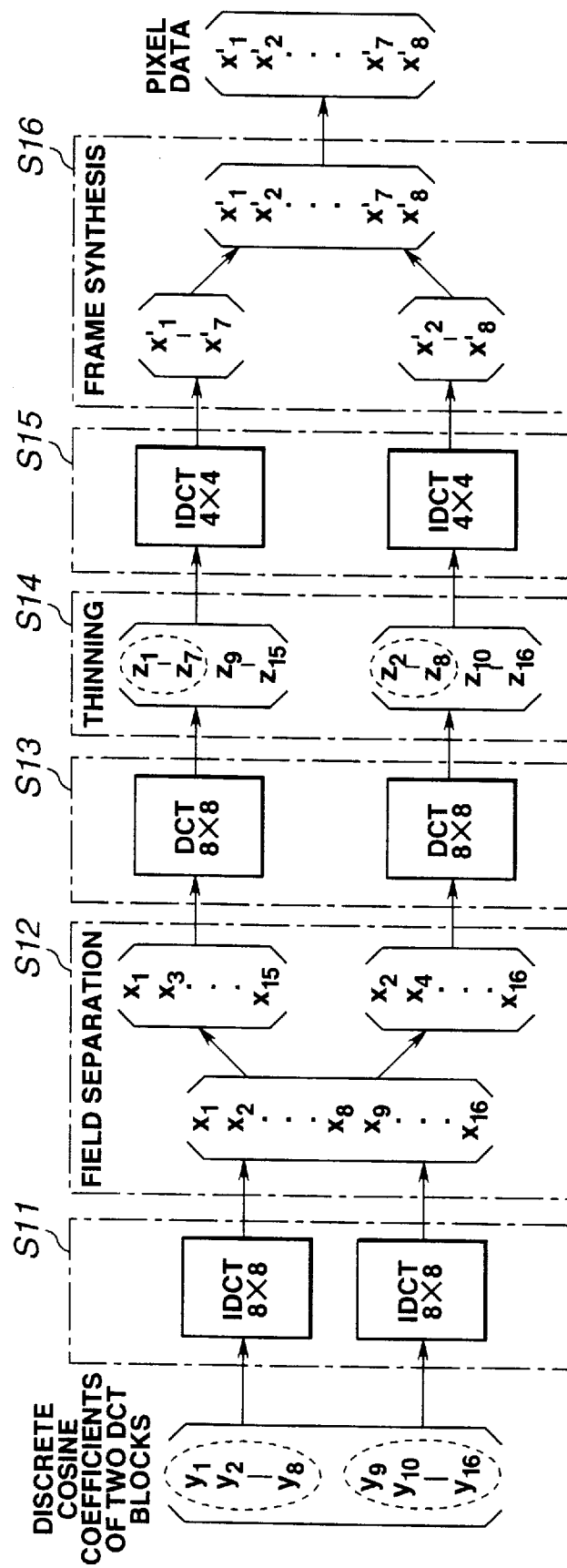
FIG. 4 illustrates the contents of processing of two blocks of a decimating inverse discrete cosine transform for a frame mode of a picture decoding device shown in FIG. 1.

The two-block processing is now explained. FIG. 4 illustrates the contents of the two-block processing.

Figure 5:
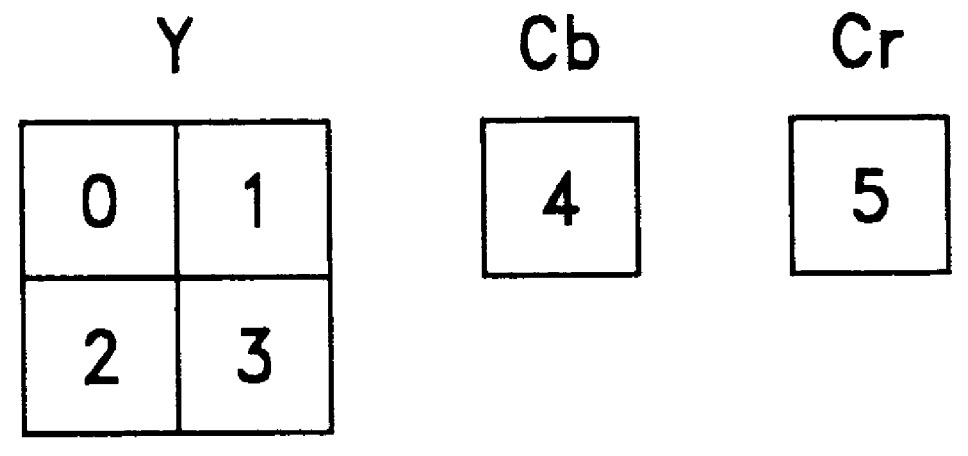

To the decimating inverse discrete cosine transform unit for frame mode 15, a bitstream obtained on compression encoding a high resolution picture is inputted in terms of two DCT blocks as a unit, as shown in FIG. 4. If, for example, a macro-block is made up of four DCT blocks of the luminance components and two DCT blocks of the chroma components, in accordance with the so-called 420 format, two DCT blocks of luminance components, neighboring to each other along the perpendicular direction, are inputted. If a macro-block is constituted as shown in FIG. 5, DCT blocks 0 and 2 of the luminance components (Y) are inputted as a pair, whilst DCT blocks 1 and 3 of the luminance components (Y) are also inputted as a pair.

First, at step S11, 8×8 inverse discrete cosine transform (IDCT 8×8) is executed independently on discrete cosine coefficients y of the two DCT blocks. The coefficients along the perpendicular direction, among the totality of the discrete cosine coefficients of the temporally previous DCT block, are indicated as $y_1$ to $Y_8$, whilst the coefficients along the perpendicular direction, among the totality of the discrete cosine coefficients of the temporally previous DCT blocks, are indicated as $y_9$ to $Y_{16}$. The inverse discrete cosine transform yields 8×8 decoded pixel data x. The pixel data along the perpendicular direction, among the totality of the pixel data of the temporally previous DCT block, are indicated as $x_1$ to $x_8$, whilst the pixel data along the perpendicular direction, among the totality of the pixel data of the temporally posterior DCT blocks, are indicated as $x_9$ to $x_{16}$.

Then, at step S12, 8×8 pixel data x of two DCT blocks are alternately retrieved on the line basis in the perpendicular direction for field separation into two blocks, namely an 8×8 pixel block of the top field for interlaced scanning and an 8×8 pixel block of the bottom field for interlaced scanning. That is, the pixel data $x_1$ on the first line, pixel data $X_3$ on the third line, pixel data $x_5$ on the fifth line and pixel data $X_7$ on the seventh line in the vertical direction are retrieved from the temporally previous DCT block, while the pixel data $x_9$ on the first line, pixel data $x_{11}$ on the second line, pixel data $x_{13}$ on the third line and pixel data $x_{15}$ on the fourth line in the vertical direction are retrieved from the temporally posterior DCT block to generate an 8×8 pixel block for the top field. On the other hand, the pixel data $x_2$ on the second line, pixel data $x_4$ on the fourth line, pixel data $x_6$ on the sixth line and pixel data $x_8$ on the eighth line in the vertical direction are retrieved from the temporally previous DCT block, while the pixel data $x_{10}$ on the second line, pixel data $x_{12}$ on the fourth line, pixel data $x_{14}$ on the sixth line and pixel data $x_{16}$ on the eighth line in the vertical direction are retrieved from the temporally posterior DCT block to generate an 8×8 pixel block for the bottom field.

Then, at step S13, 8×8 discrete cosine transform (DCT 8×8) is executed on each of the field-separated two 8×8 pixel blocks.

Then, at step S14, high-frequency components of discrete cosine coefficients z of the pixel blocks for the top field, obtained on 8×8 discrete cosine transform, are thinned out at step S14 to constitute a pixel block constituted by 4×4 discrete cosine coefficients. The discrete cosine coefficients in the perpendicular direction, among the totality of the coefficients of the pixel blocks for the top field, are indicated as $z_1$, $z_3$, $z_5$, $z_7$, $z_9$, $z_{11}$, $z_{13}$, $z_{15}$. Also, high-frequency components of discrete cosine coefficients z of the pixel blocks for the bottom field, obtained on 8×8 discrete cosine transform, are thinned out to constitute a pixel block constituted by 4×4 discrete cosine coefficients. The discrete cosine coefficients in the perpendicular direction, among the totality of the coefficients of the pixel blocks for the bottom field, are indicated as $z_2$, $z_4$, $z_6$, $z_8$, $z_{10}$, $z_{12}$, $z_{14}$, $z_{16}$.

Then, at step S15, 4×4 inverse discrete cosine transform (IDCT 4×4) is performed on each of the 4×4 pixel blocks, from which the discrete cosine coefficients of the high-frequency components have been thinned out. 2×2 decoded pixel data x' can be obtained on 2×2 inverse discrete cosine transform, to yield 4×4 decoded pixel data x'. The pixel data in the perpendicular direction, among the totality of pixel data of the pixel block of the top field, are shown as $x'_1$, $x'_3$, $x'_5$ and $x'_7$, while the pixel data in the perpendicular direction, among the totality of pixel data of the pixel block of the bottom field, are shown as $x'_2$, $x'_4$, $x'_6$ and $x'_8$.

Next, at step S16, pixel data of the pixel block for the top field and pixel data of the pixel block for the bottom field are alternately frame-synthesized on the line basis in the perpendicular direction to generate a decimating inverse discrete cosine transformed DCT block made up of 8×8 pixel data.

By executing the two-block processing as shown by the above steps S11 to S16, the decimating inverse discrete cosine transform unit for frame mode 15 is able to generate a DCT block constituted by pixels of the same phase as the phase of the pixels of the standard resolution picture generated by the decimating inverse discrete cosine transform unit 14 as shown in FIG. 2.

The decimating inverse discrete cosine transform unit for frame mode 15 also executes the two-block processing from the above step S11 up to the step S16 using a sole matrix. Specifically, the decimating inverse discrete cosine transform unit for frame mode 15 performs matrix processing on a matrix [FS"], indicated by the following equation (2):

$$[FS''] = \frac{1}{8\sqrt{2}} [A \quad B \quad C \quad D] \quad (2)$$

obtained on expansion computation of the above processing using an addition theorem, and discrete cosine coefficients y ($y_1$ to $Y_{16}$) of two DCT blocks, to obtain pixel data x' ($x'_1$ to $x'_8$) of the reducing inverse discrete cosine transformed DCT block.

In the equation (2), A to D denote the following:

A

```
4a + 3d - e + f + g   1 + a + 2b - c + d + e + 3f - g   1 + d + 2 - f + g  -2a + 2b + c - d + e + f + g
4a + 3d - e + f + g   2 - a + b - d + 3e + f + g -1 - d + e - f + g  -b + d - e - f - g
4a + d + e + f + g   -a - b + d - 3e - f - g -1 - d - 3e + f + g  -b + 2c - d + e + f + g
4a + d + e + f + g  -1 - a - 3c - d - e - 3f + g   1 + d - e - f - 3g  -2a + 2b + c + d - e - f - g
4a - d - e - f - g    a + b + d - 3e - f - g -1 + d + 3e - f - g   b - 2c - d + e + f + g
4a - d - e - f - g    1 + a + 3c - d - e - 3f + g   1 - d + e + f + 3g   2a - 2b - c + d - e - f - g
4a - 3d + e - f - g -1 - a - 2b + c + d + e + 3f - g   1 - d - e + f - g   2a - 2b - c - d + e + f + g
4a - 3d + e - f - g -2 + a - b - d + 3e + f + g -1 + d - e + f - g    b + d - e - f - g
```

B

```
 2b - 2c - d + e + f + 3g -1 + 2a + b + d - e + f + g   1 + 2a + d + e + f - g   1 + a + b - 2c + d - e + 3f + g
-2b + 2c + d - e - f - 3g -1 - 2a + 3c - d + e - f - g -1 - 2a - d - e - f - g  -a - 2b - c - d - 3e + f - g
-2b + 2c - d + e - f + g -1 - 2a + 2b - c + d - e + f + g -1 - 2a + d - e + 3f + g   2 - a + 2b + c + d + 3e - f + g
 2b - 2c + d - e + f - g   1 - 2a + b - d + e - f - g   1 + 2a + 3d - e + f + g -1 - a - b - d + e - 3f - g
-2b + 2c + d - e + f - g   1 + 2a - 2b + c + d - e + f + g -1 - 2a - d - e + 3f - g -1 - a - 2b - c + d + 3e - f + g
 2b - 2c - d + e - f + g -1 + 2a - b - d + e - f - g   1 + 2a - 3d + e - f - g   1 + a + b - d + e - 3f - g
 2b - 2c + d - e - f - 3g   1 - 2a - b + d + e - f + g   1 + 2a - d - e - f + g -1 - a - b + 2c + d - e + 3f + g
-2b + 2c - d + e + f + 3g   1 + 2a - 3c - d + e - f - g -1 - 2a + d + e + f + g   a + 2b + c - d - 3e + f - g
```

C

```
4a - 3d + e - f - g   2 - a + b + d - 3e - f - g -1 + d - e + f - g  -b - d + e + f + g
4a - 3d + e - f - g   1 + a + 2b - c - d - e - 3f + g -1 - 2a + d + e + f + g  -2a + 2b + c + d - e - f - g
4a - d + e - f - g  -1 - a - 3c + d + e + 3f - g   1 - d + e + f + 3g  -2a + 2b + c - d + e + f + g
4a - d + e - f - g  -a - b - d + 3e + f + g -1 + d - 3e - f - g  -b + 2c + d - e - f - g
4a + d + e + f + g   1 + a + 3e + d + e + 3f - g +d - e - f - 3g   2a - 2b - c - d + e + f + g
4a + d + e + f + g    a + b - d + 3e + f + g -1 - d - 3e + f + g   b - 2c + d - e - f - g
4a + 3d - e + f + g -2 + a - b + d - 3e - f - g -1 - d + e - f + g   b - d + e + f + g
4a + 3d - e + f + g -1 - a - 2b + c - d - e - 3f + g   1 + d + e - f + g   2a - 2b - c + d - e - f - g
```

-continued

D $-2b + 2c - d + e + f + 3g$  $-1 - 2a + 3c + d - e + f + g$  $-1 - 2a + d + e + f + g$  $-a - 2b + c + d + e3 - f + g$
 $2b - 2c + d - e - f - 3g$  $-1 + 2a + b - d + e - f - g$  $1 + 2a - d - e - f + g$  $1 + a + 2c - d + e - 3f - g$
 $2b - 2c - d + e - f + g$  $1 - 2a + b + d - e + f + g$  $1 + 2a - 3d + e - f - g$  $-1 - a - b + d - e + 3f + g$
$-2b + 2c + d - e + f - g$  $-1 - 2a + 2b - c - d + e - f - g$  $-1 - 2a - d + e + 3f - g$  $2 - a + 2b + c - d - 3e + f - g$
 $2b - 2c + d - e + f - g$  $-1 + 2a - b + d - e + f + g$  $1 + 2a + 3d - e + f + g$  $1 + a + b + d + 3f + g$
$-2b + 2c - d + e - f + g$  $1 + 2a - 2b + c - d + e - f - g$  $-1 - 2a + d - e - 3f + g$  $-2 + a - 2b - c - d - 3e + f - g$
$-2b + 2c + d - e - f - 3g$  $1 + 2a - 3c + d - e + f + g$  $-1 - 2a - d - e - f - g$  $a + 2b + c + d + 3e - f + g$
 $2b - 2c - d + e + f + 3g$  $1 - 2a - b - d + e - f - g$  $1 + 2a + d + e + f - g$  $-1 - a - b + 2c - d + e - 3f - g$

In the above equation (2), a to g are defined as follows:

$$a = \cos\frac{\pi}{4}$$
$$b = \cos\frac{\pi}{8}$$
$$c = \cos\frac{3\pi}{8}$$
$$d = \cos\frac{\pi}{16}$$
$$e = \cos\frac{3\pi}{16}$$
$$f = \cos\frac{5\pi}{16}$$
$$g = \cos\frac{7\pi}{16}$$

If, in the decimating inverse discrete cosine transform unit for frame mode 15, a so-called 420-format macro-block shown in FIG. 5 is inputted, two-block processing as indicated by the above steps S11 to S16 is executed on the luminance components by way of performing a decimating inverse discrete cosine transform, while one-block processing as indicated by the above steps S1 to S6 is executed on the chroma components by way of performing a decimating inverse discrete cosine transform.

The processing contents of the motion compensation unit for field mode 18 and motion compensation unit for frame mode 19 are explained in further detail.

Figure 6:
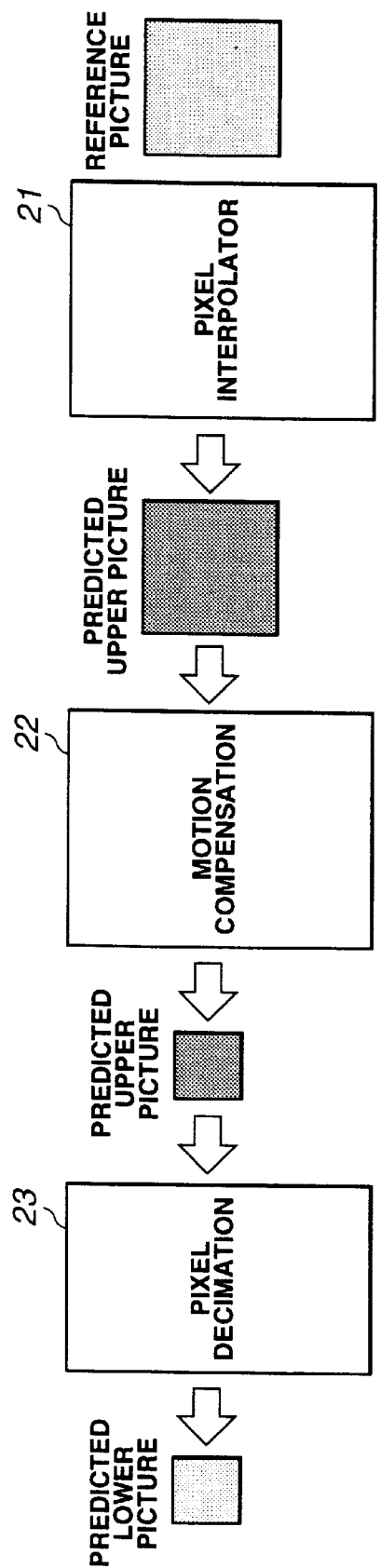
FIG. 6 is a block diagram of a motion compensation device for a field mode and a motion compensation device for a frame mode of the picture decoding device shown in FIG. 1.

Referring to FIG. 6, each of the motion compensation unit for field mode 18 and the motion compensation unit for frame mode 19 includes a pixel interpolator 21 for performing pixel interpolation employing discrete cosine transform on a reference picture stored in the frame memory 17 to generate a virtual upper-order picture, a motion compensation unit 22 for motion-compensating this virtual upper-order picture to generate a predicted upper-order picture and a pixel resolution reducing unit 23 performing pixel decimating processing employing discrete cosine transform on the motion-compensated predicted upper-order picture for generating a predicted lower-order picture.

The pixel interpolator 21 is fed from the frame memory 17 with reference picture data of the standard resolution. In the reference picture data, the phases along the vertical direction of the respective pixels of the top field are ½, 5/2, . . . , with the phases along the perpendicular direction of the respective pixels of the bottom field being 1, 3, . . . The pixel interpolator 21 performs pixel interpolation on the reference picture of the standard resolution, using the discrete cosine transform, for conversion to a high resolution picture. The picture processed with pixel interpolation by this pixel interpolator 21 is termed the virtual upper-order picture.

The motion compensation unit 22 motion-compensates the virtual upper-order picture processed with pixel interpolation by the pixel interpolator 21. The motion compensation unit 22 effects motion compensation, using a motion vector contained in the input bitstream to the picture decoding device 10, to the ½ pixel precision. The high resolution picture, motion-compensated by the motion compensation unit 22, is termed the predicted upper-order picture.

The pixel resolution reducing unit 23 reduces the resolution of the high-resolution predicted upper-order picture, motion-compensated by the motion compensation unit 22, using the discrete cosine transform, for conversion to a standard resolution picture. In the picture data of the standard resolution, pixel-decimated by the pixel resolution reducing unit 23, the phases along the vertical direction of the respective pixels of the top field are ½, 5/2, . . . , with the phases along the perpendicular direction of the respective pixels of the bottom field being 1, 3, . . . The standard resolution picture, pixel-decimated by the pixel resolution reducing unit 23, is termed the predicted lower-order picture.

The motion compensation unit for field mode 18 and the motion compensation unit for frame mode 19 route the generated predicted lower-order picture to the addition unit 16.

The above-described pixel interpolation and picture-reducing processing, described above, is executed using matrix coefficients in meeting with the field motion prediction mode and the frame motion prediction mode.

The matrix coefficients, processed by the pixel interpolator 21 and the pixel resolution reducing unit 23, are explained.

First, the matrix used by the pixel interpolator 21 of the motion compensation unit for field mode 18 when processing the pixels along the horizontal direction of the reference picture data stored in the frame memory 17, that is the matrix for generating the virtual upper-order picture by pixel interpolation on the pixels along the horizontal direction of the reference picture at the time of motion compensation in the field motion predictive mode, is as represented by the following equation (3):

$$\text{virtual upper picture} \begin{bmatrix} x_0 \\ x_1 \\ x_2 \\ x_3 \\ x_4 \\ x_5 \\ x_6 \\ x_7 \end{bmatrix} = [IDCT8] \cdot [0 \; pad] \cdot [DCT4] \cdot \begin{bmatrix} x_0 \\ x_1 \\ x_2 \\ x_3 \end{bmatrix}^{\text{reference picture}} = \quad (3)$$

-continued $$[\text{pixel interpolation}] \cdot \begin{bmatrix} x_0 \\ x_1 \\ x_2 \\ x_3 \end{bmatrix} \quad \text{reference picture}.$$

The above matrix [DCT4] represents four-point discrete cosine coefficients and is used for discrete cosine transforming a reference picture of a standard resolution stored in the frame memory 17 in terms of 4×4 pixels as a unit. The specified coefficients are shown in the following equation (4):

$$[DCT4] = \frac{1}{\sqrt{2}} \begin{bmatrix} \cos(\pi/4) & \cos(\pi/4) & \cos(\pi/4) & \cos(\pi/4) \\ \cos(\pi/8) & \cos(3\pi/8) & -\cos(3\pi/8) & -\cos(\pi/8) \\ \cos(\pi/4) & -\cos(\pi/4) & -\cos(\pi/4) & \cos(\pi/4) \\ \cos(3\pi/8) & \cos(\pi/8) & \cos(\pi/8) & -\cos(3\pi/8) \end{bmatrix}. \quad (4)$$

The above matrix [0pad] is used for generating 8×8 discrete cosine coefficients by adding 0s at four high frequency range points in the horizontal and vertical directions to the 4×4 discrete cosine coefficients obtained on processing the matrix [DCT4]. That is, high frequency range coefficients are interpolated to the DCT block including 4×4 discrete cosine coefficients in meeting with the standard resolution for conversion to a DCT block containing 8×8 discrete cosine coefficients in meeting with the high resolution picture. The specified coefficients are as indicated in the following equation (5):

$$[0\ pad] = \sqrt{2} \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix}. \quad (5)$$

The above matrix [IDCT8] represents 8-point inverse discrete cosine transform for obtaining 8×8 pixels from 8×8 discrete cosine coefficients obtained on processing the above matrix [0pad]. Meanwhile, this matrix [IDCT8] is normalized by multiplying the respective coefficients with $\sqrt{2}$. The specified coefficients are indicated by the following equation (6):

$$[IDCT8] = \frac{1}{2} \begin{bmatrix} \cos(\pi/4) & \cos(\pi/16) & \cos(\pi/8) & \cos(3\pi/16) & \cos(\pi/4) & \cos(5\pi/16) & \cos(3\pi/8) & \cos(7\pi/16) \\ \cos(\pi/4) & \cos(3\pi/16) & \cos(3\pi/8) & -\cos(7\pi/16) & -\cos(\pi/4) & -\cos(\pi/16) & -\cos(\pi/8) & -\cos(5\pi/16) \\ \cos(\pi/4) & \cos(5\pi/16) & -\cos(3\pi/8) & -\cos(\pi/16) & -\cos(\pi/4) & \cos(7\pi/16) & \cos(\pi/8) & \cos(3\pi/16) \\ \cos(\pi/4) & \cos(7\pi/16) & -\cos(\pi/8) & -\cos(5\pi/16) & \cos(\pi/4) & \cos(3\pi/16) & -\cos(3\pi/8) & -\cos(\pi/16) \\ \cos(\pi/4) & -\cos(7\pi/16) & -\cos(\pi/8) & \cos(5\pi/16) & \cos(\pi/4) & -\cos(3\pi/16) & -\cos(3\pi/8) & \cos(\pi/16) \\ \cos(\pi/4) & -\cos(5\pi/16) & -\cos(3\pi/8) & \cos(\pi/16) & -\cos(\pi/4) & -\cos(7\pi/16) & \cos(\pi/8) & -\cos(3\pi/16) \\ \cos(\pi/4) & -\cos(3\pi/16) & \cos(3\pi/8) & \cos(7\pi/16) & -\cos(\pi/4) & \cos(\pi/16) & -\cos(\pi/8) & \cos(5\pi/16) \\ \cos(\pi/4) & -\cos(\pi/16) & \cos(3\pi/8) & -\cos(3\pi/16) & \cos(\pi/4) & -\cos(5\pi/16) & \cos(3\pi/8) & -\cos(7\pi/16) \end{bmatrix}. \quad (6)$$

By pixel-interpolating a reference picture of a standard resolution, using the above matrix, it becomes possible to obtain a virtual upper-order picture, which is a high resolution picture converted from the reference picture, in the field motion prediction mode. The motion compensation unit 22 motion-compensates the virtual upper-order picture to generate a predicted upper-order picture. The processing speed can be enhanced if the matrices [DCT4], [0pad] and [IDCT8] into one matrix [pixel interpolation].

Meanwhile, the matrix which the pixel interpolator 21 of the motion compensation unit for field mode 18 uses in processing the pixels along the vertical direction of the reference picture data stored in the frame memory 17, that is the matrix used for generating the virtual upper-order picture by pixel interpolation performed on the pixels in the perpendicular direction of the reference picture at the time of motion compensation in the field motion prediction mode, is the same as the equation (3). The processing along the perpendicular direction is executed for the respective fields, that is, for each of the top and bottom fields independently.

The matrix used by the pixel resolution reducing unit 23 of the motion compensation unit for field mode 18 in processing the pixels along the horizontal direction of the predicted upper-order picture, motion-compensated by the motion compensation unit 23, that is the matrix used in decimating the pixels along the horizontal direction of the predicted upper-order picture at the time of motion compensation in the field motion prediction mode for generating the predicted lower-order picture, is as shown by the following equation (7):

$$\begin{bmatrix} P_0 \\ P_1 \\ P_2 \\ P_3 \end{bmatrix} \text{predicted lower picture} = [IDCT4] \cdot \qquad (7)$$

$$[\text{low range thinning}] \cdot [DCT8] \cdot \begin{bmatrix} P_0 \\ P_1 \\ P_2 \\ P_3 \\ P_4 \\ P_5 \\ P_6 \\ P_7 \end{bmatrix} \text{predicted upper picture} =$$

-continued $$[\text{pixel decimation}] \cdot \begin{bmatrix} P_0 \\ P_1 \\ P_2 \\ P_3 \\ P_4 \\ P_5 \\ P_6 \\ P_7 \end{bmatrix} \text{predicted upper picture}$$

The matrix [DCT8] represents the eight-point discrete cosine coefficients and is used in discrete cosine transforming the predicted upper-order picture, motion-compensated by the motion compensation unit 22, in terms of 8×8 pixels as a unit. The specified coefficients are as shown in the following equation (8):

$$[DCT8] = \frac{1}{2} \begin{bmatrix} \cos(\pi/4) & \cos(\pi/4) & \cos(\pi/4) & \cos(\pi/4) & \cos(\pi/4) & \cos(\pi/4) & \cos(\pi/4) & \cos(\pi/4) \\ \cos(\pi/16) & \cos(3\pi/16) & \cos(5\pi/16) & \cos(7\pi/16) & -\cos(7\pi/16) & -\cos(5\pi/16) & -\cos(3\pi/16) & -\cos(\pi/16) \\ \cos(\pi/8) & \cos(3\pi/8) & -\cos(3\pi/8) & -\cos(\pi/8) & -\cos(\pi/8) & -\cos(3\pi/8) & \cos(3\pi/8) & \cos(\pi/8) \\ \cos(3\pi/16) & -\cos(7\pi/16) & -\cos(\pi/16) & -\cos(5\pi/16) & \cos(5\pi/16) & \cos(\pi/16) & \cos(7\pi/16) & -\cos(3\pi/16) \\ \cos(\pi/4) & -\cos(\pi/4) & -\cos(\pi/4) & \cos(\pi/4) & \cos(\pi/4) & -\cos(\pi/4) & -\cos(\pi/4) & \cos(\pi/4) \\ \cos(5\pi/16) & -\cos(\pi/16) & \cos(7\pi/16) & \cos(5\pi/16) & \cos(3\pi/16) & -\cos(7\pi/16) & \cos(\pi/16) & -\cos(5\pi/16) \\ \cos(3\pi/8) & -\cos(\pi/8) & \cos(\pi/8) & -\cos(3\pi/8) & -\cos(3\pi/8) & \cos(\pi/8) & -\cos(\pi/8) & \cos(3\pi/8) \\ \cos(\pi/16) & -\cos(5\pi/16) & \cos(3\pi/16) & -\cos(\pi/16) & -\cos(\pi/16) & -\cos(3\pi/16) & \cos(5\pi/8) & -\cos(7\pi/16) \end{bmatrix} \quad (8)$$

The above matrix [low range decimation] is used for removing coefficients of four high-range points along the horizontal and vertical directions from the 8×8 discrete cosine coefficients obtained on computing the matrix [DCT8] to generate 4×4 discrete cosine coefficients only of the low-frequency components. That is, in order to provide a DCT block composed only of low-frequency components from the DCT block containing 8×8 discrete cosine coefficients for coping with the high resolution picture, the coefficients are thinned out to convert the DCT block into a DCT block containing 4×4 discrete cosine coefficients for coping with the standard resolution picture. The specified coefficients are as shown in the following equation (9):

$$[\text{low range decimation}] = \frac{1}{\sqrt{2}} \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \end{bmatrix} \quad (9)$$

The above matrix [IDCT4] represents four-point inverse discrete cosine coefficients used for obtaining 4×4 pixels from the 4×4 discrete cosine coefficients obtained on computing the matrix [low range decimation]. It is noted that the matrix [low range decimation] has been normalized by multiplying the respective coefficients with $1/\sqrt{2}$. The specified coefficients are as shown in the following equation (10):

$$[DCT4] = \frac{1}{\sqrt{2}} \begin{bmatrix} \cos(\pi/4) & \cos(\pi/4) & \cos(\pi/4) & \cos(3\pi/8) \\ \cos(\pi/4) & \cos(3\pi/8) & -\cos(\pi/4) & -\cos(\pi/8) \\ \cos(\pi/4) & -\cos(3\pi/8) & -\cos(\pi/4) & \cos(\pi/8) \\ \cos(\pi/4) & -\cos(\pi/8) & \cos(\pi/4) & -\cos(3\pi/8) \end{bmatrix} \quad (10)$$

By reducing the pixel resolution of the predicted upper-order picture of high resolution, it is possible to obtain a predicted lower-order picture, which is the standard resolution picture converted from the predicted upper-order picture in the field motion prediction mode. The processing speed can be enhanced if the matrices [DCT8], [low range decimation] and [IDCT4] into one matrix [pixel decimation].

Meanwhile, the matrix which the pixel resolution reducing unit 23 of the motion compensation unit for field mode 18 uses in processing the pixels along the vertical direction of the of the predicted upper-order picture, motion-compensated by the motion compensation unit 22, that is the matrix used for generating the predicted upper-order picture by pixel decimation performed on the pixels in the perpendicular direction of the predicted upper-order picture at the time of motion compensation in the field motion prediction mode, is the same as the equation (7). The processing along the perpendicular direction is executed for the respective fields, that is, for each of the top and bottom fields independently.

Meanwhile, the matrix which the pixel interpolator 21 of the motion compensation unit for frame mode 19 used in processing the pixels along the horizontal direction of the reference picture data stored in the frame memory 17, that is the matrix used for generating the virtual upper-order picture by pixel interpolation performed on the pixels in the horizontal direction of the reference picture at the time of motion compensation in the frame motion prediction mode, is the same as the equation (3).

Meanwhile, the matrix which the pixel interpolator 21 of the motion compensation unit for frame mode 19 uses in processing the pixels along the horizontal direction of the reference picture data stored in the frame memory 17, that is the matrix used for generating the virtual upper-order picture by pixel interpolation performed on the pixels in the vertical direction of the reference picture at the time of motion compensation in the frame motion prediction mode, is as shown in the following equation (11).

$$\begin{bmatrix} x_0 \\ x_1 \\ x_2 \\ x_3 \\ x_4 \\ x_5 \\ x_6 \\ x_7 \end{bmatrix} \text{virtual upper picture} = [IDCT4\ fs] \cdot [0\ pad] \cdot [DCT2\ fs] \cdot \begin{bmatrix} x_0 \\ x_1 \\ x_2 \\ x_3 \end{bmatrix} \text{reference picture} = \quad (11)$$

$$[\text{pixel information } fs] \cdot \begin{bmatrix} x_0 \\ x_1 \\ x_2 \\ x_3 \end{bmatrix} \text{reference picture}.$$

The above matrix [DCT2fs] represents the field separation type two-point discrete cosine coefficients and is used in applying 2×2 pixel based discrete cosine transform independently on each of the top and bottom fields, separated from the standard resolution reference picture stored in the frame memory 17. The specified coefficients are as shown in the following equation (12):

$$[DCT2fs] = \begin{bmatrix} \cos(\pi/4) & 0 & \cos(\pi/4) & 0 \\ 0 & \cos(\pi/4) & 0 & \cos(\pi/4) \\ \cos(\pi/4) & 0 & -\cos(\pi/4) & 0 \\ 0 & \cos(\pi/4) & 0 & -\cos(\pi/4) \end{bmatrix}. \quad (12)$$

The above matrix [0pad] is used for generating 4×4 discrete cosine coefficients by adding 0s at four high frequency range points in the horizontal and vertical directions to the 4×4 discrete cosine coefficients obtained on processing the matrix [DCT4]. That is, high frequency range coefficients are interpolated to the DCT block including 4×4 discrete cosine coefficients in meeting with the standard resolution for conversion to a DCT block containing 8×8 discrete cosine coefficients in meeting with the high resolution picture. The specified coefficients are as indicated in the above equation (5).

The matrix [IDCT4fs] represents the field separation type four-point discrete cosine coefficients for obtaining 8×8 pixels from the 8×8 discrete cosine coefficients resulting from computation of the matrix [0pad]. This matrix [IDCT4fs] is used for separating the 8×8 discrete cosine coefficients into 4×4 coefficients associated with the top and bottom fields on each of which the 4×4 discrete cosine transform is applied independently. It is noted that the matrix [low range decimation] has been normalized by multiplying the respective coefficients with $1/\sqrt{2}$. The specified coefficients are as shown in the following equation (13):

$$[IDCT4\ fs] = \frac{1}{\sqrt{2}} \begin{bmatrix} \cos(\pi/4) & 0 & \cos(\pi/8) & 0 & \cos(\pi/4) & 0 & \cos(3\pi/8) & 0 \\ 0 & \cos(\pi/4) & 0 & \cos(\pi/8) & 0 & \cos(\pi/4) & 0 & \cos(3\pi/8) \\ \cos(\pi/4) & 0 & \cos(3\pi/8) & 0 & -\cos(\pi/4) & 0 & -\cos(\pi/8) & 0 \\ 0 & \cos(\pi/4) & 0 & \cos(3\pi/8) & 0 & -\cos(\pi/4) & 0 & -\cos(\pi/8) \\ \cos(\pi/4) & 0 & -\cos(3\pi/8) & 0 & -\cos(\pi/4) & 0 & \cos(\pi/8) & 0 \\ 0 & \cos(\pi/4) & 0 & -\cos(3\pi/8) & 0 & -\cos(\pi/4) & 0 & \cos(\pi/8) \\ \cos(\pi/4) & 0 & -\cos(\pi/8) & 0 & \cos(\pi/4) & 0 & -\cos(3\pi/8) & 0 \\ 0 & \cos(\pi/4) & 0 & -\cos(\pi/8) & 0 & \cos(\pi/4) & 0 & -\cos(3\pi/8) \end{bmatrix}. \quad (13)$$

By applying pixel interpolation to the reference picture of high resolution, it is possible to obtain a predicted upper-order picture, which is the high resolution picture converted from the reference picture. The motion compensation unit 22 motion-compensates the virtual upper-order picture to generate a predicted upper-order picture. The processing speed can be enhanced if the matrices [DCT2fs], [0pad] and [IDCT4fs] are assembled into one matrix [pixel interpolation fs].

Meanwhile, the matrix which the pixel resolution reducing unit 23 of the motion compensation unit for frame mode 19 uses in processing the pixels along the horizontal direction of the predicted upper-order picture, motion-compensated by the motion compensation unit 22, that is the matrix used for generating the predicted lower-order picture by pixel resolution reduction performed on the pixels in the horizontal direction of the predicted upper-order picture at the time of motion compensation in the field motion prediction mode, is the same as the equation (3).

The matrix which the pixel resolution reducing unit 23 of the motion compensation unit for frame mode 19 uses in processing the pixels along the vertical direction of the of the predicted upper-order picture, motion-compensated by the motion compensation unit 22, that is the matrix used for generating the predicted upper-order picture by pixel resolution reduction performed on the pixels in the perpendicular direction of the predicted upper-order picture at the time of motion compensation in the frame motion prediction mode, is the same as the following equation (14): lower-order picture, is as shown by the following equation (7):

$$\begin{bmatrix} P_0 \\ P_1 \\ P_2 \\ P_3 \end{bmatrix} \text{predicted lower picture} = [IDCT2\ fs] \cdot [\text{low range thinning}] \cdot [DCT4\ fs] \cdot \quad (14)$$

$$\begin{bmatrix} P_0 \\ P_1 \\ P_2 \\ P_3 \\ P_4 \\ P_5 \\ P_6 \\ P_7 \end{bmatrix} \text{predictive upper picture} = [\text{pixel decimation } fs] \cdot \begin{bmatrix} P_0 \\ P_1 \\ P_2 \\ P_3 \\ P_4 \\ P_5 \\ P_6 \\ P_7 \end{bmatrix} \text{predictive upper picture}.$$

The above matrix [DCT4fs] represents the field separation type four-point discrete cosine coefficients and is used in applying 4×4 pixel based discrete cosine transform independently on each of the top and bottom fields, separated from the predicted upper-order picture processed by the motion compensation unit 22. The specified coefficients are as shown in the following equation (15): as shown in the following equation (13):

$$[IDCT4fs] = \frac{1}{\sqrt{2}} \quad (15)$$

$$\begin{bmatrix} \cos(\pi/4) & 0 & \cos(\pi/4) & 0 & \cos(\pi/4) & 0 & \cos(\pi/4) & 0 \\ 0 & \cos(\pi/4) & 0 & \cos(\pi/4) & 0 & \cos(\pi/4) & 0 & \cos(\pi/4) \\ \cos(\pi/8) & 0 & \cos(3\pi/8) & 0 & -\cos(3\pi/8) & 0 & -\cos(\pi/8) & 0 \\ 0 & \cos(\pi/8) & 0 & \cos(3\pi/8) & 0 & -\cos(3\pi/8) & 0 & -\cos(\pi/8) \\ \cos(\pi/4) & 0 & -\cos(\pi/4) & 0 & -\cos(\pi/4) & 0 & \cos(\pi/4) & 0 \\ 0 & \cos(\pi/4) & 0 & -\cos(\pi/4) & 0 & -\cos(\pi/4) & 0 & \cos(\pi/4) \\ \cos(3\pi/8) & 0 & \cos(\pi/8) & 0 & \cos(\pi/8) & 0 & -\cos(3\pi/8) & 0 \\ 0 & \cos(3\pi/8) & 0 & \cos(\pi/8) & 0 & \cos(\pi/8) & 0 & -\cos(\pi/8) \end{bmatrix}$$

The above matrix [low range decimation] is used for removing four high-range points in the horizontal and vertical directions from the 8×8 discrete cosine coefficients resulting from the computation of the matrix [DCT4fs] to generate 4×4 discrete cosine coefficients composed only of low-frequency components. That is, in order to provide a DCT block composed only of low-frequency components from the DCT block containing 8×8 discrete cosine coefficients for coping with the high resolution picture, the coefficients are thinned out to convert the DCT block into a DCT block containing 4×4 discrete cosine coefficients for coping with the standard resolution picture. The specified coefficients are as shown in the above equation (9).

The matrix [IDCT2fs] represents the field separation type four-point discrete cosine coefficients for obtaining 4×4 pixels from the 4×4 discrete cosine coefficients resulting from computation of the matrix [low range decimation]. This matrix [IDCT2fs] is used for separating the 4×4 discrete cosine coefficients into 2×2 coefficients associated with the top and bottom fields on each of which the 2×2 discrete cosine transform is applied independently. It is noted that the matrix [IDCT2fs] has been normalized by multiplying the respective coefficients with $1/\sqrt{2}$. The specified coefficients are as shown in the following equation (16):

$$[IDCT2fs] = \begin{bmatrix} \cos(\pi/4) & 0 & \cos(\pi/4) & 0 \\ 0 & \cos(\pi/4) & 0 & \cos(\pi/4) \\ \cos(\pi/4) & 0 & -\cos(\pi/4) & 0 \\ 0 & \cos(\pi/4) & 0 & -\cos(\pi/4) \end{bmatrix} \quad (16)$$

By decimating the pixels of the predicted upper-order picture of high resolution, it is possible to obtain a predicted lower-order picture, which is the standard resolution picture converted from the predicted upper-order picture. The processing speed can be enhanced if the matrices [DCT4fs], [low range decimation] and [IDCT2fs] are assembled into one matrix [pixel resolution reduction fs].

With the picture decoding device 10 of the first embodiment of the present invention, 4×4 decimating inverse discrete cosine transform is applied to each of the top field and the bottom field in the field DCT mode to decode the standard resolution picture. In the frame DCT mode, a standard resolution picture is decoded on frame separation and decimating inverse discrete cosine transform. With the present picture decoding device 10, in which different processing is performed for the field DCT mode and the frame DCT mode, the interlacing character proper to the picture obtained on interlaced scanning is not degraded. In addition, the picture decoded in the field DCT mode can be rendered equal in phase to that decoded in the frame DCT mode, while the output picture is not deteriorated in picture quality.

Also, in the present first picture decoding device 10, in which picture interpolation is performed using the discrete cosine transform at the time of motion compensation, dephasing is not produced in the virtual upper-order picture even if such dephasing is produced between pixels of the top and bottom fields in the frame memory 17. Therefore, non-dephased picture can be motion-compensated and hence the picture quality is not degraded due to motion compensation to enable the standard resolution picture of high picture quality to be produced. In the picture decoding device 10, in which the discrete cosine transform is applied at the time of motion compensation, it is possible to output a picture of the same phase as that of the picture outputted by the resolution-reducing inverse discrete cosine transform unit 14 and the resolution-reducing inverse discrete cosine transform unit for frame mode 15. Therefore, non-dephased picture can be motion-compensated and hence the picture quality is not degraded due to motion compensation to enable the standard resolution picture of high picture quality to be produced.

Also, in the present first picture decoding device 10, the number of points of discrete cosine transform in the pixel interpolation and pixel decimation at the time of motion compensation is reversible, so that the frequency response by a filter is deteriorated to a lesser extent than in the event of pixel interpolation using a half-band filter. The pixels of the reference frame are closed in the DCT block so that there is no risk of deterioration of picture quality such as block distortion.

Meanwhile, in the picture decoding device 10, decimating inverse discrete cosine transform by the decimating inverse discrete cosine transform unit 14, decimating inverse discrete cosine transform by one-block processing at steps S1 to S6 of the decimating inverse discrete cosine transform unit for frame mode 15 and the discrete cosine transform by the notion compensation unit for field mode 18 and the motion compensation unit for frame mode 19 can be executed using a high-speed algorithm.

For example, the processing speed can be enhanced by employing the Wang algorithm (Zhong DE Wang., "Fast Algorithms for the Discrete W Transform and for the Discrete Fourier Transform", IEEE Tr. ASSP-32, No.4, predicted upper-order picture.803 to 816, August. 1984).

The matrix used by the decimating inverse discrete cosine transform unit 14 for processing may be resolved by the Wang algorithm as indicated by the following equation (17):

$$[C_d^{II}]^{-1} = [C_d^{III}] = \frac{1}{\sqrt{2}} \begin{bmatrix} 1 & 0 & 0 & 1 \\ 0 & 1 & 1 & 0 \\ 0 & 1 & -1 & 0 \\ 1 & 0 & 0 & -1 \end{bmatrix} \begin{bmatrix} C_2^{III} & \\ & \overline{C}_2^{IV} \end{bmatrix} \begin{bmatrix} 1 & 0 & 0 & 1 \\ 0 & 0 & 1 & 0 \\ 0 & 0 & 0 & 1 \\ 0 & 1 & 0 & 0 \end{bmatrix} \quad (17)$$

$$[C_2^{III}] = [C_d^{II}]^T = \begin{bmatrix} \frac{1}{\sqrt{2}} & \frac{1}{\sqrt{2}} \\ \frac{1}{\sqrt{2}} & -\frac{1}{\sqrt{2}} \end{bmatrix} = \frac{1}{\sqrt{2}} \begin{bmatrix} 1 & 1 \\ 1 & -1 \end{bmatrix} \quad C_r = \cos(r\pi)$$

$$[\overline{C}_2^{IV}] \begin{bmatrix} -\frac{C_1}{8} & \frac{C_9}{8} \\ \frac{C_9}{8} & \frac{C_1}{8} \end{bmatrix} = \begin{bmatrix} 1 & 0 & -1 \\ 0 & 1 & 1 \end{bmatrix} \begin{bmatrix} \frac{-C_1+C_9}{8} & 0 & 0 \\ 0 & \frac{C_1+C_9}{8} & 0 \\ 0 & 0 & \frac{C_9}{8} \end{bmatrix} \begin{bmatrix} 1 & 0 \\ 0 & 1 \\ 1 & -1 \end{bmatrix}.$$

Figure 7:
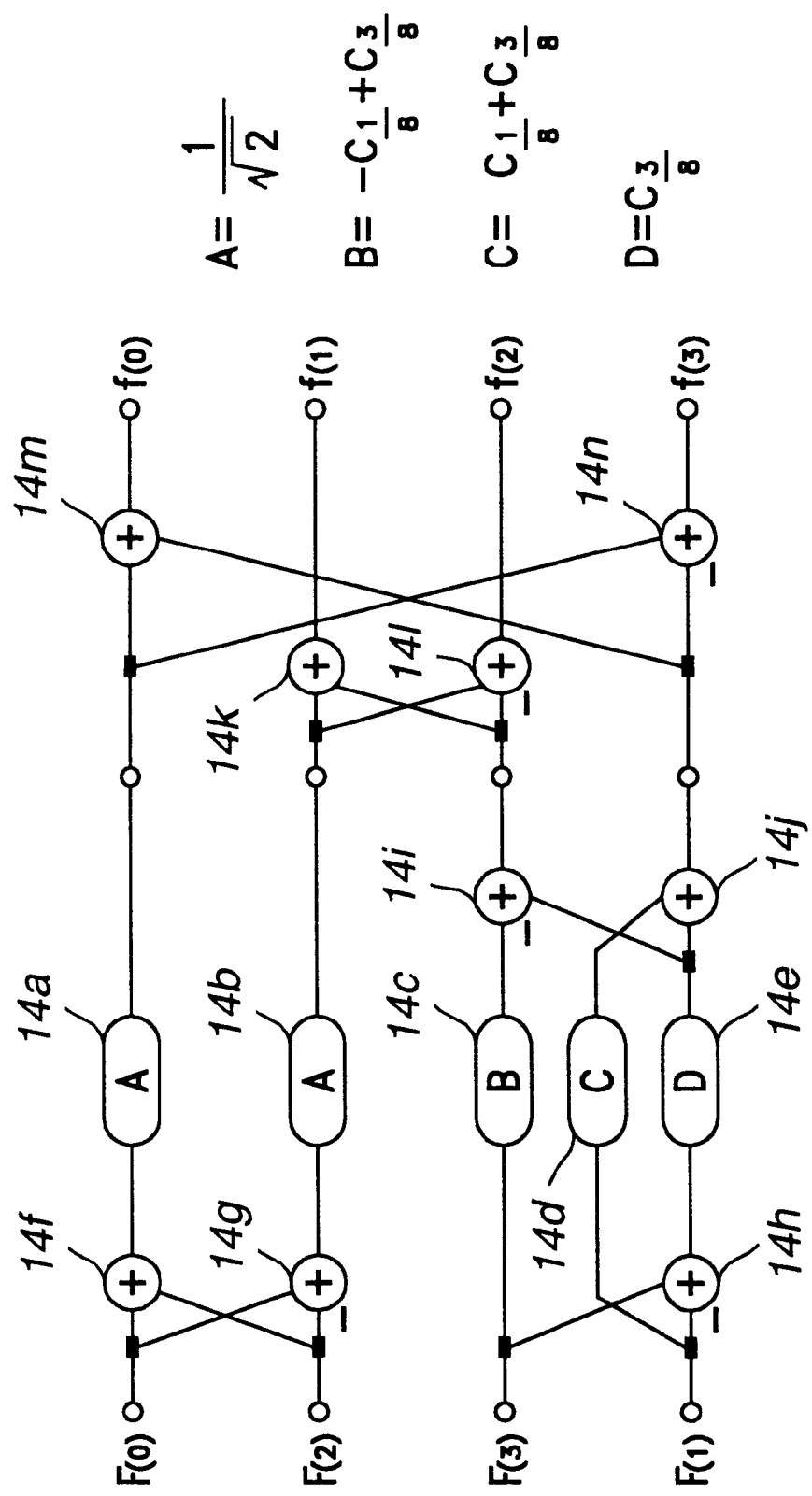
FIG. 7 shows processing flow in case of application of the Wang's algorithm to the processing of a decimating inverse discrete cosine transform device for field mode of the picture decoding device shown in FIG. 1.

FIG. 7 shows the processing flow in the case of applying the Wang algorithm to the processing by the decimating inverse discrete cosine transform unit 14. As may be seen form this processing flow, a high processing speed can be realized using first to fifth multipliers 14*a* to 14*e* and first to ninth adders 14*f* to 14*n*.

The matrix [FS'] used by the decimating inverse discrete cosine transform unit 14 for processing may be resolved by the Wang algorithm as indicated by the following equation (18):

$$[FS'] = \frac{1}{\sqrt{2}} \begin{bmatrix} 1 & 0 & 0 & 0 \\ 0 & 0 & 0 & 1 \\ 0 & 1 & 0 & 0 \\ 0 & 0 & 1 & 0 \end{bmatrix} \begin{bmatrix} 1 & 0 & 1 & 0 \\ 0 & 1 & 0 & 1 \\ 1 & 0 & -1 & 0 \\ 0 & 1 & 0 & -1 \end{bmatrix} \begin{bmatrix} [M_1] & \\ & [M_2] \end{bmatrix} \begin{bmatrix} 1 & 0 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 0 & 1 & 0 \\ 0 & 0 & 0 & 1 & 0 & 0 & 0 & 0 \\ 0 & 0 & 0 & 0 & 0 & 1 & 0 & 0 \\ 0 & 1 & 0 & 0 & 0 & 0 & 0 & 0 \\ 0 & 0 & 0 & 0 & 0 & 0 & 0 & 1 \end{bmatrix} \quad (18)$$

$$[M_1] = \begin{bmatrix} 1 & 1 \\ -1 & -1 \end{bmatrix} \begin{bmatrix} 1 & 0 & 0 & 0 \\ 0 & 1 & 1 & 1 \end{bmatrix} \begin{bmatrix} A & 0 & 0 & 0 \\ 0 & D & 0 & 0 \\ 0 & 0 & F & 0 \\ 0 & 0 & 0 & H \end{bmatrix}$$

$$[M_2] = \begin{bmatrix} 1 & 1 & 0 \\ 1 & 0 & 1 \end{bmatrix} \begin{bmatrix} -1 & 1 & 0 & 0 & 0 & 0 \\ 0 & 0 & 1 & 0 & 1 & 0 \\ 0 & 0 & 0 & 1 & 0 & 1 \end{bmatrix} \begin{bmatrix} E & 0 & 0 & 0 \\ 0 & G & 0 & 0 \\ 0 & 0 & B & 0 \\ 0 & 0 & C & 0 \\ 0 & 0 & 0 & I \\ 0 & 0 & 0 & J \end{bmatrix}.$$

In the equation (18), A to J are defined as follows:

$$A = \frac{1}{\sqrt{2}}$$

$$F = \frac{\cos\frac{\pi}{8} - \cos\frac{3\pi}{8}}{4}$$

$$D = \frac{1}{4}$$

$$H = \frac{1}{4} + \frac{1}{2\sqrt{2}}$$

-continued $$B = \frac{\cos\frac{\pi}{16} + \cos\frac{3\pi}{16} + 3\cos\frac{5\pi}{16} - \cos\frac{7\pi}{16}}{4}$$

$$C = \frac{\cos\frac{\pi}{16} - 3\cos\frac{3\pi}{16} - 3\cos\frac{5\pi}{16} - \cos\frac{7\pi}{16}}{4}$$

-continued $$E = \frac{\cos\frac{\pi}{16} - \cos\frac{3\pi}{16} - \cos\frac{5\pi}{16} - \cos\frac{7\pi}{16}}{4}$$

$$G = \frac{\cos\frac{\pi}{16} - \cos\frac{3\pi}{16} + \cos\frac{5\pi}{16} + \cos\frac{7\pi}{16}}{4}$$

$$I = \frac{\cos\frac{\pi}{16} - \cos\frac{3\pi}{16} + 3\cos\frac{5\pi}{16} + \cos\frac{7\pi}{16}}{4}$$

$$J = \frac{\cos\frac{\pi}{16} + 3\cos\frac{3\pi}{16} - \cos\frac{5\pi}{16} + \cos\frac{7\pi}{16}}{4}$$

Figure 8:
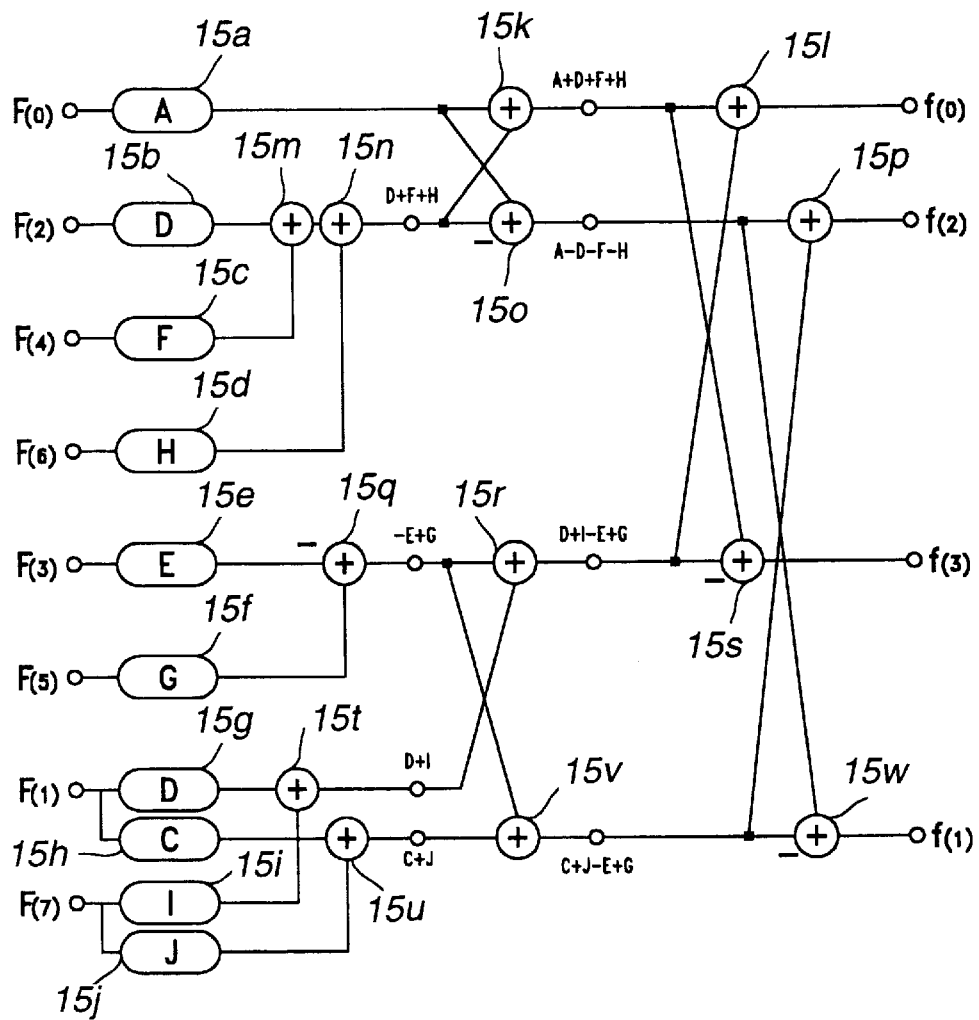
FIG. 8 shows processing flow in case of application of the Wang's algorithm to the processing of a decimating inverse discrete cosine transform device for field mode of the picture decoding device shown in FIG. 1.

The processing flow in the case of applying the Wang algorithm to the processing by the decimating inverse discrete cosine transform unit for frame mode 15 is shown in FIG. 8. As may be seen from this processing flow, the processing speed can be enhanced by employing first to tenth multipliers 15a to 15j and first to thirteenth adders 15k to 15w.

Second Embodiment

A picture decoding device of a second embodiment of the present invention is hereinafter explained. In the following explanation of the picture decoding device of the present second embodiment, parts or components which are the same as those of the picture decoding device 10 of the first embodiment are depicted by the same reference numerals and are not explained specifically.

Figure 9:
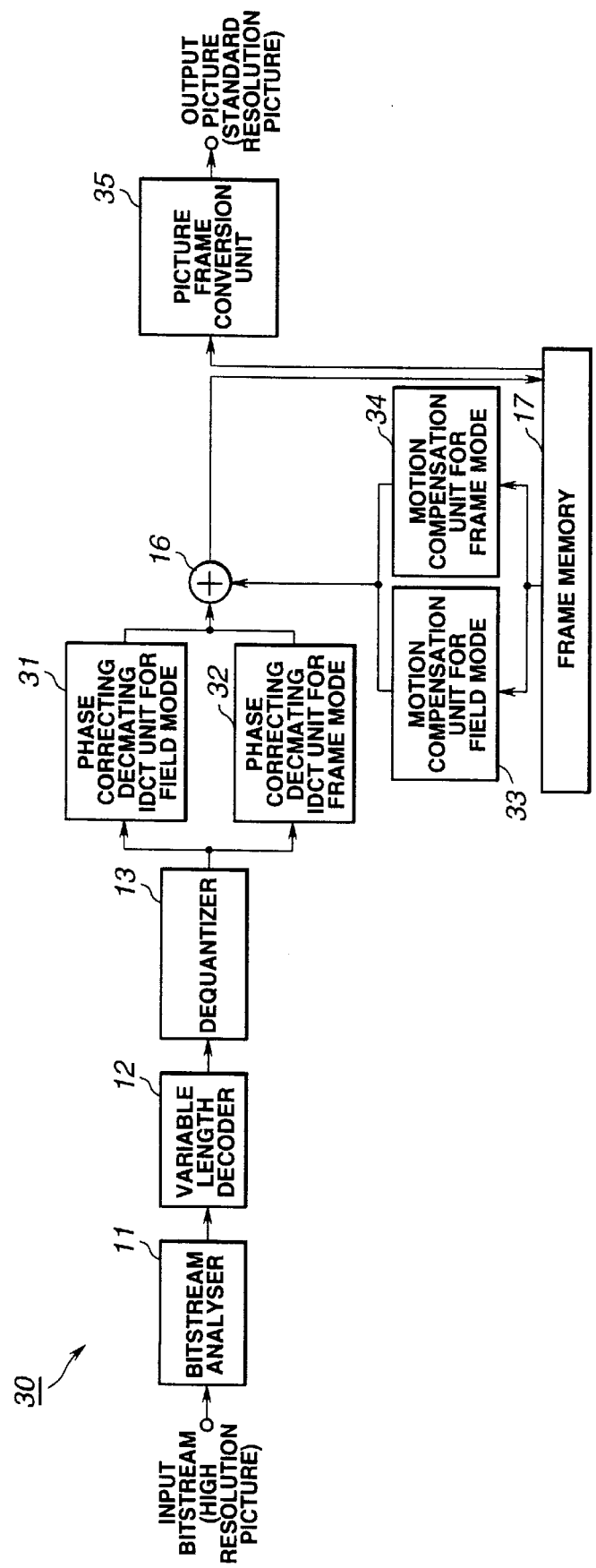
FIG. 9 is a block diagram showing a picture decoding device according to a second embodiment of the present invention.

Referring to FIG. 9, a picture decoding device 30 according to the second embodiment of the present invention is fed with a bitstream corresponding to a high resolution picture with the number of effective lines in the vertical direction of, for example, 1152, obtained on picture compression with MPEG2, and decodes this input bitstream as it reduces the resolution to one half to output a standard resolution picture with the number of effective lines in the vertical direction of, for example, 576.

This picture decoding device 30 includes a bitstream analysis unit 11 for analyzing a bitstream of a compressed high resolution picture, and a variable length decoder 12 for decoding the bitstream encoded with variable length encoding of allocating a code length corresponding to the data occurrence frequency. The picture decoding device 30 also includes a dequantizer 13 for multiplying respective coefficients of the DCT block with quantization steps, and a phase-correcting decimating inverse discrete cosine transform unit for field mode 31 for decimating inverse discrete cosine transforming the DCT block discrete cosine transformed by the field DCT mode to generate a standard resolution picture. The picture decoding device 30 also includes a phase-correcting decimating inverse discrete cosine transform unit for frame mode 32 for decimating inverse discrete cosine transforming the DCT block discrete cosine transformed by the frame DCT mode to generate a standard resolution picture, and an addition unit 16 for summing the decimating inverse discrete cosine transformed standard resolution picture to the motion-compensated reference picture. The picture decoding device 30 also includes a frame memory 17 for transiently storing the reference picture, and a motion compensation unit for field mode 33 for motion-compensating the reference picture stored by the frame memory 17 in meeting with the field motion prediction mode. The picture decoding device 30 also includes a motion compensation unit for frame mode 34 for motion-compensating the reference picture stored in the frame memory 17 in meeting with the frame motion prediction mode and a picture frame conversion unit 35 for outputting picture data of the standard resolution for converting the picture frame of a picture stored in the frame memory 17 for display on e.g., a monitor.

The phase-correcting decimating inverse discrete cosine transform unit for field mode 31 is used in the event that a macro-block of an input bitstream is discrete cosine transformed with the field motion prediction mode. In the phase-correcting decimating inverse discrete cosine transform unit for field mode 31, inverse discrete cosine transform, in which has been corrected the dephasing of pixels in the vertical direction of the top and bottom fields, is applied to only 4×8 coefficients, among the totality of the coefficients of the DCT block with 8×8 coefficients in the macro-block discrete cosine transformed with the field DCT mode. That is, the phase-correcting decimating inverse discrete cosine transform unit for field mode 31 effects inverse discrete cosine transform in the horizontal direction based on the four low-range point discrete cosine coefficients, while effecting inverse discrete cosine transform corrected for de-phasing in the vertical direction based on the eight point discrete cosine coefficients. Specifically, the phase-correcting decimating inverse discrete cosine transform unit for field mode 31 corrects the phase in an amount corresponding to ¼ pixel for each pixel of the top field in the vertical direction, while correcting the phase in an amount corresponding to ¾ pixel for each pixel of the bottom field in the vertical direction. By performing the above-described decimating inverse discrete cosine transform, a standard resolution picture (lower layer) is generated in which the phases of the respective pixels of the top field in the vertical direction are ¼, 9/4, . . . , with the phases of the respective pixels of the bottom field in the vertical direction being 5/4, 13/4, . . .

Figure 10:
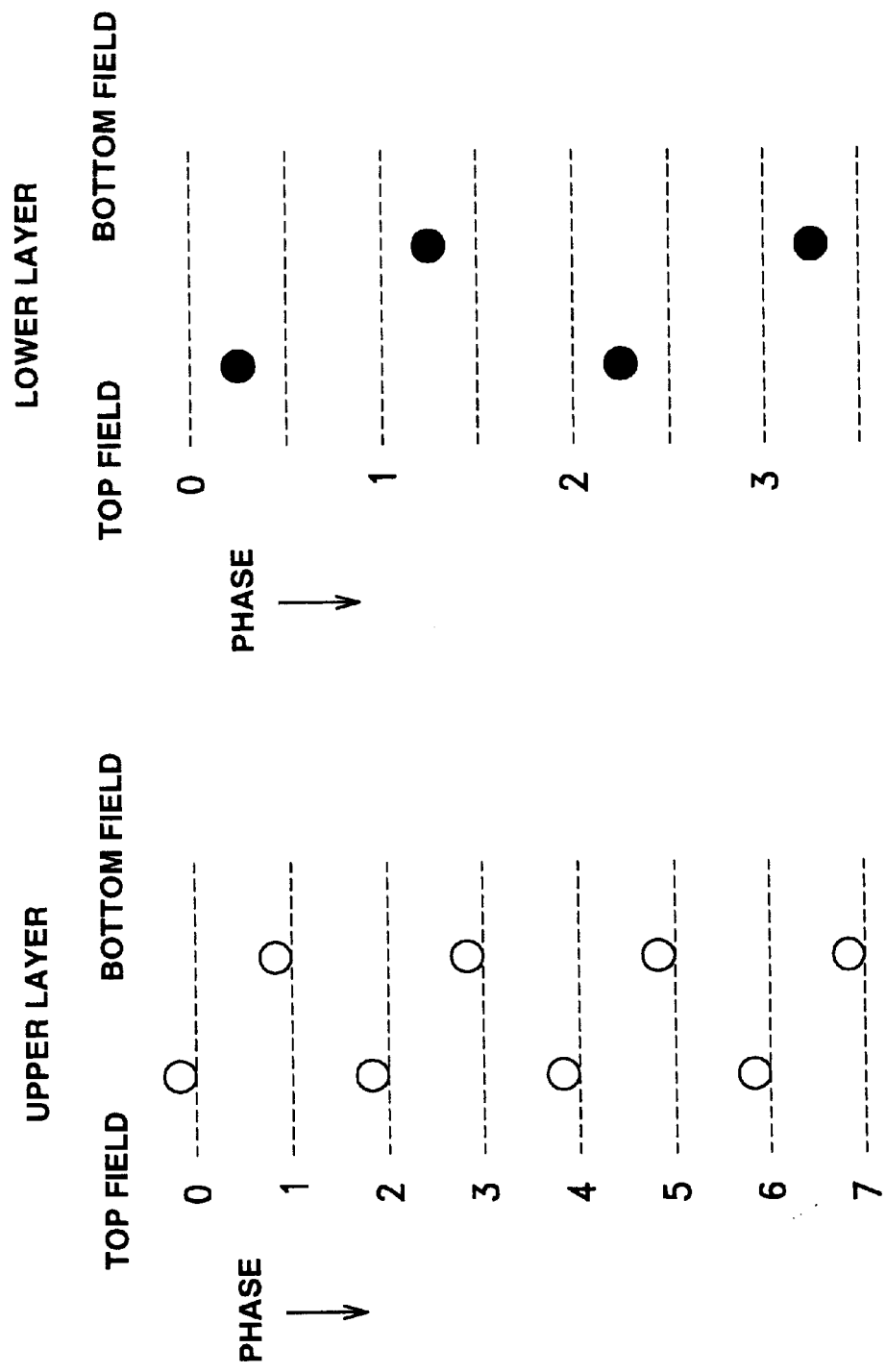
FIG. 10 illustrates the phase of pixels in the perpendicular direction of the reference picture stored in a frame memory of the picture decoding device shown in FIG. 9.

The phase-correcting decimating inverse discrete cosine transform unit for frame mode 32 is used if a macro-block of an input bitstream has been discrete cosine transformed with the frame DCT mode. In the phase-correcting decimating inverse discrete cosine transform unit for frame mode 32, decimating inverse discrete cosine transform, in which the pixel dephasing along the vertical direction of the top field and the bottom field has been corrected, is applied to the DCT block with 8×8 coefficients in the macro-block discrete cosine transformed with the frame DCT mode. The phase-correcting decimating inverse discrete cosine transform unit for frame mode 32 generates a picture of the same phase as the phase of the pixels of the standard resolution picture generated by the phase-correcting decimating inverse discrete cosine transform unit for field mode 31. That is, the phase-correcting decimating inverse discrete cosine transform unit for frame mode 32 executes decimating inverse discrete cosine transform with one-block or two-block processing to generate a standard resolution picture (lower layer) in which the phases in the vertical direction of the respective pixels of the top field are ¼, 9/4, . . . , with the phases in the vertical direction of the respective pixels of the bottom field being 5/4, 13/4, . . . , as shown in FIG. 10.

The motion compensation unit for field mode 33 is used if the motion prediction mode of the macro-block is the field motion prediction mode. The motion compensation unit for field mode 33 applies pixel interpolation employing orthogonal transform to the reference picture of the standard resolution picture stored in the frame memory 17 to generate a virtual upper-order picture having the same resolution as that of the high resolution picture. The motion compensation unit for field mode 33 motion-compensates the virtual upper-order picture in meeting with the field motion prediction mode and reduces the resolution of the motion-compensated virtual upper-order picture by employing orthogonal transform to generate a reference picture of the standard resolution. The reference picture, motion-compensated by the motion compensation unit for field mode 33, is sent to the addition unit 16, where it is synthesized to an inter-picture.

The motion compensation unit for frame mode 34 is used if the motion prediction mode of the macro-block is the frame motion prediction mode. The motion compensation unit for frame mode 34 applies pixel interpolation employing orthogonal transform to the reference picture of the standard resolution picture stored in the frame memory 17 to generate a virtual upper-order picture having the same resolution as that of the high resolution picture. The motion compensation unit for frame mode 34 motion-compensates the virtual upper-order picture in meeting with the field motion prediction mode and reduces the resolution of the motion-compensated virtual upper-order picture by employing orthogonal transform to generate a reference picture of the standard resolution. The reference picture, motion-compensated by the motion compensation unit for frame mode 34, is sent to the addition unit 16, where it is synthesized to an inter-picture.

The picture frame conversion unit 35 is fed with a reference picture of the standard resolution stored in the frame memory 17 and converts the picture frame of this reference picture by post-filtering for conformity to the a standard for a standard resolution television. That is, the picture frame conversion unit 35 converts the picture frame of the high resolution television standard to the picture frame of the standard resolution television reduced in size to ¼. Meanwhile, with the present picture frame conversion unit 35, since the picture stored in the frame memory 17 is not subjected to dephasing between the top and bottom fields, it is unnecessary to effect the correction for pixel dephasing in contradistinction from the picture frame converting dephasing correction unit 20 of the above-described first embodiment.

With the picture decoding device 30 of the second embodiment, constructed as described above, the bitstream of a high resolution picture, compressed in accordance with MPEG2, can be decoded and simultaneously reduced in resolution to ½ in order to output a standard resolution picture.

The processing contents of the phase-correcting decimating inverse discrete cosine transform unit for field mode31 will be explained in further detail.

Figure 11:
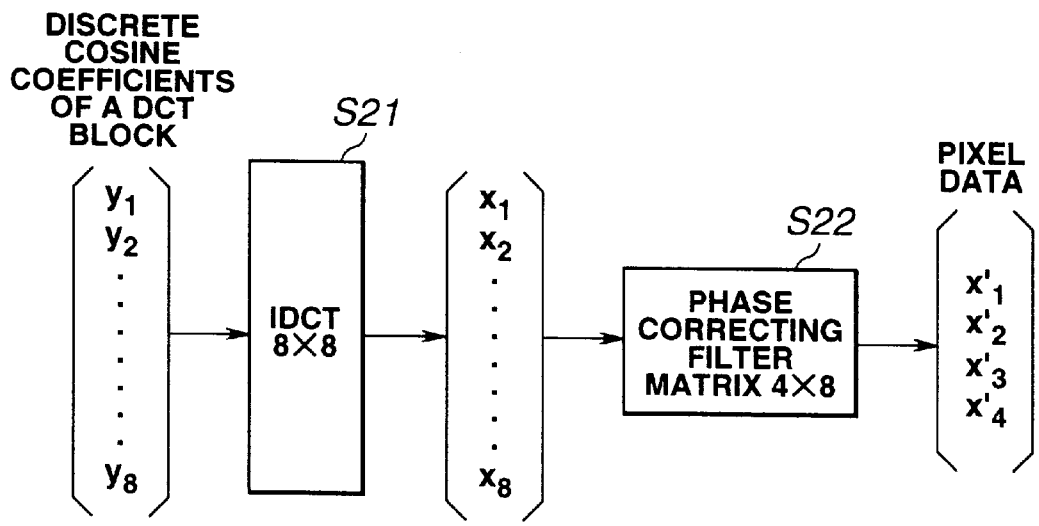
FIG. 11 illustrates the contents of processing of a phase correcting decimating inverse discrete cosine transform device for a field mode of a picture decoding device shown in FIG. 9.
Figure 12:
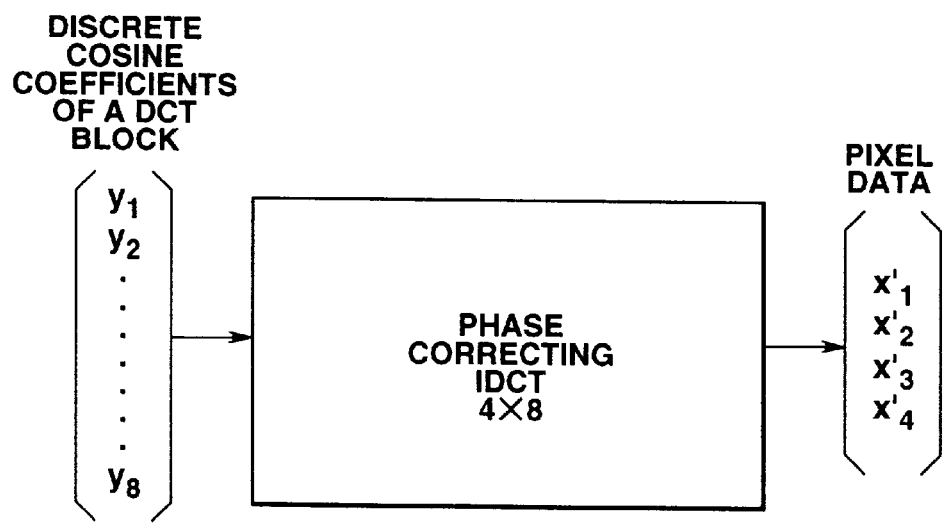
FIG. 12 illustrates the processing contents of a phase correcting decimating inverse discrete cosine transform device for a field mode in case of processing by a sole matrix.

The phase-correcting decimating inverse discrete cosine transform unit for field mode31 is fed with a bitstream, compression-coded from a high resolution picture, in terms of a DCT block as a unit, as shown in FIG. 11.

First, at step S21, 8×8 inverse discrete cosine transform (IDCT8×8) is applied to the discrete cosine coefficients y of the sole DCT block. It is noted that the coefficients in the vertical direction, among the totality of the discrete cosine coefficients in the DCT block, are denoted as $y_1$ to $y_8$ in the drawing. By the inverse discrete cosine transform, 8×8 decoded pixel data x are obtained. It is noted that pixel data along the vertical direction, among the totality of pixel data of the DCT block, are indicated as $x_1$ to $x_8$ in the drawing.

Then, at step S22, these 8×8 pixel data are processed with transform closed in the DCT block, by a 4×8 phase-correcting filter matrix, in order to produce phase-corrected pixel data x'. It is noted that the pixel data along the vertical direction, among the totality of pixel data, are denoted as $x'_1$, $x'_2$, $x'_3$, $x'_4$ in the drawing.

By performing the processing of steps S21 and S22, the phase-correcting decimating inverse discrete cosine trans-form unit for field mode 31 can generate a picture not subjected to dephasing between the top and bottom fields.

It is also possible with the phase-correcting decimating inverse discrete cosine transform unit for field mode 31 to perform the above processing using a sole matrix (4×8 phase-correcting IDCT matrix).

Figure 13:
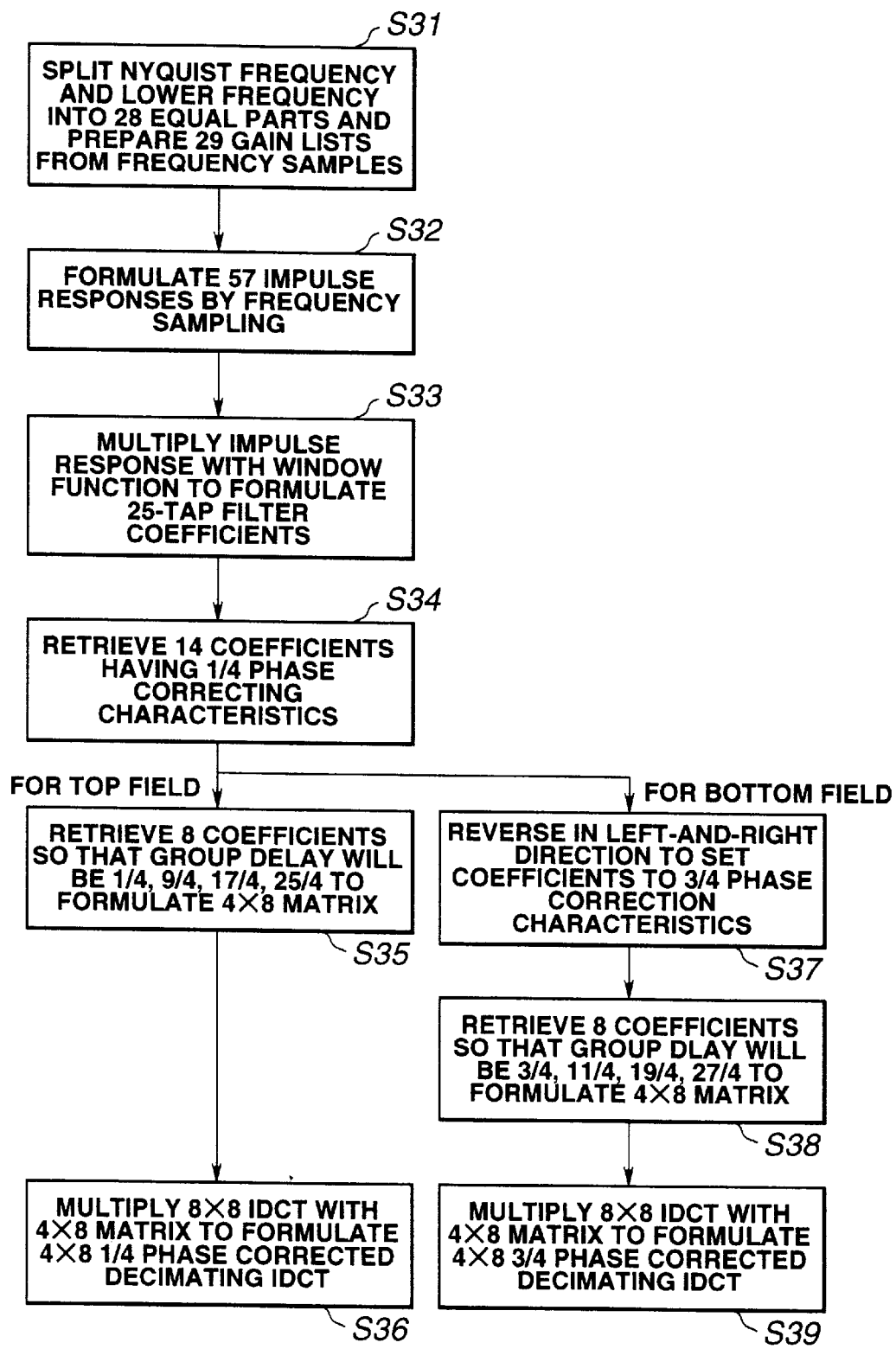
FIG. 13 is a flowchart for illustrating the designing contents of a 4×8 phase correcting IDCT matrix in which processing is performed by the phase correcting decimating inverse discrete cosine transform device for the field mode.
Figure 15:
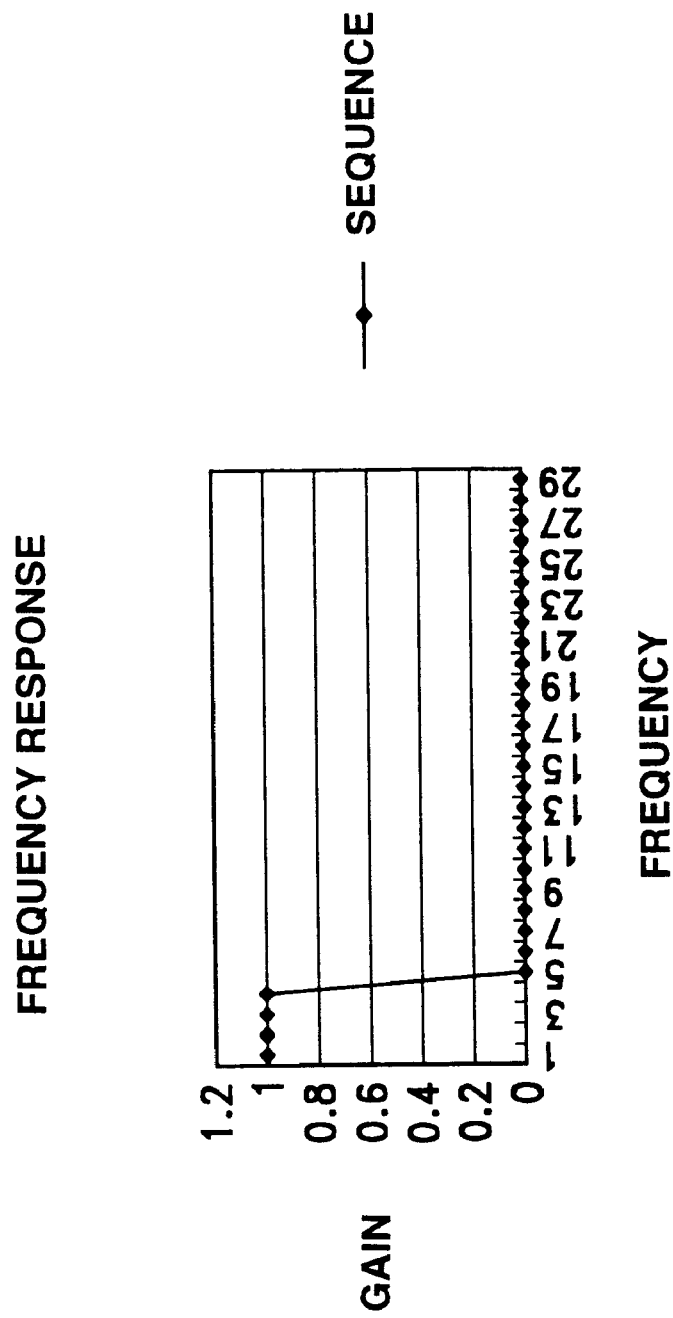
FIG. 15 illustrates a gain list formulated from frequency samples obtained on splitting the Nyquist frequency and the lower frequency into {(N−1)/2} at equal intervals.

FIG. 13 shows the designing procedure of the 4×8 phase correcting IDCT matrix, in which commutations are executed by the above-described phase-correcting decimating inverse discrete cosine transform unit for field mode 31. This 4×8 phase correcting IDCT matrix is hereinafter explained. This 4×8 phase correcting IDCT matrix is formulated by polyphase resolution of a prototype filter.

The picture decoding device 30 downdecodes the high resolution picture having the frequency response as shown in FIG. 14a to a standard resolution picture of a one-half resolution, having the frequency characteristics as shown in FIG. 14b. Thus, the frequency characteristics required of the prototype filter result from the 4-tupled oversampling, as shown in FIG. 14b, in order to obtain a pixel value of the ¼ phase of the standard resolution picture.

First, at step S31, the Nyquist frequency and the lower frequency are divided into $\{(N-1)/2\}$ equal intervals, and a gain list is formulated from the frequency samples. For example, the Nyquist frequency and the lower frequency are divided into equal (57−1)/2=28 intervals to formulate 29 gain lists.

Figure 16:
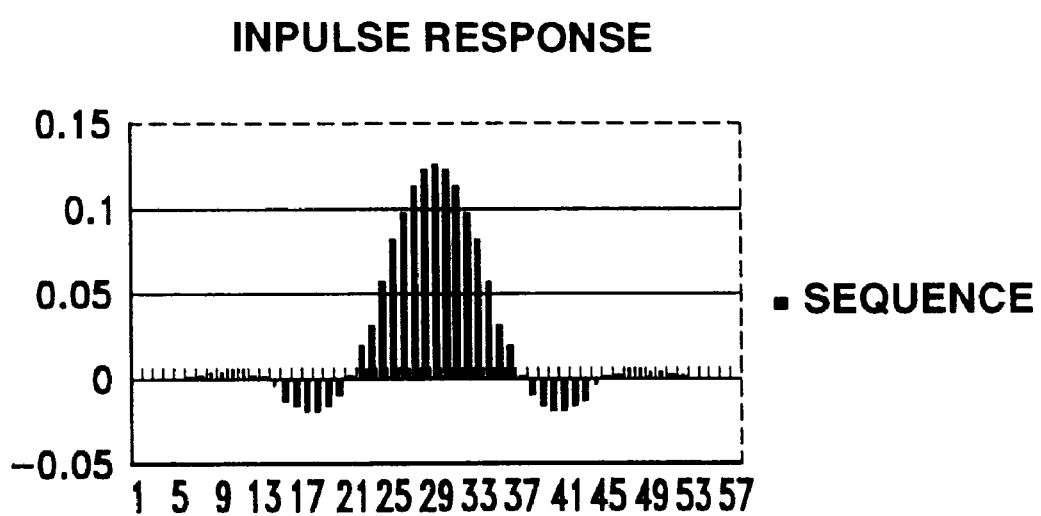
FIG. 16 illustrates the impulse response formulated by inverse discrete Fourier transforming the gain list.

Then, at step S32, 57 impulse responses are formulated by the frequency sampling method. That is, 29 gain lists ate inverse discrete cosine transformed to formulate 57 FIR impulse responses. These 57 impulse responses are shown in FIG. 16.

Next, at step S33, these impulse responses are multiplied with a window function to formulate 57-tap filter coefficients c1 to c57.

The filter prepared at this step S33 serves as the prototype filter.

Then, at step S34, the prototype filter, having the 57 filter coefficients c1 to c57, is polyphase-resolved to retrieve only 14 filter coefficients c'1 to c'14 having the ¼ phase correction characteristics to formulate a polyphase filter.

Figure 17:
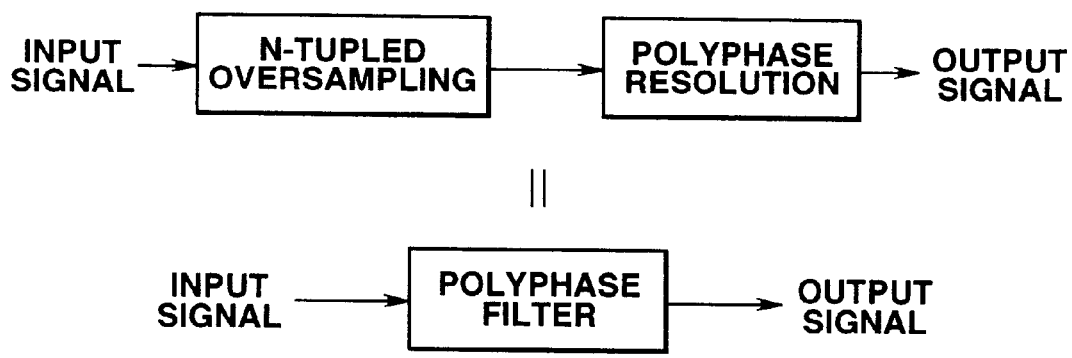
FIG. 17 illustrates a polyphase filter.
Figure 18:
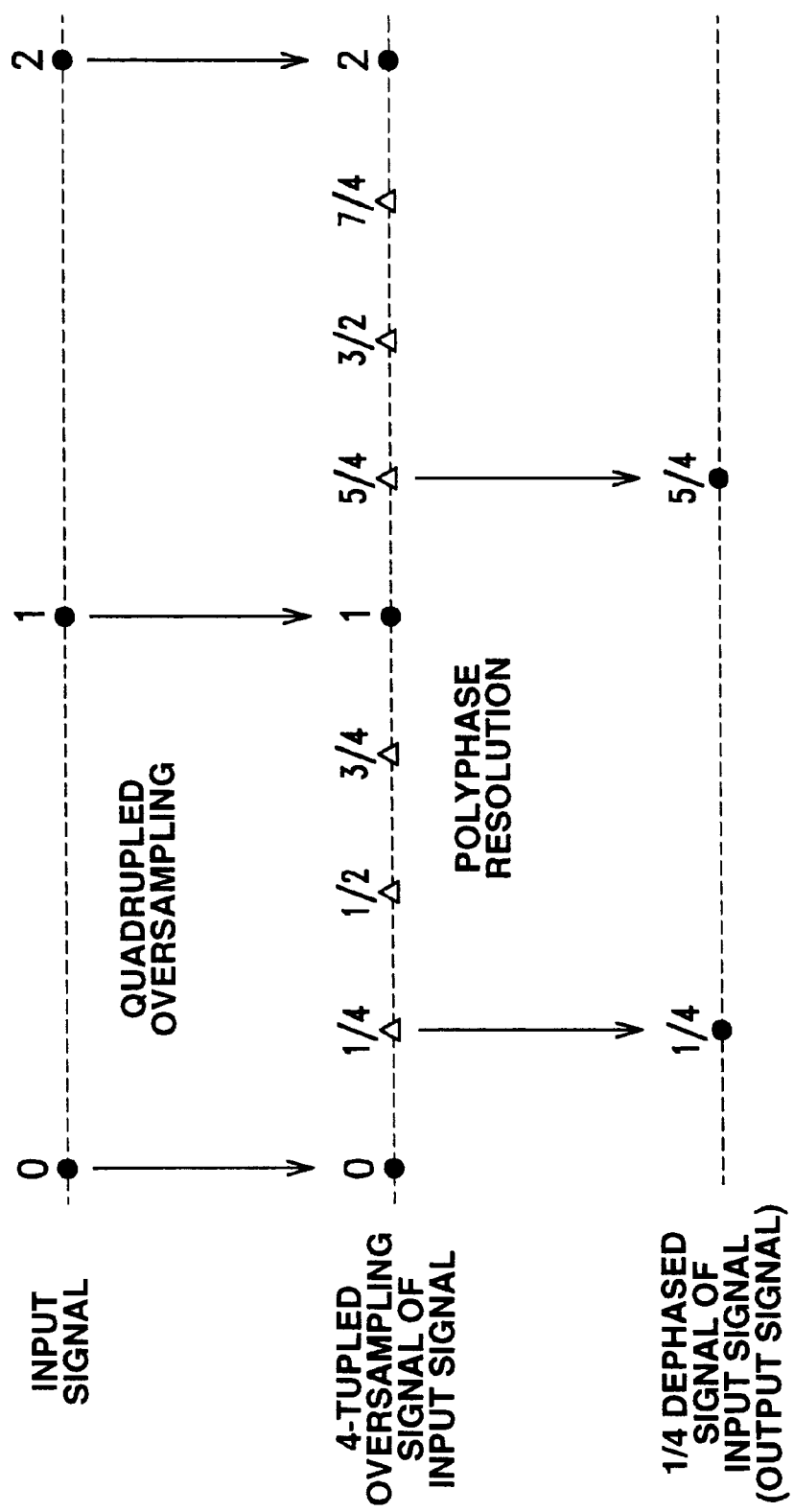
FIG. 18 illustrates the polyphase filter outputting a signal dephased by ¼ with respect to the input signal.

This polyphase filter is such a filter for oversampling an input signal to N times, and extracting pixels at an interval of N pixels from the oversampled signals, by way of polyphase resolution, for outputting signals dephased 1/N with respect to the input signal, as shown in FIG. 17. If desired to obtain a signal ¼ dephased with respect to the input signal, it suffices if the input signal is oversamples by a factor of four to retrieve a signal dephased by ¼ from the oversampled signal.

Specifically, the 14 filter coefficients, formulated from the prototype filters c1 to c57 having 57 coefficients, are those having the following equation (19):

$$\begin{array}{cccccccccc}
-0.000413627 & 0.0039878 & 0.00229913 & -0.015080 & -0.00939227 & 0.0561242 & 0.119497 & & & (19). \\
& 0.095091 & & 0.0017216 & -0.0190084 & -0.00554409 & 0.00518009 & 0.0014488 & -0.00122162 &
\end{array}$$

After formulating the polyphase filter, the design processing is split between the 4×8 phase correction IDCT matrix for the top field and the 4×8 phase correction IDCT matrix for the bottom field.

Figure 19:
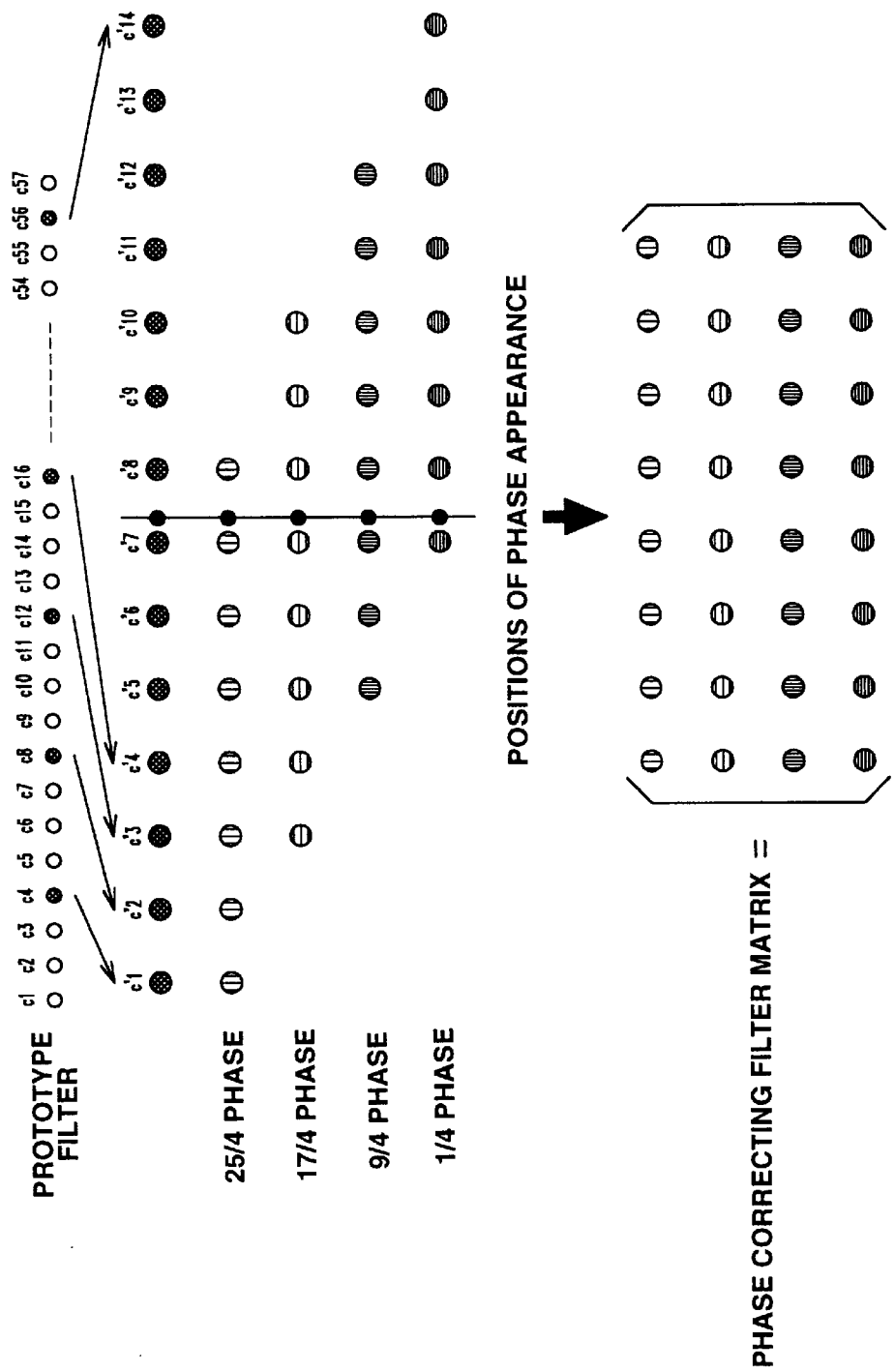
FIG. 19 illustrates the 4×8 phase correcting IDCT matrix for field mode in which processing is performed by the phase correcting decimating inverse discrete cosine transform device for the field mode.

First, in formulating the 4×8 phase correction IDCT matrix for the top field, eight coefficients with the group delay of ¼, ⁹⁄₄, ¹⁷⁄₄ and ²⁵⁄₄ phase are retrieved at step S35 from the polyphase-resolved 14 filter coefficients c'1 to c'14, so that the filter characteristics will be ¼ phase correction characteristics, to formulae a 4×8 phase correction filter matrix. The 4×8 phase correction filter in matrix, this prepared, is shown in FIG. 19.

From the 14 filter coefficients c'1 to c'14 of the equation (19), the coefficients shown by the following equation (20) are retrieved:

S38 from the left-to-right inverted 14 filter coefficients c'1 to c'14 to formulate a 4×8 phase-correcting filter matrix.

Next, at step S39, the 8×8 IDCT matrix is multiplied with the 4×8 phase-correcting filter matrix to formulate a 4×8 phase correcting IDCT matrix for the bottom field.

By executing the processing of steps S31 to S39, it is possible to formulate a 4×8 phase correcting IDCT matrix worked on by the phase-correcting decimating inverse discrete cosine transform unit for field mode 31.

| | | | | | | | | |
|---|---|---|---|---|---|---|---|---|
| ²⁵⁄₄ phase | −0.000413627 | 0.0039878 | 0.00229913 | −0.015080 | −0.00939227 | 0.0561242 | 0.119497 | (20) |
| ¹⁷⁄₄ phase | | | 0.00229913 | −0.015080 | −0.00939227 | 0.0561242 | 0.119497 | |
| ⁹⁄₄ phase | | | | | −0.00939227 | 0.0561242 | 0.119497 | |
| ¼ phase | | | | | | | 0.119497 | |
| | | 0.095091 | | | | | | |
| | | 0.095091 | 0.017216 | −0.0190084 | | | | |
| | | 0.095091 | 0.017216 | −0.0190084 | −0.00554409 | −0.00518009 | | |
| | | 0.095091 | 0.017216 | −0.0190084 | −0.00554409 | −0.00518009 | 0.0014488 | −0.00122162 |

If a 4×8 phase correcting IDCT matrix is found from the coefficients of the equation (20), a matrix shown in the following equation (21) is found:

By the phase-correcting decimating inverse discrete cosine transform unit for field mode 31 performing matrix processing on the 4×8 phase-correcting filter matrix and on

| | | | | | | | |
|---|---|---|---|---|---|---|---|
| 0.119497 | 0.095091 | 0.017216 | −0.0190084 | −0.00554409 | 0.00518009 | 0.0014488 | −0.00122162 | (21)
| 0.00939227 | 0.0561242 | 0.119497 | 0.095091 | 0.017216 | −0.0190084 | −0.00554409 | 0.00518009 |
| 0.00229913 | −0.015080 | −0.00939227 | 0.0561247 | 0.009497 | 0.095091 | 0.017216 | −0.0190084 |
| 0.000413627 | 0.0039878 | 0.00229913 | −0.015080 | −0.00939227 | 0.0561242 | 0.119497 | 0.095091 |

If the 4×8 phase correcting IDCT matrix of the equation (21) is normalized, a matrix shown in the following equation (22) is obtained:

the input DCT coefficients discrete cosine transformed with the field DCT mode, a standard resolution picture devoid of dephasing between the top and bottom field can be produced

| | | | | | | | | |
|---|---|---|---|---|---|---|---|---|
| 0.561919 | 0.447153 | 0.809559 | −0.0893847 | −0.0260704 | 0.0243587 | 0.0068128 | −0.00574453 | (22). |
| −0.0382407 | 0.216559 | 0.461087 | 0.368915 | 0.066429 | −0.0733453 | −0.0213923 | 0.0199877 | |
| 0.00931777 | −0.0611172 | −0.0380645 | 0.227457 | 0.484291 | 0.38538 | 0.069772 | −0.0770364 | |
| −0.00164064 | 0.0158176 | 0.00911943 | −0.0598162 | −0.0372542 | 0.222615 | 0.473982 | 0.377176 | |

At step S36, the 8×8 IDCT matrix is multiplied with this 4×8 phase correcting filter matrix to formulate a 4×8 phase correcting IDCT matrix for the top field.

The 4×8 phase correcting IDCT matrix, obtained on multiplying the 8×8 IDCT matrix with the 4×8 phase correcting filter matrix is shown in the following equation (23):

on decoding. That is, with the phase-correcting decimating inverse discrete cosine transform unit for field mode 31, it is possible to generate a standard resolution picture (lower layer) which will give the phases in the vertical direction of the respective pixels of the top field of ¼, ⁹⁄₄, . . . and the

| | | | | | | | | |
|---|---|---|---|---|---|---|---|---|
| 0.353553 | 0.470989 | 0.376964 | 0.182877 | −0.0419176 | −0.0790523 | −0.0325452 | −0.0123689 | (23). |
| 0.353553 | 0.249119 | −0.244534 | −0.39214 | −0.0586254 | 0.0447449 | 0.00293145 | 0.0032419 | |
| 0.353553 | −0.154747 | −0.424867 | 0.327667 | 0.101844 | −0.0599048 | 0.00729624 | −0.0053086 | |
| 0.353553 | −0.437751 | 0.267694 | −0.00183147 | −0.156649 | 0.0892455 | −0.0287812 | 0.0126261 | |

For formulating a 4×8 phase correcting IDCT matrix for the bottom field, polyphase-resolved 14 filter coefficients c'1 to c'14 are inverted at step S37 in the left-and-right direction so that the filter coefficients will be ¾ phase correcting characteristics.

Then, at step S38, eight coefficients which will give the group delay of ¾, ¹¹⁄₄, ¹⁹⁄₄ and ²⁷⁄₄ phase are retrieved at step phases in the vertical direction of the respective pixels of the bottom field of ⁵⁄₄, ¹³⁄₄, . . . , as shown in FIG. 10.

The processing contents of the phase-correcting decimating inverse discrete cosine transform unit for frame mode 32 are explained in further detail.

Meanwhile, it is possible for the phase-correcting decimating inverse discrete cosine transform unit for frame mode 32 to execute the one-block processing and/or the two-block processing which will be explained subsequently. If necessary, it is possible to switch between the one-block processing and the two-block processing or to execute one of these processings.

Figure 20:
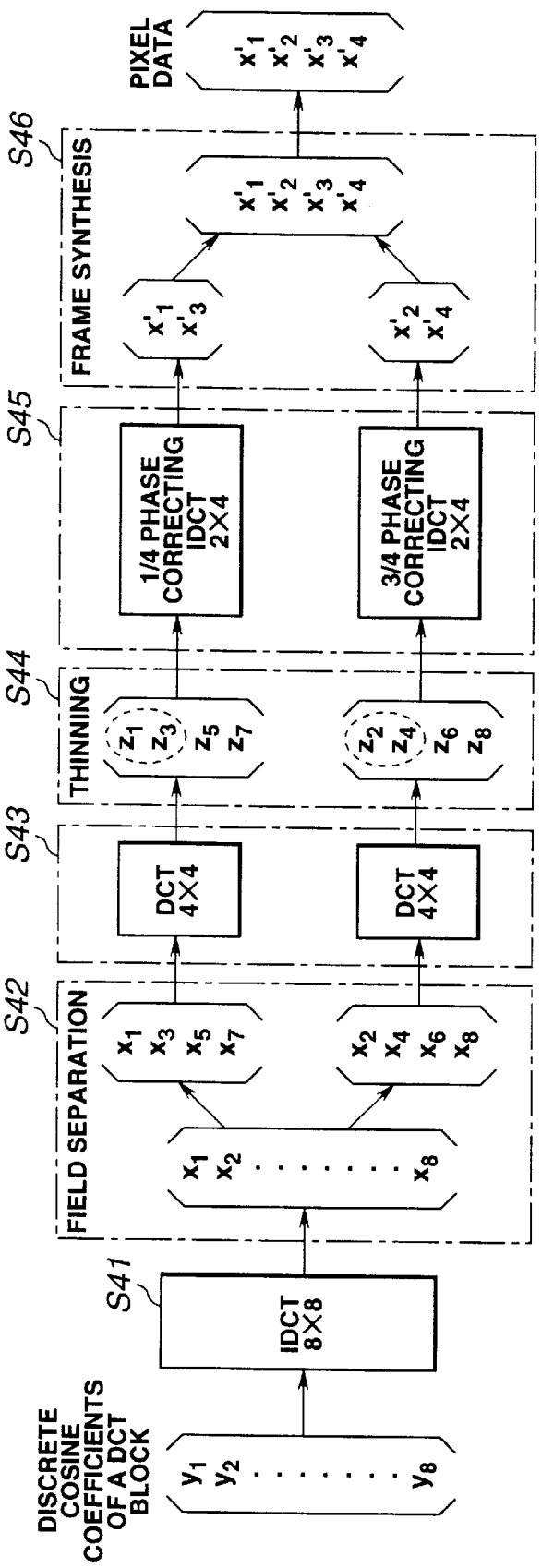
FIG. 20 illustrates the contents of one block processing of the phase correcting decimating inverse discrete cosine transform device for the frame mode of the picture decoding device shown in FIG. 9.

First, the one-block processing is explained. FIG. 20 illustrates the contents of the one-block processing.

The phase-correcting decimating inverse discrete cosine transform unit for frame mode 32 is fed with a bitstream, corresponding to a compression-encoded high resolution picture, in terms of a DCT block as a unit, as shown in FIG. 20.

First, at step S41, 8×8 inverse discrete cosine transform is applied to discrete cosine coefficients y of the sole DCT block. Then, at step S42, the 8×8 pixel data are field-separated into two pixel blocks. Then, at step S43, 4×4 discrete cosine transform is applied to each of the field-separated two pixel blocks. Next, at step S44, high-frequency components of the discrete cosine coefficients z of the respective pixel blocks are thinned out to give pixel blocks each made up of 2×2 discrete cosine coefficients. The processing as from the step S41 to the step S44 is the same as that from step S1 to step S4 for the one-block processing.

Then, at step S45, inverse discrete cosine transform, correcting the pixel dephasing in the vertical direction, is performed on the pixel block corresponding to the top field, using a 2×4 phase correcting IDCT matrix adapted for performing ¼ pixel phase correction. On the other hand, inverse discrete cosine transform, correcting the pixel dephasing in the vertical direction, is performed on the pixel block corresponding to the bottom field, using a 2×4 phase correcting IDCT matrix adapted for performing for ¾ pixel phase correction. By performing the above-described decimating inverse discrete cosine transform, it is possible to produce 2×2 pixel data x', it being noted that pixel data in the vertical direction, among the totality of the pixel data of the pixel block corresponding to the top field, are denoted as $x'_1$ and $x'_3$, with pixel data in the vertical direction, among the totality of the pixel data of the pixel block corresponding to the bottom field, being denoted as $x'_2$, $x'_4$ in the drawing. These pixel data x' give a standard resolution picture (lower layer) in which the phases in the vertical direction of the respective pixels of the top field are ¼, ⁹⁄₄ and those in the vertical direction of the respective pixels of the bottom field are ⁵⁄₄, ¹³⁄₄. The method for designing the 2×4 phase correcting IDCT matrix will be explained subsequently in detail.

Then, at step S46, pixel data of the pixel block corresponding to the top field and pixel data of the pixel block corresponding to the bottom field are synthesized to a frame. The processing at step S46 is the same as the processing at step S6 in the one-block processing shown in FIG. 3.

By performing the processing of steps S41 to S46, the phase-correcting decimating inverse discrete cosine transform unit for frame mode 32 is able to generate a picture free of phase deviation between respective pixels. On the other hand, the phase-correcting decimating inverse discrete cosine transform unit for field mode 31 is able to generate a picture free of dephasing with respect to the picture obtained on decoding by the phase-correcting decimating inverse discrete cosine transform unit for field mode 31.

It is also possible for the phase-correcting decimating inverse discrete cosine transform unit for frame mode 32 to execute the processing from step S41 to step S46 using a sole matrix.

Figure 21:
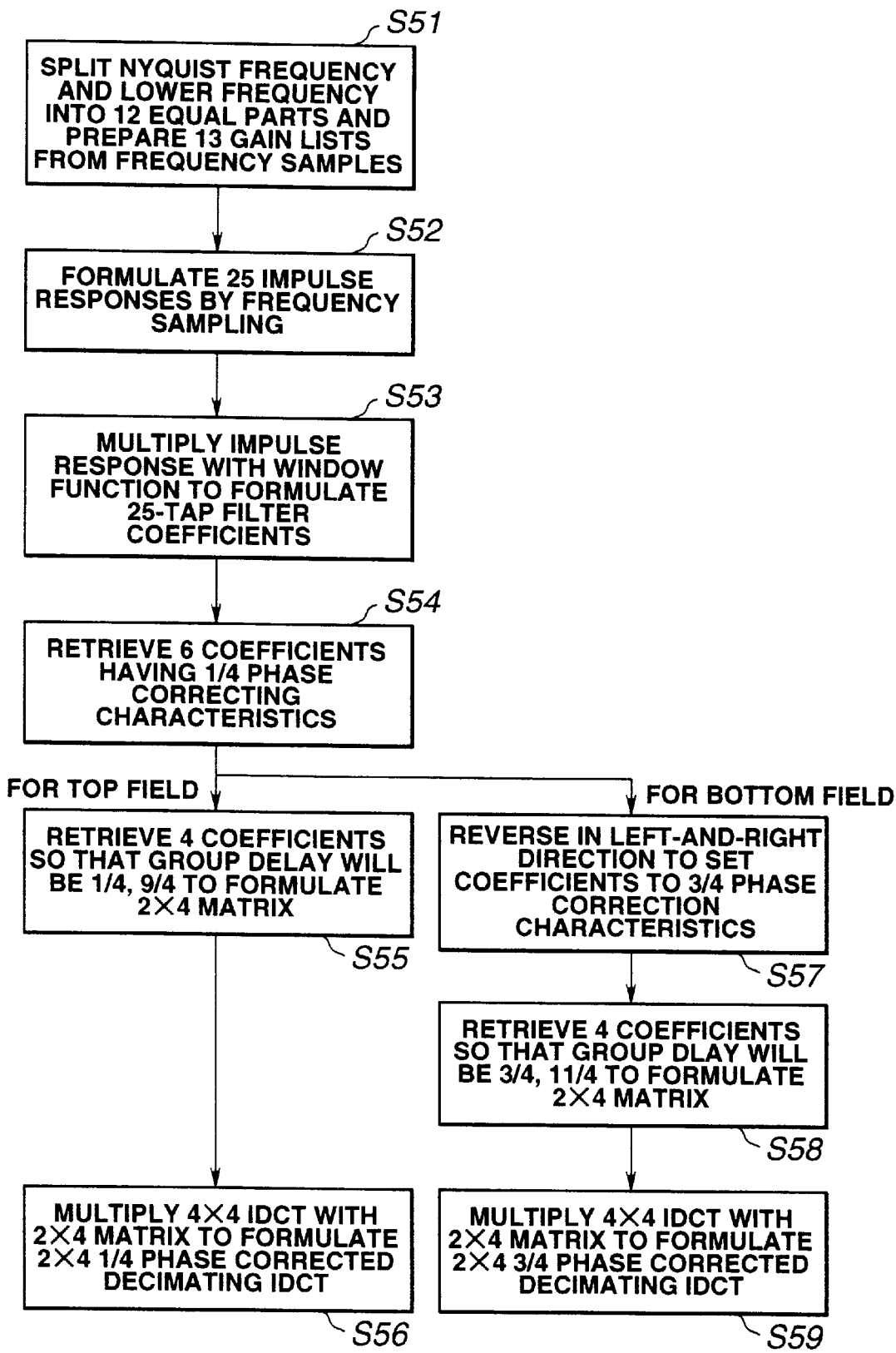
FIG. 21 is a flowchart for illustrating the designing contents of a 2×4 phase correcting IDCT matrix in which processing is performed by the phase correcting decimating inverse discrete cosine transform device for the frame mode.
Figure 22:
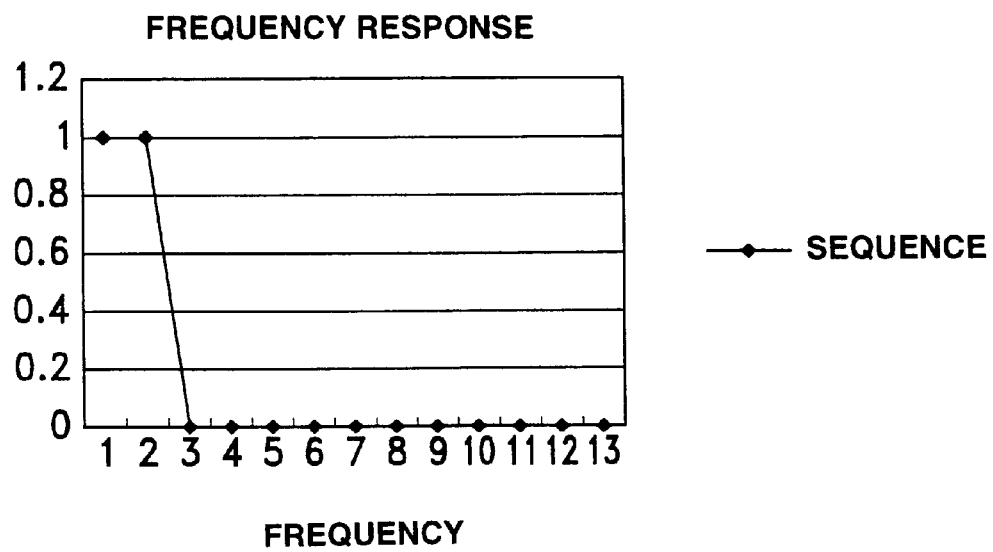
FIG. 22 illustrates a gain list formulated from frequency samples obtained on splitting the Nyquist frequency and the lower frequency into {(N−1)/2} at equal intervals.

The designing procedure for the 2×4 phase correcting IDCT matrix, processed at step S45 of the phase-correcting decimating inverse discrete cosine transform unit for frame mode 32, is shown in FIG. 21. This 2×8 phase correcting IDCT matrix is now explained.

First, at step S51, the Nyquist frequency and the lower frequency are divided into $\{(N-1)/2\}$ equal intervals, and gain lists are formulated from the frequency samples. For example, the Nyquist frequency and the lower frequency are divided into equal $(25-1)/2=12$ intervals to formulate 13 gain lists.

Figure 23:
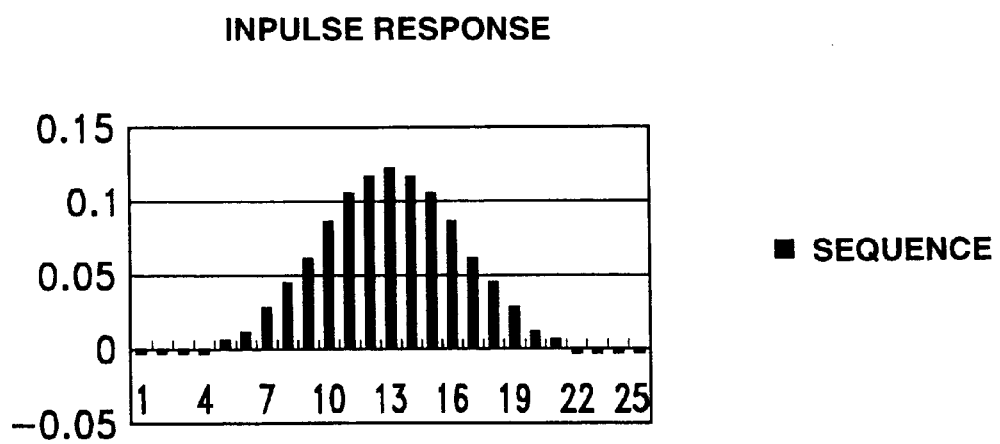
FIG. 23 illustrates the impulse response formulated by inverse discrete cosine transforming the gain list.

Then, at step S52, 25 impulse responses are formulated by the frequency sampling method. That is, 13 gain lists are inverse discrete cosine transformed to formulate 25 FIR impulse responses. These 25 impulse responses are shown in FIG. 23.

Next, at step S53, these impulse responses are multiplied with a window function to formulate 25-tap filter coefficients c1 to c25.

The filter prepared at this step S53 serves as the prototype filter.

Then, at step S54, the prototype filter, having the 25 filter coefficients c1 to c25, is polyphase-resolved to retrieve only 6 filter coefficients c'1 to c'6 having the ¼ phase correction characteristics to formulate a polyphase filter.

Specifically, the 14 filter coefficients, formulated from the prototype filters c1 to c25, having 25 coefficients, are as shown in the following equation (24):

$$-0.00236073 \; 0.042655 \; 0.115645 \; 0.0850711 \; 0.0105276 \; 0.00328948 \quad (24)$$

In this manner, the designing processing is split, after formulating the polyphase filter, into a 2×4 phase-correcting IDCT matrix for the top field and a 2×4 phase-correcting IDCT matrix for the bottom field.

Figure 24:
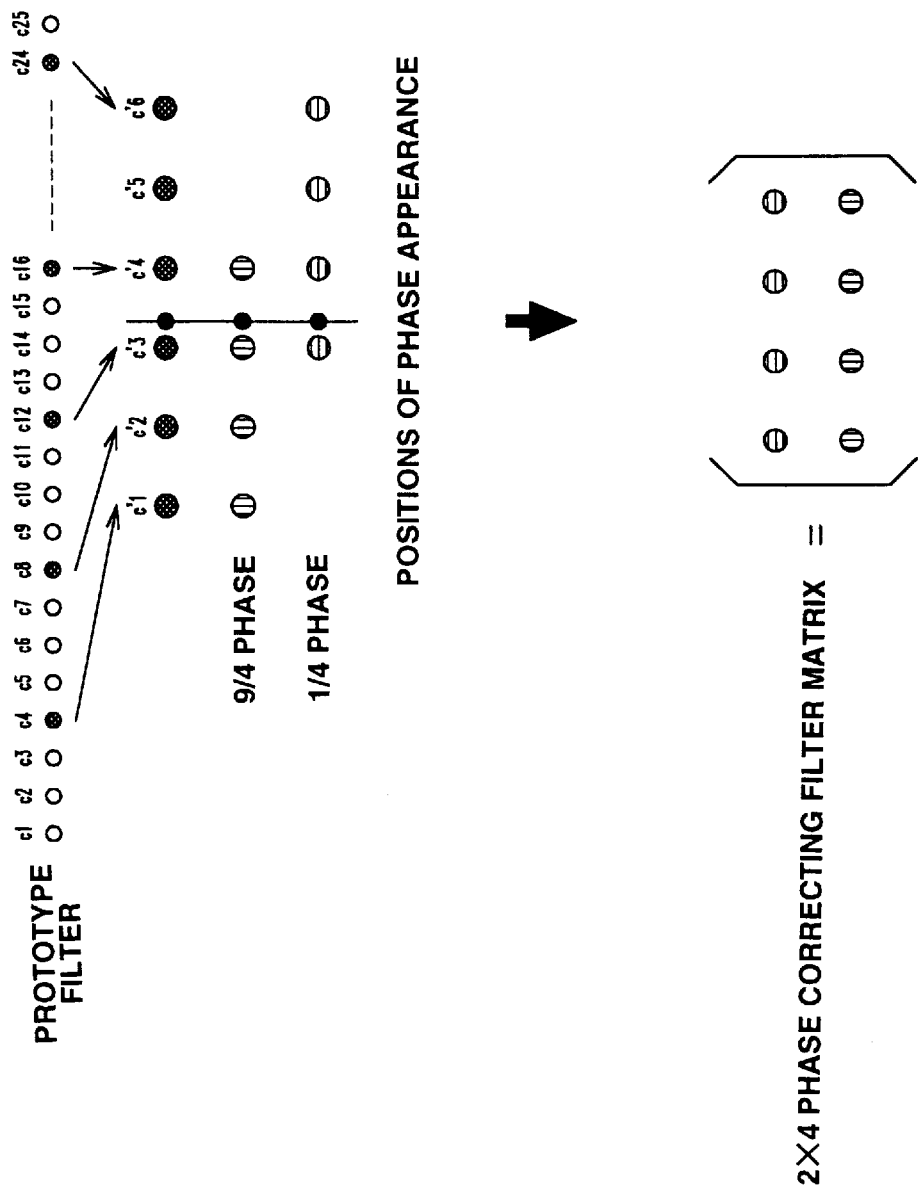
FIG. 24 is a flowchart for illustrating the designing contents of the 2×4 phase correcting IDCT matrix in which processing is performed by the phase correcting decimating inverse discrete cosine transform device for the frame mode.

First, in formulating the 2×4 phase-correcting IDCT matrix for the top field, two coefficients are retrieved from each of the six polyphase-resolved filter coefficients c'1 to c'6, so that the group delay will be ¼ and ¾, respectively, to formulate a 2×4 phase-correcting filter matrix. The 2×4 phase-correcting filter matrix, thus formulated, is shown in FIG. 24.

For example, from the six filter coefficients c'1 to c'6 of the equation (24), the coefficients shown by the following equation (25) are retrieved:

| | | | | | | |
|---|---|---|---|---|---|---|
| ¾ phase | −0.00236073 | 0.042655 | 0.115645 | 0.0850711 | | (25). |
| ¼ phase | | | 0.115645 | 0.0850711 | 0.0105276 | 0.00328948 |

If a 2×4 phase-correcting filter matrix is found from the coefficients of the equation (25), the matrix indicated by the following equation (26) is obtained:

| | | | | |
|---|---|---|---|---|
| 0.115645 | 0.0850711 | 0.0105276 | 0.00328948 | (26). |
| −0.00236073 | 0.042655 | 0.115645 | 0.0850711 | |

If the 2×4 phase-correcting filter matrix, shown by the equation (26), is normalized, the matrix shown by the following equation (27) is obtained:

| 0.556108 | 0.409085 | 0.0506245 | −0.0158183 | (27). |
|---|---|---|---|---|
| −0.00979515 | 0.176984 | 0.479834 | 0.352977 | |

At step S56, the 4×4 IDCT matrix is multiplied with this 2×4 phase-correcting filter matrix to formulate a 2×4 phase-correcting IDCT matrix for the top field.

The 2×4 phase-correcting IDCT matrix, obtained on multiplying the 2×4 IDCT matrix with the 2×4 phase-correcting filter indicated by the above equation (27), is as shown in the following equation (28):

| 0.5 | 0.470628 | 0.0402901 | −0.0794137 | (28). |
|---|---|---|---|---|
| 0.5 | −0.318943 | −0.156819 | 0.0996811 | |

On the other hand, in formulating a 2×4 phase-correcting IDCT matrix for the bottom field, the six polyphase-resolved filter coefficients $c'1$ to $c'6$ are inverted at step S57 in the left-and-right direction so that the filter coefficients will be of the ¾ phase correcting characteristics.

Then, at step S58, two coefficients are retrieved from each of the six polyphase-resolved filter coefficients $c'1$ to $c'6$, so that the group delay will be ¾ and $1\frac{1}{4}$, respectively, to formulate a 2×4 phase-correcting filter matrix.

At step S59, the 4×4 IDCT matrix is multiplied at step S59 with the 2×4 phase-correcting filter matrix to formulate the phase-correcting filter matrix for the bottom field.

By performing the processing of the steps S51 to S59 as described above, it is possible to formulate the 2×4 phase-correcting filter matrix which the phase-correcting decimating inverse discrete cosine transform unit for frame mode 32 uses to perform the computations at step S45.

Figure 25:
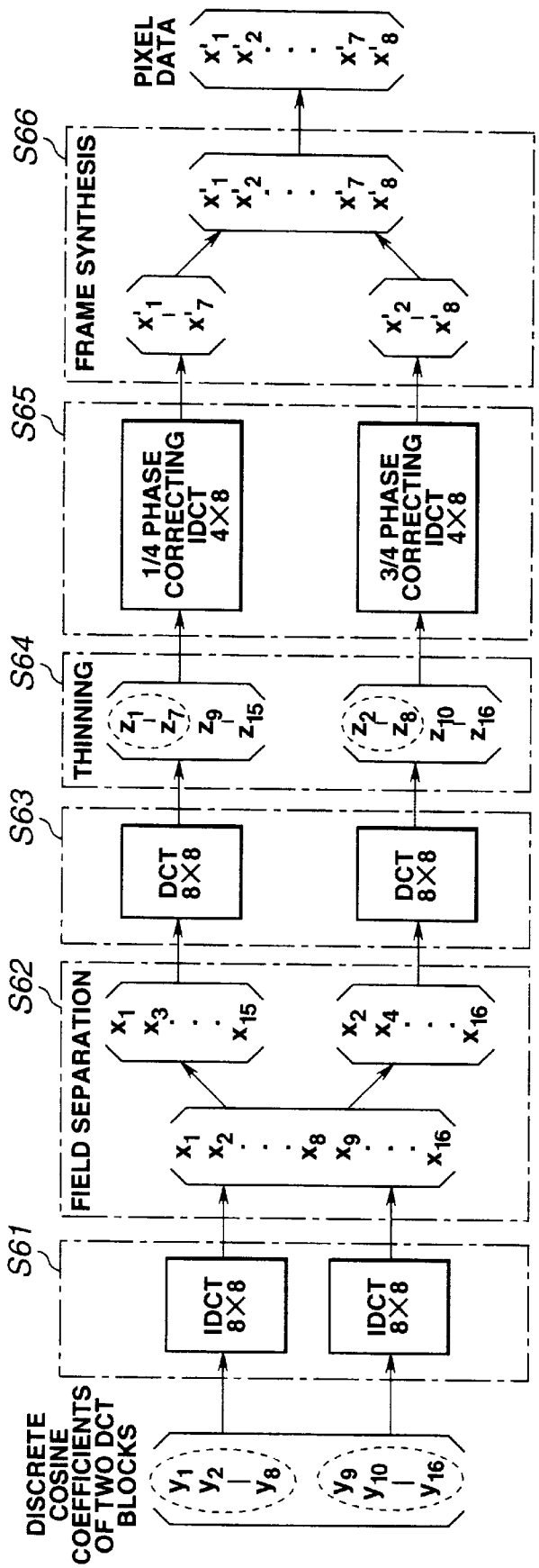
FIG. 25 illustrates the contents of two block processing of the phase correcting decimating inverse discrete cosine transform device for the frame mode of the picture decoding device shown in FIG. 9.

The two-block processing is now explained with reference to FIG. 25 illustrating the contents of the two-block processing.

The phase-correcting decimating inverse discrete cosine transform unit for frame mode 32 is fed with a bitstream, corresponding to the compression-coded high resolution picture, in terms of two DCT blocks as a unit, as shown in FIG. 25. If, for example, a macro-block is made up of four DCT blocks of luminance components and two DCT blocks of chroma components, two DCT blocks neighboring along the vertical direction are inputted. If, for example, a macro-block is constituted as shown in FIG. 5, DCT blocks 0 and 2 of the luminance component (Y) are inputted as pairs, while DCT blocks 1 and 3 are also inputted as a pair.

First, at step S61, 8×8 inverse discrete cosine transform is applied independently to discrete cosine coefficients y of the two DCT blocks. The inverse discrete cosine transform gives 8×8 decoded pixel data x. Then, at step S62, two 8×8 pixel data are separated into respective fields. At the next step S63, 8×8 discrete cosine transform is executed on each of the two 8×8 pixel blocks separated into the respective fields. At the next step S64, high-frequency components of the discrete cosine coefficients z of the pixel block of the top field obtained on 8×8 discrete cosine transform are thinned out to give a pixel block constituted by 4×4 discrete cosine coefficients. Also, high-frequency components of the discrete cosine coefficients z of the pixel block of the bottom field obtained on 8×8 discrete cosine transform are thinned out to give a pixel block constituted by 4×4 discrete cosine coefficients.

The above-described processing from the step S61 to the step S64 is the same as the processing from step S11 to step S14 in the two-block processing shown in FIG. 4.

Then, at step S65, inverse discrete cosine transform, corrected for dephasing of pixels in the vertical direction, is performed on the pixel blocks of the top field, using a 4×8 phase-correcting IDCT matrix adapted for correcting the phase by ¼ pixel. Similarly, inverse discrete cosine transform, corrected for dephasing of pixels in the vertical direction, is performed on the pixel blocks of the bottom field, using a 4×8 phase-correcting IDCT matrix adapted for correcting the phase by ¾ pixel. By executing the above-described decimating inverse discrete cosine transform, it is possible to produce 4×4 pixel data x', it being noted that the pixel data along the vertical direction, among the totality of the pixel data of the pixel blocks of the top field are denoted as $x'_1$, $x'_3$, $x'_5$, $x'_7$, with the pixel data along the vertical direction, among the totality of the pixel data of the pixel blocks of the bottom field, being denoted as $x'_2$, $x'_4$, $x'_6$, $x'_8$. These pixel data x' generate a standard resolution picture (lower layer) in which the phases of the respective pixels of the top field in the vertical direction are ¼, ¾, . . . , with the phases of the respective pixels of the bottom field in the vertical direction being 5/4, 13/4, . . . This designing method of the 4×8 phase-correcting IDCT matrix is the same as the matrix used in the processing by the phase-correcting decimating inverse discrete cosine transform unit for field mode 31.

Then, at step S66, pixel data of the pixel blocks of the top field and those of the pixel blocks of the bottom field are alternately taken on the line basis along the vertical direction and synthesized into a frame to generate decimating inverse discrete cosine transformed DCT blocks made up of 8×8 pixel data.

By the above-described two-block processing of the steps S61 to S66, it is possible with the phase-correcting decimating inverse discrete cosine transform unit for frame mode 32 to generate a picture free of dephasing between respective pixels. It is also possible to generate a picture free of dephasing with respect to the picture obtained on decoding by the phase-correcting decimating inverse discrete cosine transform unit for field mode 31.

It is also possible for the phase-correcting decimating inverse discrete cosine transform unit for frame mode 32 to perform the processing from the step S61 to the step S66 using a sole matrix.

The processing contents of the motion compensation unit for field mode 33 and motion compensation unit for frame mode 34 are explained in further detail.

Figure 26:
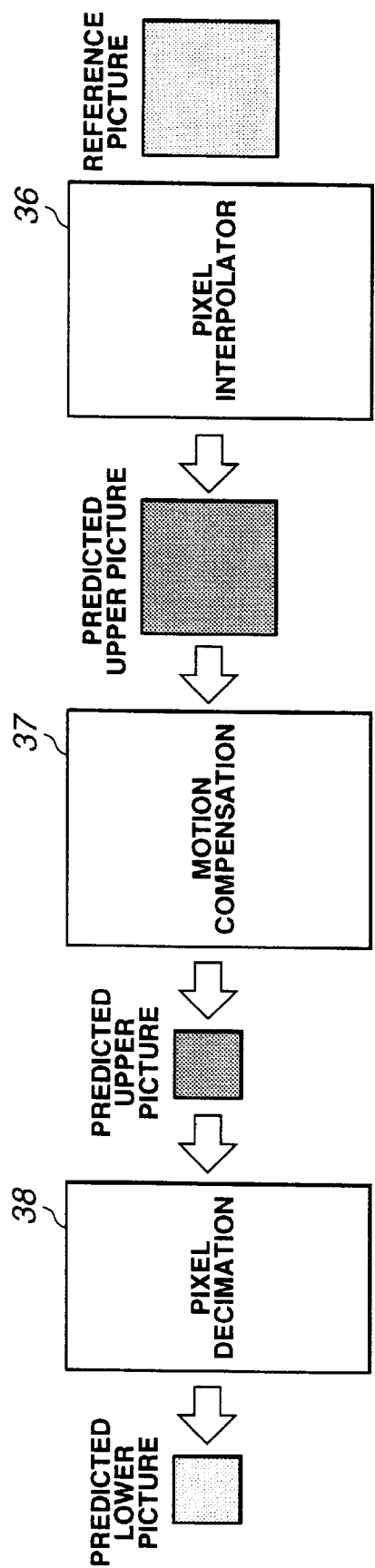
FIG. 26 is a block diagram of a motion compensation device for the frame mode and a motion compensation device for a frame mode of the picture decoding device shown in FIG. 9.
Figure 27:
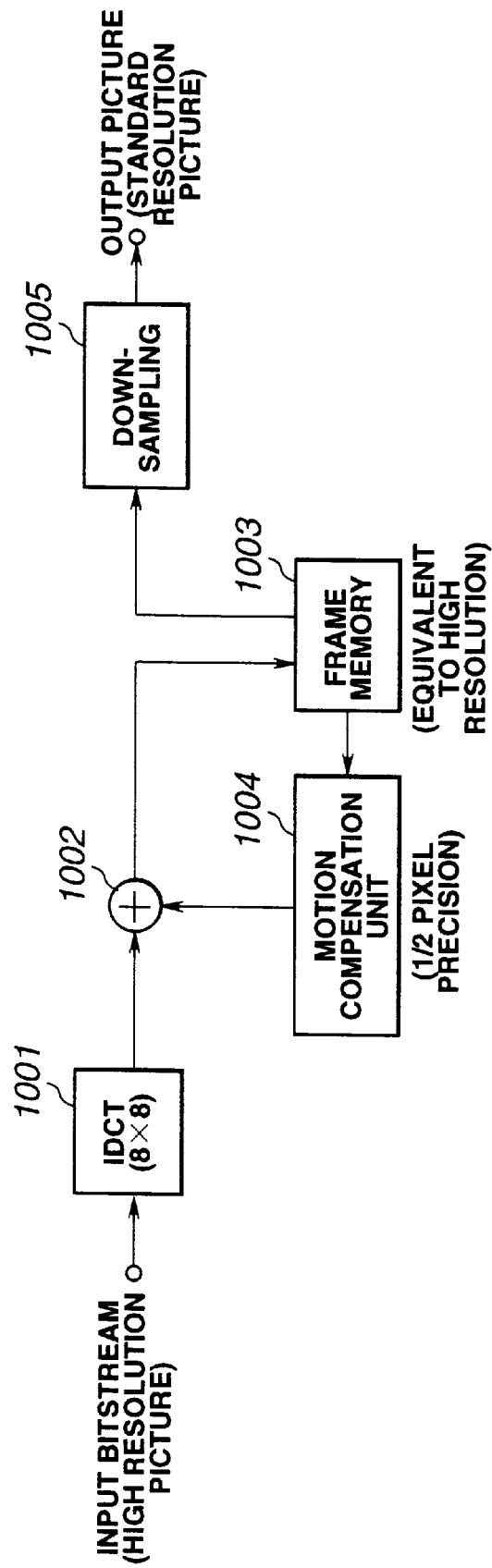
FIG. 27 is a block diagram showing a conventional first downdecoder.
Figure 28:
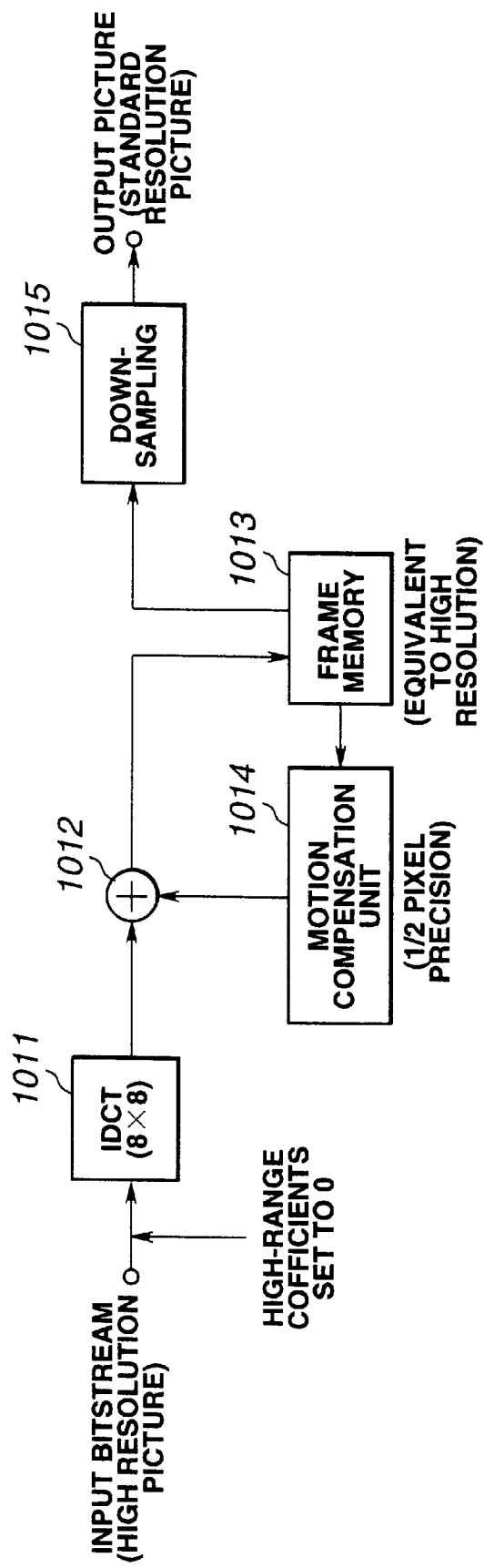
FIG. 28 is a block diagram showing a conventional second downdecoder.
Figure 29:
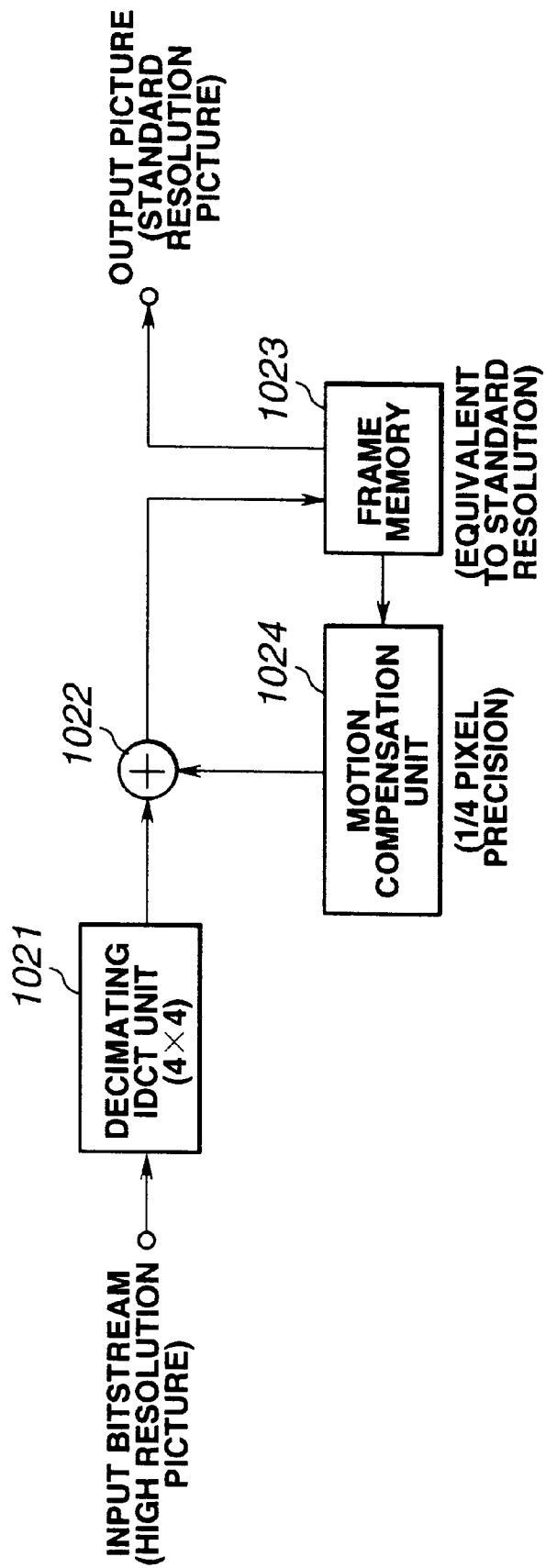
FIG. 29 is a block diagram showing a conventional third downdecoder.
Figure 30:
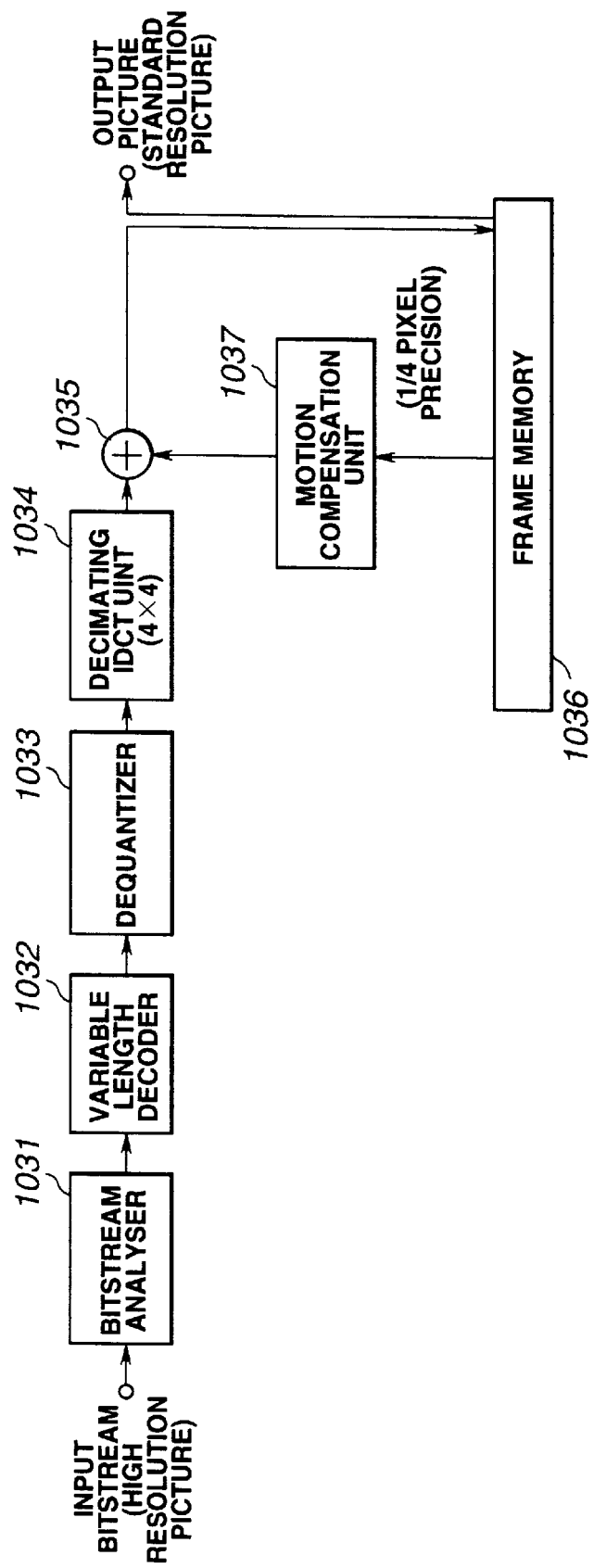
FIG. 30 is a block diagram showing a picture decoding device.

Referring to FIG. 26, each of the motion compensation unit for field mode 33 and the motion compensation unit for frame mode 34 includes a pixel interpolator 36 for performing pixel interpolation employing discrete cosine transform on a reference picture stored in the frame memory 17 to generate a virtual upper-order picture, a motion compensation unit 37 for motion-compensating this virtual upper-order picture to generate a predicted upper-order picture, and a pixel resolution reducing unit 38 performing pixel resolution reducing processing employing discrete cosine transform on the motion-compensated predicted upper-order picture for generating a predicted lower-order picture.

The pixel interpolator 36 is fed with reference picture data of the standard resolution. In the reference picture data, the phases along the vertical direction of the respective pixels of the top field are ¼, ¾, . . . , with the phases along the perpendicular direction of the respective pixels of the bottom field being 5/4, 13/4, . . . The pixel interpolator 36 performs pixel interpolation on the reference picture of the standard resolution, using the discrete cosine transform, for conversion to a high resolution picture. The picture processed with pixel interpolation by this pixel interpolator 36 is termed the virtual upper-order picture.

The motion compensation unit 37 motion-compensates the virtual upper-order picture processed with pixel interpolation by the pixel interpolator 36. The motion compensation unit 37 effects motion compensation, using a motion vector contained in the input bitstrean to the picture decoding device 10, to the ½ pixel precision. The high resolution picture, motion-compensated by the motion compensation unit 37, is termed the predicted upper-order picture.

The pixel resolution reducing unit 38 reduces the resolution of the high-resolution predicted upper-order picture, motion-compensated by the motion compensation unit 37, using the discrete cosine transform, for conversion to a standard resolution picture. In the picture data of the standard resolution, reduced in resolution by the pixel resolution reducing unit 38, the phases along the vertical direction of the respective pixels of the top field are ¼, ¾, . . . , with the phases along the perpendicular direction of the respective pixels of the bottom field being ⅝, ¹³⁄₄, . . . The standard resolution picture, pixel-reduced by the pixel resolution reducing unit 38, is termed the predicted lower-order picture.

The motion compensation unit for field mode 33 and the motion compensation unit for frame mode 34 route the generated predicted lower-order picture to the addition unit 16.

The above-described pixel interpolation and picture-reducing processing by the picture interpolator 36 and the pixel resolution reducing unit 38, described above, is executed using matrix coefficients in meeting with the field motion prediction mode and the frame motion prediction mode.

The matrix coefficients, processed by the pixel interpolator 36 and the pixel resolution reducing unit 38, are hereinafter explained.

First, the matrix used by the pixel interpolator 36 of the motion compensation unit for field mode 33 in the processing for the pixels along the horizontal direction of the reference picture data stored in the frame memory 17, that is the matrix for generating the virtual upper-order picture by pixel interpolation on the pixels alone the horizontal direction of the reference picture at the time of motion compensation in the field, is the same as the equation (3) explained in connection with the first embodiment.

On the other band, the matrix which the pixel interpolator 36 of the motion compensation unit for field mode 33 uses in processing pixels in the vertical direction of the reference picture data stored in the frame memory 17, that is the matrix used for generating the virtual upper-order picture by pixel interpolation on the pixels in the vertical direction of the reference picture at the time of motion compensation in the field motion prediction mode, is as shown in the following equation (29):

$$\text{virtual upper picture} \begin{bmatrix} x_0 \\ x_1 \\ x_2 \\ x_3 \\ x_4 \\ x_5 \\ x_6 \\ x_7 \end{bmatrix} = [IDCT8] \cdot [0 \text{ pad}] \cdot [\text{phase correction } DCT4] \cdot \tag{29}$$

$$\text{reference picture} \begin{bmatrix} x_0 \\ x_1 \\ x_2 \\ x_3 \end{bmatrix} = [\text{pixel interpolation}] \cdot \text{reference picture} \begin{bmatrix} x_0 \\ x_1 \\ x_2 \\ x_3 \end{bmatrix}.$$

The above matrix [phase correction DCT4] represents four-point discrete cosine transform coefficients and is used in discrete cosine transforming the reference picture of the standard resolution stored in the frame memory 17 on the 4×4 pixel basis. It is noted that the pixel interpolator 36 performs computations, using different matrices for the top and bottom fields, for correcting dephasing between the fields. The four-point discrete cosine transform coefficients, for correcting the phases of the pixels in the vertical direction by ¼ phase correction, are used for the top field, while the four-point discrete cosine transform coefficients, for correcting the phases of the pixels in the vertical direction by ¾ phase correction, are used for the bottom field. For the coefficients of the matrix [phase correction DCT4] which corrects the phases, four low point coefficients, among the ¼ and ¾ phase coefficients on the base vector of the eight-point discrete cosine transform coefficients, are used. In the case of a matrix used for processing the top field, the specified coefficients are as shown in the following equation (30):

$$[\text{phase correction } DCT4] = \tag{30}$$

$$\frac{1}{\sqrt{2}} \begin{bmatrix} \cos(\pi/4) & \cos(\pi/4) & \cos(\pi/4) & \cos(\pi/4) \\ \cos(\pi/32) & \cos(11\pi/32) & -\cos(13\pi/32) & -\cos(5\pi/32) \\ \cos(3\pi/16) & -\cos(5\pi/16) & -\cos(3\pi/16) & \cos(5\pi/16) \\ \cos(9\pi/32) & -\cos(\pi/32) & \cos(7\pi/32) & -\cos(15\pi/32) \end{bmatrix}.$$

In the case of the matrix used for processing the top field, the specified coefficients are as shown in the following equation (31):

$$[\text{phase correction } DCT4] = \tag{31}$$

$$\frac{1}{\sqrt{2}} \begin{bmatrix} \cos(\pi/4) & \cos(\pi/4) & \cos(\pi/4) & \cos(\pi/4) \\ \cos(5\pi/32) & \cos(13\pi/32) & -\cos(11\pi/32) & -\cos(3\pi/32) \\ \cos(5\pi/16) & -\cos(3\pi/16) & -\cos(5\pi/16) & \cos(3\pi/16) \\ \cos(15\pi/32) & -\cos(7\pi/32) & \cos(\pi/32) & -\cos(9\pi/32) \end{bmatrix}.$$

The matrix [0pad] is used in adding zeros at four high range points in the horizontal and vertical directions to the 4×4 discrete cosine transform coefficients, obtained on computing the above matrix [phase correction DCT4], in order to generate 8×8 discrete cosine transform coefficients. That is, the high-frequency components are interpolated for the DCT block containing the 4×4 discrete cosine transform coefficients for the standard resolution picture for conversion to a DCT block including the 8×8 discrete cosine transform coefficients in meeting with the high resolution picture. The specified coefficients are the same as those of the equation (5) of the first embodiment.

The above matrix [IDCT8] represents eight-point discrete cosine transform coefficients for obtaining 8×8 pixels from the 8×8 discrete cosine transform coefficients obtained by computing the matrix [0pad]. This matrix [IDCT8] is a matrix normalized by multiplying the respective coefficients with √2. The specified coefficients are as explained in the first embodiment.

By using the above matrix for pixel-interpolating the reference picture of the standard resolution, it is possible to obtain a virtual upper-order picture corresponding to the reference picture converted to the high resolution picture. The motion compensation unit 37 motion-compensates the virtual upper-order picture to generate the predicted upper-order picture. The processing speed can be enhanced if the matrices [phase correction DCT4], [0pad] and [IDCT8] are assembled into one matrix [pixel interpolation].

On the other hand, the matrix which the pixel resolution reducing unit 38 of the motion compensation unit for field mode 33 used in processing the pixels in the horizontal direction of the predicted upper-order picture motion-compensated by the motion compensation unit 37, that is the matrix used in generating the predicted lower-order picture by reducing the pixel resolution of the pixels in the horizontal direction of the predicted upper-order picture at the time of motion compensation in the field motion prediction mode, is the same as the equation (3) of the first embodiment described above.

The matrix which the pixel resolution reducing unit 38 of the motion compensation unit for field mode 33 uses in processing the pixels in the vertical direction of the predicted upper-order picture motion-compensated in the field motion prediction mode, that is the matrix used in generating the predicted lower-order picture by reducing the pixel resolution of the pixels in the vertical direction of the predicted upper-order picture at the time of motion compensation in the field motion prediction mode, is as shown by the following equation (32):

$$\text{predicted lower picture} \begin{bmatrix} P_0 \\ P_1 \\ P_2 \\ P_3 \end{bmatrix} = \tag{32}$$

$$[\text{phase correction } IDCT4] \cdot [\text{low range thining}] \cdot [DCT8] \cdot$$

$$\text{predicted upper picture} \begin{bmatrix} P_0 \\ P_1 \\ P_2 \\ P_3 \\ P_4 \\ P_5 \\ P_6 \\ P_7 \end{bmatrix} = [\text{pixel decimation}] \cdot \text{predicted upper picture} \begin{bmatrix} P_0 \\ P_1 \\ P_2 \\ P_3 \\ P_4 \\ P_5 \\ P_6 \\ P_7 \end{bmatrix}.$$

The matrix [DCT8] represents eight-point discrete cosine transform coefficients and is used in discrete cosine transforming the predicted upper-order picture, motion-compensated by the motion compensation unit 37, on the 8×8 pixel basis. The specified coefficients are the same as the equation (8) explained in connection with the first embodiment.

The above matrix [low range decimation] is used for removing four high-range points from the 8×8 discrete cosine coefficients resulting from the computation of the matrix [DCT8] to generate 4×4 discrete cosine coefficients composed only of low-frequency components. That is, in order to provide a DCT block composed only of low-frequency components from the DCT block containing 8×8 discrete cosine coefficients for coping with the high resolution picture, the coefficients are thinned out to convert the DCT block into a DCT block containing 4×4 discrete cosine coefficients for coping with the standard resolution picture. The specified coefficients are as shown in the above equation (9).

The above matrix [phase correction IDCT4] represents four-point inverse discrete cosine transform coefficients and is used in obtaining 4×4 pixels from 4×4 discrete cosine transform coefficients obtained by computing the above matrix [low range decimation]. It is noted that the pixel resolution reducing unit 38 performs computations, using different matrices for the top and bottom fields, for correcting dephasing between the fields. The four-point discrete cosine transform coefficients, for correcting the phases of the pixels in the vertical direction by ¼ phase correction, are used for the top field, while the four-point inverse discrete cosine transform coefficients, for correcting the phases of the pixels in the vertical direction by ¾ phase correction, are used for the bottom field. For the coefficients of the matrix [phase correction DCT4] which corrects the phases, four low point coefficients, among the ¼ and ¾ phase coefficients on the base vector of the eight-point discrete cosine transform coefficients, are used. In the matrix [IDCT4], the respective coefficients are multiplied with $1/\sqrt{2}$ to provide a normalized matrix. The specified coefficients are shown in the following equation (10). In the case of a matrix used for processing the top field, the specified coefficients are as shown in the following equation (33):

$$[\text{phase correction } IDCT4] = \tag{33}$$

$$\frac{1}{\sqrt{2}} \begin{bmatrix} \cos(\pi/4) & \cos(\pi/32) & \cos(3\pi/26) & \cos(9\pi/32) \\ \cos(\pi/4) & \cos(11\pi/32) & -\cos(5\pi/16) & -\cos(\pi/32) \\ \cos(\pi/4) & -\cos(13\pi/32) & -\cos(3\pi/16) & \cos(7\pi/16) \\ \cos(\pi/4) & -\cos(5\pi/32) & \cos(5\pi/16) & -\cos(15\pi/32) \end{bmatrix}.$$

In the case of the matrix used for processing the bottom field, the specified coefficients are as shown in the following equation (34):

$$[\text{phase correction } IDCT4] = \tag{34}$$

$$\frac{1}{\sqrt{2}} \begin{bmatrix} \cos(\pi/4) & \cos(5\pi/32) & \cos(5\pi/26) & \cos(15\pi/32) \\ \cos(\pi/4) & \cos(13\pi/32) & -\cos(3\pi/16) & -\cos(7\pi/32) \\ \cos(\pi/4) & -\cos(11\pi/32) & -\cos(5\pi/16) & \cos(\pi/32) \\ \cos(\pi/4) & -\cos(3\pi/32) & \cos(3\pi/16) & -\cos(9\pi/32) \end{bmatrix}.$$

By using the above matrix for reducing the pixel resolution of the predicted upper-order picture of high resolution, it is possible to obtain a predicted lower-order picture corresponding to the reference picture converted to the standard resolution picture. The processing speed can be enhanced if the matrices [DCT8], [low range decimation] and [phase correction IDCT4] are assembled into one matrix [pixel resolution reduction].

On the other hand, the matrix which the pixel interpolator 36 of the motion compensation unit for frame mode 34 uses in processing the pixels in the horizontal direction of the reference picture data stored in the frame memory 17, that is the matrix used in generating the virtual upper-order picture by interpolating the pixels in the horizontal direction of the reference picture at the time of motion compensation in the frame motion prediction mode, is the same as the equation (3) of the first embodiment described above.

The matrix which the pixel interpolator 36 of the motion compensation unit for frame mode 34 uses in processing the pixels in the vertical direction of the reference picture data stored in the frame memory 17, that is the matrix used in generating the virtual upper-order picture by interpolating the pixels in the vertical direction of the reference picture at the time of motion compensation in the frame motion prediction mode, is as shown in the following equation (35):

$$\text{virtual upper picture} \quad \begin{bmatrix} x_0 \\ x_1 \\ x_2 \\ x_3 \\ x_4 \\ x_5 \\ x_6 \\ x_7 \end{bmatrix} = [IDCT4\ fs] \cdot [0\ pad] \cdot [\text{phase correction } DCT2\ fs] \cdot \tag{35}$$

$$\text{reference picture} \quad \begin{bmatrix} x_0 \\ x_1 \\ x_2 \\ x_3 \end{bmatrix} = [\text{pixel interpolation } fs] \cdot \text{reference picture} \begin{bmatrix} x_0 \\ x_1 \\ x_2 \\ x_3 \end{bmatrix}.$$

The above matrix [phase correction DCT2fs] represents field separation type two-point discrete cosine transform coefficients and is used in discrete cosine transforming the reference picture of the standard resolution stored in the frame memory 17 as it separates the pixels of the top field from those of the bottom field on the 2×2 pixel basis. It is noted that the pixel interpolator 36 corrects the phase of the pixels by ¼ in the vertical direction for the separated top field, while correcting the phase of the pixels by ¾ in the vertical direction for the separated bottom field. For the coefficients of the phase-correcting [phase-correcting DCT3fs], two low-range point coefficients of the ¼ and ¾ phase coefficients on the base vector of the four point discrete cosine transform coefficients are used. The specified coefficients are as shown in the following equation (36):

$$[\text{phase correction } DCT2fs] = \begin{bmatrix} \cos(\pi/4) & 0 & \cos(\pi/4) & 0 \\ 0 & \cos(\pi/4) & 0 & \cos(\pi/4) \\ \cos(3\pi/16) & 0 & -\cos(5\pi/16) & 0 \\ 0 & \cos(5\pi/16) & 0 & -\cos(3\pi/16) \end{bmatrix}. \tag{36}$$

The matrix [0pad] is used in adding zeros at four high range points in the horizontal and vertical directions to the 4×4 discrete cosine transform coefficients, obtained on computing the above matrix [phase correction DCT4], in order to generate 8×8 discrete cosine transform coefficients. That is, the high-frequency components are interpolated for the DCT block containing the 4×4 discrete cosine transform coefficients for the standard resolution picture for conversion to a DCT block including the 8×8 discrete cosine transform coefficients for coping with the high resolution picture. The specified coefficients are the same as those of the equation (5) of the first embodiment.

The matrix [IDCT4fs] represents the field separation type four-point discrete cosine coefficients for obtaining 8×8 pixels from the 8×8 discrete cosine coefficients resulting from computation of the matrix [0pad]. This matrix [IDCT4fs] is used for separating the 8×8 discrete cosine coefficients into 4×4 coefficients associated with the top and bottom fields. On each of the 4×4 discrete cosine transform coefficients associated with the top and bottom fields, 4×4 discrete cosine transform is applied independently. It is noted that the matrix [IDCT4fs] has been normalized by multiplying the respective coefficients with √2. The specified coefficients are the same as in the equation (13) explained in connection with the first embodiment.

By using the above matrix for pixel-interpolating the reference picture of the standard resolution, it is possible to obtain a virtual upper-order picture corresponding to the reference picture converted to the high resolution picture. The motion compensation unit 37 motion-compensates the virtual upper-order picture to generate the predicted upper-order picture. The processing speed can be enhanced if the matrices [phase correction DCT4], [0pad] and [IDCT8] are assembled into one matrix [pixel interpolation].

On the other hand, the matrix which the pixel resolution reducing unit 38 of the motion compensation unit for field mode 33 used in processing the pixels in the horizontal direction of the predicted upper-order picture motion-compensated by the motion compensation unit 37, that is the matrix used in generating the predicted lower-order picture by decimating the pixels in the horizontal direction of the predicted upper-order picture at the time of motion compensation in the field motion prediction mode, is the same as the equation (3) of the first embodiment described above.

The matrix which the pixel resolution reducing unit 38 of the motion compensation unit for field mode 33 uses in processing the pixels in the vertical direction of the predicted upper-order picture motion-compensated in the field motion prediction mode, that is the matrix used in generating the predicted lower-order picture by decimating the pixels in the vertical direction of the predicted upper-order picture at the time of motion compensation in the field motion prediction mode is as shown in the following equation (37):

$$\text{predicted upper picture} \quad \begin{bmatrix} P_0 \\ P_1 \\ P_2 \\ P_3 \end{bmatrix} = [\text{phase correction } IDCT2fs] \cdot \tag{37}$$

$$[\text{low range thining}] \cdot [DCT4fs] \cdot \text{predicted upper picture} \begin{bmatrix} P_0 \\ P_1 \\ P_2 \\ P_3 \\ P_4 \\ P_5 \\ P_6 \\ P_7 \end{bmatrix} =$$

$$[\text{pixel decimation } fs] \cdot \text{predicted upper picture} \begin{bmatrix} P_0 \\ P_1 \\ P_2 \\ P_3 \\ P_4 \\ P_5 \\ P_6 \\ P_7 \end{bmatrix}.$$

The above matrix [DCT4fs] represents the field separation type four-point discrete cosine coefficients and is used in applying 4×4 pixel based discrete cosine transform independently on each of the top and bottom fields, separated from the predicted upper-order picture processed by the motion compensation unit 22. The specified coefficients are as shown in the equation (15) of the first embodiment described above.

The above matrix [low range decimation] is used for removing four high-range points from the 8×8 discrete cosine coefficients resulting from the computation of the matrix [DCT4fs] to generate 4×4 discrete cosine coefficients. That is, in order to provide a DCT block composed only of low-frequency components from the DCT block containing 8×8 discrete cosine coefficients for coping with the high resolution picture, the coefficients are thinned out to convert the DCT block into a DCT block containing 4×4 discrete cosine coefficients for coping with the standard resolution picture. The specified coefficients are as shown in the above equation (9) explained in connection with the first embodiment described above.

The matrix [phase correction IDCT2fs] represents the field separation type four-point discrete cosine coefficients for obtaining 4×4 pixels from the 4×4 discrete cosine coefficients resulting from computation of the matrix [low range decimation]. This matrix [phase correction IDCT2fs] is used for separating the 4×4 discrete cosine coefficients into 2×2 coefficients associated with the top and bottom fields on each of which the 2×2 discrete cosine transform is applied independently. For correcting dephasing between the fields, the pixel resolution reducing unit 38 corrects the phase of the pixels for the separated top field in the vertical direction by ¼, while correcting the phase of the pixels for the separated bottom field in the vertical direction by ¾. For the coefficients of the phase-correcting matrix [phase correction IDCT2fs], two low-range point coefficients of the ¼ and ¾ phase coefficients on the base vector of the four-point discrete cosine transform coefficients are used. It is noted that the matrix [IDCT2fs] has been normalized by multiplying the respective coefficients with $1/\sqrt{2}$. The specified coefficients are as shown in the following equation (38):

$$[\text{phase correction } IDCT2fs] = \begin{bmatrix} \cos(\pi/4) & 0 & \cos(3\pi/16) & 0 \\ 0 & \cos(\pi/4) & 0 & \cos(5\pi/16) \\ \cos(\pi/4) & 0 & -\cos(5\pi/16) & 0 \\ 0 & \cos(\pi/4) & 0 & -\cos(3\pi/16) \end{bmatrix}. \quad (38)$$

By reducing the pixel resolution of the predicted upper-order picture of high resolution, with the aid of the above matrix, it is possible to obtain a predicted lower-order picture, which is the standard resolution picture converted from the predicted upper-order picture. The processing speed can be enhanced if the matrices [DCT4fs], [low range decimation] and [JDCT2fs] are assembled into one matrix [pixel resolution reduction fs].

With the picture decoding device 30 of the second embodiment of the present invention, 4×4 decimating inverse discrete cosine transform is applied to each of the top field and the bottom field in the field DCT mode to and phase correction is made decode the standard resolution picture. In the frame DCT mode, a standard resolution picture is decoded by performing frame separation and decimating inverse discrete cosine transform and by correcting the phase. With the present picture decoding device 30, in which different processing is performed for the field DCT mode and the frame DCT mode, the interlacing character proper to the picture obtained on interlaced scanning is not lost. Moreover, dephasing between the top and bottom fields otherwise produced on decimating inverse discrete cosine transform is eliminated, while the output picture is not deteriorated in picture quality. That is, with the present picture decoding device 30, phase correction is not needed when outputting a decoded picture stored in the frame memory 17, thus simplifying the processing without deteriorating the picture quality.

Also, with the present second embodiment of the picture decoding device, no dephasing is produced in the picture of the virtual upper-order picture by doing picture interpolation using discrete cosine transform at the time of motion compensation. The result is that motion compensation can be effected on a picture free of dephasing, so that a standard resolution picture of high picture quality can be provided without deteriorating the picture quality due to motion compensation. Also, in the present picture decoding device 30, in which discrete cosine transform is applied at the time of motion compensation for reducing the picture, it is possible to output a picture of the same phase as that of the picture outputted by the phase-correcting decimating inverse discrete cosine transform unit for field mode 31 and the picture outputted by the phase-correcting decimating inverse discrete cosine transform unit for frame mode 32. Therefore, motion compensation can be effected on a picture not subjected to dephasing, thus providing a high precision standard resolution picture.

Also, in the present picture decoding device 30, the number of points of the discrete cosine transform may be variable in connection wit the pixel interpolation and pixel reduction at the time of motion compensation. The result is that the deterioration in the frequency response due to filtering can be reduced in comparison with the case of interpolating pixels with the use of a half band filter. The pixels in the frame referred to in a DCT block are closed thus not leading to picture quality deterioration such as block distortion.

In the picture decoding device 30, the discrete cosine transform in the motion compensation unit for field mode 33 and in the motion compensation unit for frame mode 34 can be performed using a high-speed algorithm.

Although the present invention has been explained in connection with the first and second preferred embodiments, the data processed in the present invention need not necessarily be picture data of the MPEG2 system. That is, any suitable data may be processed by the technique of the present invention on the condition that the data are the compressed picture data of the first resolution processed by predictive encoding consisting in effecting motion prediction by orthogonal transform on the pre-set pixel block basis or by orthogonal transform on the pre-set pixel block basis, such as compressed picture data obtained by the wavelet system.

What is claimed is:

1. A picture decoding device for decoding moving picture data of a second resolution from compressed picture data of a first resolution obtained on predictive coding effecting motion prediction in terms of a pre-set pixel block (macroblock) as a unit and on compression encoding by orthogonal transform in terms of a pre-set pixel block (orthogonal transform block) as a unit, the second resolution being lower than said first resolution, comprising:

first inverse orthogonal transform means for applying inverse orthogonal transform to an orthogonal transformed compressed picture data obtained on orthogonal transform by the orthogonal transform system coping with interlaced scanning (field orthogonal transform mode);

second inverse orthogonal transform means for applying inverse orthogonal transform to an orthogonal transformed compressed picture data obtained on orthogonal transform by the orthogonal transform system coping with sequential scanning (frame orthogonal transform mode);

addition means for summing compressed picture data inverse orthogonal transformed by said first inverse orthogonal transform means or said second inverse orthogonal transform means to motion-compensated reference picture data to output moving picture data of the second resolution;

storage means for storing moving picture data outputted by said addition means as reference picture data;

first motion compensation means for motion-compensating a macro-block of reference picture data motion-predicted by the motion prediction system coping with interlaced scanning (field motion prediction mode); and second motion compensation means for motion-compensating a macro-block of reference picture data motion-predicted by the motion prediction system coping with sequential scanning (frame motion prediction mode);

said first inverse orthogonal transform means inverse orthogonal transforming coefficients of low-frequency components ofrespective coefficients of said orthogonal transform block;

said second inverse orthogonal transform means inverse orthogonal transforming coefficients of the entire frequency components ofrespective coefficients of said orthogonal transform block; said second inverse orthogonal transform means separating the respective pixels of the inverse orthogonal transformed orthogonal transform block into two pixel blocks coping with interlaced scanning; said second inverse orthogonal transform means orthogonal transforming said separated pixel blocks, inverse orthogonal transforming coefficients of low-frequency components of respective coefficients of the two orthogonal transformed pixel blocks and synthesizing the inverse orthogonal transformed pixel blocks into an orthogonal transform block;

said first motion compensation means and the second motion compensation means interpolating pixels using orthogonal transform for stored reference picture data to generate virtual upper-order picture data of the first resolution, and motion-compensating the generated virtual upper-order picture, said first motion compensation means and the second motion compensation means effecting pixel decimation using orthogonal transform for the motion-compensated virtual upper-order picture for generating reference picture data summed to the compressed picture data.

2. The picture decoding device according to claim 1 wherein said first motion compensation means orthogonal transforms an orthogonal transform block in a macro-block in the stored reference picture data, sums coefficients of high-frequency components to the orthogonal transformed orthogonal transform block, and inverse orthogonal transforms the orthogonal transform block added to with the high-frequency components to effect pixel interpolation to generate a virtual upper-order picture of the first resolution, said first motion compensation means orthogonal transforming an orthogonal transform block of the motion-compensated virtual upper-order picture, thinning out high-frequency components of the orthogonal transformed orthogonal transform block and inverse orthogonal transforming the orthogonal transform block from which the high-frequency components have been thinned out to generate pixel-decimated reference picture data.

3. The picture decoding device according to claim 1 wherein said first motion compensation means orthogonal transforms pixels along the horizontal direction of an orthogonal transform block in a macro-block in the stored reference picture data, sums coefficients of high-frequency components to the orthogonal transformed orthogonal transform block, and inverse orthogonal transforms the orthogonal transform block added to with the high-frequency components to effect pixel interpolation to generate a virtual upper-order picture of the first resolution, said first motion compensation means orthogonal transforming an orthogonal transform block of the motion-compensated virtual upper-order picture, thinning out high-frequency components of the orthogonal transformed orthogonal transform block and inverse orthogonal transforming the orthogonal transform block from which the high-frequency components have been thinned out to generate pixel-decimated reference picture data.

4. The picture decoding device according to claim 1 wherein said second motion compensation means orthogonal transforms pixels in the vertical direction of an orthogonal transform block in a macro-block of stored reference picture data, separately for two pixel blocks separated from the orthogonal transform block for coping with interlaced scanning, adds coefficients of high-frequency components for the orthogonal transformed orthogonal transform block, inverse orthogonal transforms the orthogonal transform block added to with the high-frequency components separately for said two pixel blocks separated for coping with interlaced scanning, to interpolate pixels to generate virtual upper-order picture data of the first resolution, and orthogonal transforms the orthogonal transform block of the motion-compensated virtual upper-order picture for said two pixel blocks, said second motion compensation means thinning out the high-frequency components of the orthogonal transformed orthogonal transform block, said second motion compensation means performing inverse orthogonal transform separately for said two pixel blocks separated for coping with the interlaced scanning.

5. The picture decoding device according to claim 1 wherein said first motion compensation means and said second motion compensation means compute a matrix of respective coefficients of an orthogonal transform block in a macro-block of stored reference picture data and another matrix to interpolate pixels, said first motion compensation means and said second motion compensation means computing a matrix of pixels of the motion-compensated virtual upper-order picture and another matrix to effect pixel reduction.

6. The picture decoding device according to claim 5 wherein said first motion compensation means and said second motion compensation means compute a matrix of respective coefficients of an orthogonal transform block in a macro-block of stored reference picture data and another matrix derived from a high speed algorithm to interpolate pixels, said first motion compensation means and said second motion compensation means computing a matrix of pixels of the motion-compensated virtual upper-order picture and another matrix derived from a high speed algorithm to interpolate pixels to effect pixel reduction.

7. The picture decoding device according to claim 1 wherein said first inverse orthogonal transform means inversely orthogonal transforms coefficients of low-frequency components of respective coefficients of said orthogonal transform block, corrects the pixels by ¼ pixel in the vertical direction for respective pixels of the top field resulting from inverse orthogonal transform, said first inverse orthogonal transform means correcting the pixels by ¾ pixel in the vertical direction for respective pixels of the bottom field resulting from inverse orthogonal transform;

said second inverse orthogonal transform means inverse orthogonal transforms the coefficients of the entire frequency components of the orthogonal transform block; said second inverse orthogonal transform means separating the inverse orthogonal transformed orthogonal transform block into two pixel blocks for coping with interlaced scanning and separately orthogonal transforming the separated pixel blocks; said second inverse orthogonal transform means inverse orthogonal transforming the coefficients of low-frequency components, among the coefficients of the orthogonal transformed two pixel blocks, phase-correcting respective pixels of the top field resulting from inverse orthogonal transform by ¼ pixel in the vertical direction, phase-correcting respective pixel of the bottom field resulting from inverse orthogonal transform by ¾ pixel in the vertical direction and synthesizing the phase-corrected top and bottom fields;

said first motion compensation means and the second motion compensation means correcting the phase of the pixels in the vertical direction of the top field of stored reference picture data by ¼ pixel and correcting the phase of the pixels in the vertical direction of the bottom field by ¾ pixels by way of pixel interpolation to generate a virtual upper-order picture of the first resolution, said first motion compensation means and the second motion compensation means correcting the phase of the pixels in the vertical direction of the top field by ¼ pixel and correcting the phase of the pixels in the vertical direction of the bottom field by ¾ pixel by way of pixel decimation to generate reference picture data to be added to compressed picture data.

8. The picture decoding device according to claim 7 wherein
said first motion compensation means and the second motion compensation means orthogonal transforms pixels in the horizontal direction of an orthogonal transform block in a macro-block of stored reference picture data, adds coefficients of the high-frequency components to the orthogonal transformed orthogonal transform block and inverse orthogonal transforms the orthogonal transform block added to with the high-frequency components by way of pixel interpolation to generate virtual upper-order picture data of the first resolution; said first motion compensation means and the second motion compensation means orthogonal transforming the motion-compensated orthogonal transform block of the virtual upper-order picture, thinning out the high-frequency components of the orthogonal transformed orthogonal transform block and inverse orthogonal transforming the orthogonal transform block, from which the high-frequency components have been thinned out, to decimate the pixels to generate reference picture data.

9. The picture decoding device according to claim 7 wherein said first motion compensation means corrects the phase of pixels in the vertical direction of a top field of an orthogonal transform block in a macro-block of stored reference picture data by ¼ pixel, corrects the phase of pixels in the vertical direction of a bottom field by ¾ pixel, orthogonal transforms the orthogonal transform block corrected for phase, adds coefficients of high-frequency components to the orthogonal transformed orthogonal transform block, inverse orthogonal transforms the orthogonal transform block added to with the high-frequency components to interpolate pixels to generate virtual upper-order picture data of the first resolution; said first motion compensation means orthogonal transforming the orthogonal transform block of the motion-compensated virtual upper-order picture, thinning out high-frequency components of the orthogonal transform orthogonal transform block, correcting the phase of pixels in the vertical direction of the top field of the inverse orthogonal transformed orthogonal transform block by ¼ pixel and correcting the phase of pixels in the vertical direction of a bottom field by ¾ pixel to decimate pixels to generate reference picture data.

10. The picture decoding device according to claim 7 wherein said first motion compensation means corrects the phase of pixels in the vertical direction of a top field of an orthogonal transform block in a macro-block of stored reference picture data by ¼ pixel, corrects the phase of pixels in the vertical direction of a bottom field by ¾ pixel, orthogonal transforms the orthogonal transform block corrected for phase, separately for two pixel blocks separated from the orthogonal transform block to cope with the interlaced scanning, adds high-frequency components to the orthogonal transformed orthogonal transform block, inverse orthogonal transforms the orthogonal transform block added to with the high-frequency components separately for the two pixel blocks separated from the orthogonal transform block to cope with the interlaced scanning to interpolate pixels to generate virtual upper-order picture data of the first resolution; said first motion compensation means orthogonal transforming the orthogonal transform block of the motion-compensated virtual upper-order picture separately for said two pixel blocks, thinning out the high-frequency components of the orthogonal transformed orthogonal transform block, inverse orthogonal transforming the orthogonal transform block, from which the high-frequency components have been thinned out, separately for said two pixel blocks, correcting the phase of pixels in the vertical direction of the top field of the inverse orthogonal transformed orthogonal transform block by ¼ pixel, and correcting the phase of pixels in the vertical direction of the bottom field by ¾ pixel to decimate the pixels to generate reference picture data.

11. The picture decoding device according to claim 7 wherein
said first motion compensation means and the second motion compensation means compute a matrix of respective coefficients of an orthogonal transform block in a macro-block of stored reference picture data and another matrix to interpolate pixels, said first motion compensation means and the second motion compensation means computing a matrix of pixels of the motion-compensated virtual upper-order picture and another matrix to decimate pixels.

12. The picture decoding device according to claim 11 wherein
said first motion compensation means and the second motion compensation means compute a matrix of respective coefficients of an orthogonal transform block in a macro-block of stored reference picture data and a matrix which is based on the high-speed algorithm to interpolate pixels, said first motion compensation means and the second motion compensation means computing a matrix of pixels of the motion-compensated virtual upper-order picture and the matrix which is based on the high-speed algorithm to decimate pixels.

13. A picture decoding method for decoding moving picture data of a second resolution from compressed picture data of a first resolution obtained on predictive coding effecting motion prediction in terms of a pre-set pixel block (macro-block) as a unit and on compression encoding by orthogonal transform in terms of a pre-set pixel block (orthogonal transform block) as a unit, said second resolution being lower than said first resolution, comprising:

applying inverse orthogonal transform to an orthogonal transformed compressed picture data obtained on orthogonal transform by the orthogonal transform system coping with interlaced scanning (field orthogonal transform mode);

applying inverse orthogonal transform to an orthogonal transformed compressed picture data obtained on orthogonal transform by the orthogonal transform system coping with sequential scanning (frame orthogonal transform mode);

summing inverse orthogonal transformed compressed picture data to motion-compensated reference picture data;

storing moving picture data resulting from the summing as reference picture data;

motion-compensating a macro-block of reference picture data motion-predicted by the motion prediction system coping with interlaced scanning (field motion prediction mode); and motion-compensating a macro-block of reference picture data motion-predicted by the motion prediction system coping with sequential scanning (frame motion prediction mode);

inverse orthogonal transforming coefficients of low-frequency components of respective coefficients of said orthogonal transform block orthogonal transformed by the field orthogonal transform mode;

inverse orthogonal transforming coefficients of the entire frequency components of respective coefficients of said orthogonal transform block orthogonal transformed by the frame orthogonal transform mode;

separating the respective pixels of the inverse orthogonal transformed orthogonal transform block into two pixel blocks for coping with interlaced scanning;

orthogonal transforming said separated pixel blocks, inverse orthogonal transforming coefficients of low-frequency components of respective coefficients of the two orthogonal transformed pixel blocks;

synthesizing the inverse orthogonal transformed pixel blocks into an orthogonal transform block;

interpolating pixels using orthogonal transform for stored reference picture data to generate virtual upper-order picture data of the first;

motion-compensating the generated virtual upper-order picture data; and effecting pixel decimation using orthogonal transform for the motion-compensated virtual upper-order picture for generating reference picture data summed to the compressed picture data.

14. The picture decoding method according to claim 13 further comprising:

orthogonal transforming an orthogonal transform block in a macro-block of stored reference picture data motion-predicted by the field motion prediction mode;

adding coefficients of high-frequency components to the orthogonal transform orthogonal transform block;

inverse orthogonal transforming the orthogonal transform block, added to with the high-frequency components, to interpolate pixels to generate virtual upper-order picture of the first resolution;

orthogonal transform the orthogonal transform block of the motion-compensated virtual upper-order picture;

thinning out the high-frequency components of the orthogonal transformed orthogonal transform block; and inverse orthogonal transforming the orthogonal transform block, from which the high-frequency components have been thinned out, to decimate pixels to generate reference picture data.

15. The picture decoding method according to claim 13 further comprising:

orthogonal transforming pixels in the horizontal direction of the orthogonal transform block in a macro-block of stored reference picture data motion-compensated by the frame motion prediction mode;

adding coefficients of high-frequency components to the orthogonal transformed orthogonal transform block;

inverse orthogonal transforming the orthogonal transform block added to with the high-frequency components to interpolate pixels to generate virtual upper-order picture data of the first resolution;

orthogonal transforming the orthogonal transform block of the motion-compensated virtual upper-order picture;

thinning out the high-frequency components of the orthogonal transformed orthogonal transform block;

inverse orthogonal transforming the orthogonal transform block, from which the high-frequency components have been thinned out, to decimate pixels to generate reference picture data.

16. The picture decoding method according to claim 13 further comprising:

orthogonal transforming pixels in the horizontal direction of the orthogonal transform block in a macro-block of stored reference picture data motion-compensated by the frame motion prediction mode, separately for two pixel blocks separated from the orthogonal transform block in meeting with interlaced scanning;

adding coefficients of high-frequency components to the orthogonal transformed orthogonal transform block;

inverse orthogonal transforming the orthogonal transform block added to with the high-frequency components, separately for two pixel blocks separated from the orthogonal transform block in meeting with interlaced scanning to interpolate pixels, to generate virtual upper-order picture data of the first resolution;

orthogonal transforming the orthogonal transform block of the motion-compensated virtual upper-order picture, separately for two pixel blocks separated from the orthogonal transform block in meeting with interlaced scanning to interpolate pixels;

thinning out the high-frequency components of the orthogonal transformed orthogonal transform block; and inverse orthogonal transforming the orthogonal transform block, from which the high-frequency components have been thinned out, separately for two pixel blocks separated from the orthogonal transform block in meeting with interlaced scanning to interpolate pixels to decimate pixels to generate reference picture data.

17. The picture decoding method according to claim 13 further comprising:

computing a matrix of respective coefficients of an orthogonal transform block in a macro-block of stored reference picture data and another matrix to interpolate pixels; and computing a matrix of pixels of the motion-compensated virtual upper-order picture and another matrix to decimate pixels.

18. The picture decoding method according to claim 17 further comprising:

computing a matrix of respective coefficients of an orthogonal transform block in a macro-block of stored reference picture data and a matrix which is based on the high-speed algorithm to interpolate pixels; and computing a matrix of pixels of the motion-compensated virtual upper-order picture and the matrix which is based on the high-speed algorithm to decimate pixels.

19. The picture decoding method according to claim 13 further comprising:

inverse orthogonal transforming coefficients of low-frequency components of respective coefficients of an orthogonal transform block orthogonal transformed by the field motion prediction mode;

correcting the phase of respective pixels of the top field resulting from inverse orthogonal transform by ¼ pixel in the vertical direction;

correcting the phase of respective pixels of the bottom field resulting from inverse orthogonal transform by ¾ pixel in the vertical direction;

inverse orthogonal transforming coefficients of the entire frequency components of the orthogonal transform block orthogonal transformed by the frame orthogonal transform mode;

separating the inverse orthogonal transformed orthogonal transform block into two pixel blocks coping with interlaced scanning;

orthogonal transforming the separated two pixel blocks;

inverse orthogonal transforming the coefficients of the low-frequency components of respective coefficients of the two orthogonal transform pixel blocks;

correcting the phase of respective pixels of the top field resulting from inverse orthogonal transform by ¼ pixel in the vertical direction;

correcting the phase of respective pixels of the bottom field resulting from inverse orthogonal transform by ¾ pixel in the vertical direction;

synthesizing the top and bottom field corrected for phase;

correcting the phase of pixels in the vertical direction of the top field resulting from inverse orthogonal transforms by ¼ pixel; and correcting the phase of pixels in the vertical direction of the bottom field resulting from inverse orthogonal transforms by ¾ pixel to decimate pixels to generate reference picture data to be added to the compressed picture data.

20. The picture decoding method according to claim 19 further comprising:

orthogonal transforming pixels in the horizontal direction of an orthogonal transform block in a macro-block of stored reference picture data;

adding coefficients of high-frequency components to the orthogonal transformed orthogonal transform block;

inverse orthogonal transforming the orthogonal transform block, added to with the high-frequency components, to interpolate pixels to generate a virtual upper-order picture of first resolution;

orthogonal transforming the orthogonal transform block of the motion-compensated virtual upper-order picture;

thinning out the high-frequency components of the orthogonal transformed orthogonal transform block; and inverse orthogonal transforming the orthogonal transform block, from which the high-frequency components have been thinned out, to decimate pixels to generate reference picture data.

21. The picture decoding method according to claim 19 further comprising:

correcting the phase of pixels in the vertical direction of a top field of an orthogonal transform block in a macro-block of stored reference picture data, motion-predicted by the frame motion prediction mode, by ¼ pixel;

correcting the phase of pixels in the vertical direction of a bottom field by ¾ pixel;

orthogonal transforming the orthogonal transform block corrected for phase;

adding coefficients of high-frequency components to the orthogonal transformed orthogonal transform block;

inverse orthogonal transforms the orthogonal transform block added to with the high-frequency components to interpolate pixels to generate virtual upper-order picture data of the first resolution;

orthogonal transforming the orthogonal transform block of the motion-compensated virtual upper-order picture;

thinning out high-frequency components of the orthogonal transformed orthogonal transform block;

inverse orthogonal transforming the orthogonal transform block, from which the high-frequency components have been thinned out;

correcting the phase of pixels in the vertical direction of the top field of the inverse orthogonal transformed orthogonal transform block by ¼ pixel;

and correcting the phase of pixels in the vertical direction of a bottom field by ¾ pixel to decimate pixels to generate reference picture data.

22. The picture decoding method according to claim 19 further comprising:

correcting the phase of pixels in the vertical direction of a top field of an orthogonal transform block in a macro-block of stored reference picture data, motion-predicted by the frame motion prediction mode, by ¼ pixel;

correcting the phase of pixels in the vertical direction of a bottom field by ¾ pixel;

orthogonal transforming the orthogonal transform block corrected for phase, separately for two pixel blocks separated from the orthogonal transform block to cope with the interlaced scanning;

adding high-frequency components to the orthogonal transformed orthogonal transform block;

inverse orthogonal transforming the orthogonal transform block added to with the high-frequency components separately for two pixel blocks, separated from the orthogonal transform block to cope with the interlaced scanning, to interpolate pixels to generate virtual upper-order picture data of the first resolution;

orthogonal transforming the orthogonal transform block of the motion-compensated virtual upper-order picture separately for said two pixel blocks;

thinning out the high-frequency components of the orthogonal transformed orthogonal transform block;

inverse orthogonal transforming the orthogonal transform block, from which the high-frequency components have been thinned out, separately for said two pixel blocks;

correcting the phase of pixels in the vertical direction of the top field of the inverse orthogonal transformed orthogonal transform block by ¼ pixel; and correcting the phase of pixels in the vertical direction of the bottom field by ¾ pixel to decimate the pixels to generate reference picture data.

23. The picture decoding method according to claim 19 further comprising:

computing a matrix of respective coefficients of an orthogonal transform block in a macro-block of stored reference picture data and another matrix to interpolate pixels; and computing a matrix of pixels of the motion-compensated virtual upper-order picture and another matrix to decimate pixels.

24. The picture decoding method according to claim 23 further comprising:

computing a matrix of respective coefficients of an orthogonal transform block in a macro-block of stored reference picture data and another matrix which is based on fast algorithm to interpolate pixels; and computing a matrix of pixels of the motion-compensated virtual upper-order picture and the matrix which is based on fast algorithm to decimate pixels.

* * * * *